United States Patent
Tsumura et al.

(10) Patent No.: US 12,542,197 B2
(45) Date of Patent: *Feb. 3, 2026

(54) FEATURE QUANTITY CALCULATING METHOD, FEATURE QUANTITY CALCULATING PROGRAM, FEATURE QUANTITY CALCULATING DEVICE, SCREENING METHOD, SCREENING PROGRAM, AND COMPOUND CREATING METHOD

(71) Applicant: FUJIFILM Corporation, Tokyo (JP)

(72) Inventors: Kyosuke Tsumura, Minami-Ashigara (JP); Jun Nakabayashi, Minami-Ashigara (JP); Shino Ohira, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 1002 days.

This patent is subject to a terminal disclaimer.

(21) Appl. No.: 17/497,349

(22) Filed: Oct. 8, 2021

(65) Prior Publication Data

US 2022/0028499 A1 Jan. 27, 2022

Related U.S. Application Data

(63) Continuation of application No. PCT/JP2020/015198, filed on Apr. 2, 2020.

(30) Foreign Application Priority Data

Apr. 16, 2019 (JP) .................. 2019-078090

(51) Int. Cl.
*G16C 20/50* (2019.01)
*G01N 33/15* (2006.01)
(Continued)

(52) U.S. Cl.
CPC ............. *G16C 20/50* (2019.02); *G06F 18/21* (2023.01); *G06F 18/22* (2023.01); *G06N 20/00* (2019.01);
(Continued)

(58) Field of Classification Search
CPC ........ G16C 20/30; G16C 20/64; G16C 20/50; G16C 20/40; G16C 20/70; G01N 33/15; G01N 33/50
See application file for complete search history.

(56) References Cited

U.S. PATENT DOCUMENTS 7,751,987 B1 7/2010 Becker et al.
9,373,059 B1 6/2016 Heifets et al.
(Continued)

FOREIGN PATENT DOCUMENTS

CN 101344902 A 1/2009
CN 102930181 A 2/2013
(Continued)

OTHER PUBLICATIONS

Japanese Office Action for corresponding Japanese Application No. 2021-514871, dated Dec. 28, 2022, with English translation.
(Continued)

*Primary Examiner* — An H Do
(74) *Attorney, Agent, or Firm* — Birch, Stewart, Kolasch & Birch, LLP

(57) ABSTRACT

An object of the present invention is to provide a method, a program, and a device which enable calculation of a feature quantity accurately indicating chemical properties of a target structure. Further, another object of the present invention is to provide a method and a program which enable efficient screening of a pharmaceutical candidate compound using a feature quantity. Further, still another object of the present invention is to provide a method which enables efficient
(Continued)

creation of a three-dimensional structure of a pharmaceutical candidate compound using a feature quantity. In a case where target structures have a similarity in the degree of accumulation of probes, this indicates that the target structures have similar chemical properties. That is, target structures having similar feature quantities calculated according to the first aspect exhibit similar chemical properties. Therefore, according to the first aspect, the feature quantity accurately showing the chemical properties of a target structure can be calculated.

17 Claims, 66 Drawing Sheets

(51) Int. Cl.
    G06F 18/21    (2023.01)
    G06F 18/22    (2023.01)
    G06N 20/00    (2019.01)
    G06T 17/00    (2006.01)
    G06V 20/64    (2022.01)
    G16C 20/30    (2019.01)
    G16H 70/40    (2018.01)

(52) U.S. Cl.
    CPC .............. *G06T 17/00* (2013.01); *G06V 20/64* (2022.01); *G16C 20/30* (2019.02); *G01N 33/15* (2013.01); *G16H 70/40* (2018.01)

(56)             References Cited

U.S. PATENT DOCUMENTS

| | | | |
|---|---|---|---|
| 11,031,094 | B2 | 6/2021 | Blattner et al. |
| 12,249,406 | B2 * | 3/2025 | Tsumura ................ G16C 20/50 |
| 2003/0017483 | A1 | 1/2003 | Ecker et al. |
| 2003/0143628 | A1 | 7/2003 | Onizuka |
| 2005/0267687 | A1 | 12/2005 | Tomii |
| 2009/0060588 | A1 | 3/2009 | Tanaka |
| 2010/0312538 | A1 | 12/2010 | Umeyama et al. |
| 2012/0232856 | A1 | 9/2012 | Bendtsen |
| 2013/0046482 | A1 | 2/2013 | Andersen et al. |
| 2015/0310162 | A1 | 10/2015 | Okuno et al. |
| 2015/0313898 | A1 | 11/2015 | Tomkinson et al. |
| 2016/0300127 | A1 | 10/2016 | Heifets et al. |
| 2019/0018924 | A1 | 1/2019 | Mackinnon et al. |
| 2020/0243166 | A1 | 7/2020 | Tsumura et al. |

FOREIGN PATENT DOCUMENTS

| | | |
|---|---|---|
| EP | 1010681 A1 | 6/2000 |
| EP | 1 083 980 B1 | 3/2007 |
| JP | 7-13959 A | 1/1995 |
| JP | 2002-228656 A | 8/2002 |
| JP | 2003-520940 A | 7/2003 |
| JP | 2004-220571 A | 8/2004 |
| JP | 2004-287812 A | 10/2004 |
| JP | 2005-49188 A | 2/2005 |
| JP | 2007-213290 A | 8/2007 |
| JP | 2007-299125 A | 11/2007 |
| JP | 2009-64015 A | 3/2009 |
| JP | 4564097 B2 | 10/2010 |
| JP | 5946045 B2 | 7/2016 |
| JP | 2017-520868 A | 7/2017 |
| JP | 2019-28879 A | 2/2019 |
| JP | 2019-508821 A | 3/2019 |
| WO | WO 97/24301 A1 | 7/1997 |
| WO | WO 2005/103994 A1 | 11/2005 |
| WO | WO 2009/064015 A1 | 5/2009 |
| WO | WO 2011/154121 A1 | 12/2011 |
| WO | WO 2014/034577 A1 | 3/2014 |
| WO | WO 2015/168774 A1 | 11/2015 |
| WO | WO 2019/078006 A1 | 4/2019 |

OTHER PUBLICATIONS

Japanese Office Action for Japanese Application No. 2021-511868, dated Dec. 26, 2022, with English translation.
English translation of Ohira et al., "A Newly Developed Method Based on AI-oriented Amino Acid Interaction Mapping (AI-AAM) for Efficient Virtual Scaffold Hopping," Preprints of the 41st Symposium on Chemoinformatics, Oct. 27, 2018, 3 pages total.
Extended European Search Report for European Application No. 20783157.9, dated May 16, 2022.
U.S. Office Action for U.S. Appl. No. 17/484,047, dated Jun. 21, 2024.
U.S. Office Action for U.S. Appl. No. 16/850,838, dated Sep. 3, 2024.
Yamazaki et al., "Spatial Decomposition of Solvation Free Energy Based on the 3D Integral Equation Theory of Molecular Liquid: Application to Miniproteins," Journal of Physical Chemistry B, vol. 115, 2011, pp. 310-318.
Extended European Search Report dated Oct. 1, 2020 for Application No. 18868536.6.
Indian Office Action for Indian Application No. 202017014616, dated Jun. 18, 2021, with English translation.
International Preliminary Report on Patentability (Form PCT/IPEA/409), dated Nov. 1, 2019, for International Application No. PCT/JP2018/037051, with an English translation.
International Preliminary Report on Patentability and Written Opinion of the International Searching Authority (Forms PCT/IB/326, PCT/IB/373, and PCT/ISA/237) for International Application No. PCT/JP2020/013333, dated Oct. 14, 2021, with English translation of the Written Opinion.
International Preliminary Report on Patentability and Written Opinion of the International Searching Authority (Forms PCT/IB/326, PCT/IB/373, and PCT/ISA/237) for International Application No. PCT/JP2020/015198, dated Oct. 28, 2021, with English translation of the Written Opinion.
International Search Report (Form PCT/ISA/210) for International Application No. PCT/JP2020/015198, dated Jul. 21, 2020, with English translation.
International Search Report (Form PCT/ISA/210), dated Oct. 30, 2018, for International Application No. PCT/JP2018/037051, with an English translation.
International Search Report (PCT/ISA/210) for International Application No. PCT/JP2020/013333, dated Jul. 14, 2020, with English translation.
Japanese Office Action dated Sep. 7, 2020 for Application No. 2019-549195 with an English translation.
Ohira et al., "A Newly Developed Method Based on AI-oriented Amino Acid Interaction Mapping (AI-AAM) for Efficient Virtual Scaffold Hopping," Preprints of the 41st Symposium on Chemoinformatics, Oct. 27, 2018, pp. 1-2 (4 pages total).
Written Opinion of the International Searching Authority (Form PCT/ISA/237), dated Oct. 30, 2018, for International Application No. PCT/JP2018/037051.
Singaporean Office Action for corresponding Singaporean Application No. 11202110812Y, dated Sep. 18, 2023.
Japanese Office Action for Japanese Application No. 2021-004840, dated Aug. 19, 2022, with English translation.
Extended European Search Report for corresponding European Application No. 20792167.7, dated Sep. 12, 2022.
Kirsch et al., "Concepts and Core Principles of Fragment-Based Drug Design," Molecules, vol. 24, Nov. 26, 2019, p. 4309 (22 pages total).
Raschka et al., "Machine learning and AI-based approaches for bioactive ligand discovery and GPCR-ligand recognition," Methods, vol. 180, 2020 (Available online Jul. 6, 2020), pp. 89-110.
Wójcikowski et al., "Development of a protein-ligand extended connectivity (PLEC) fingerprint and its application for binding affinity predictions," Bioinformatics, vol. 35, No. 8, Sep. 8, 2018, pp. 1334-1341.
U.S. Office Action for U.S. Appl. No. 17/484,047, dated Jan. 4, 2024.
Japanese Notice of Reasons for Refusal for Japanese Application No. 2021-004840, dated Jan. 20, 2022, with an English translation.

(56) References Cited

OTHER PUBLICATIONS

Indian Office Action for corresponding Indian Application No. 202117046716, dated Aug. 5, 2022, with English translation.
Chinese Office Action and Search Report for Chinese Application No. 201880067748.X, dated Mar. 25, 2023, with an English translation.
English Machine Translation of JP 2007-213290-A, dated Aug. 23, 2007.
English Machine Translation of JP 2019-28879-A, dated Feb. 21, 2019.
Invitation to Respond to Written Opinion for corresponding Singaporean Application No. 11202110812Y, dated Nov. 15, 2022.
Bender et al., "Molecular Surface Point Environments for Virtual Screening and the Elucidation of Binding Patterns (MOLPRINT 3D)," Journal of Medicinal Chemistry, vol. 47, No. 26, 2004, pp. 6569-6583.
U.S. Office Action for U.S. Appl. No. 16/850,838, dated Mar. 15, 2024.
Cozzini et al., "Free Energy of Ligand Binding to Protein: Evaluation of the Contribution of Water Molecules by Computational Methods," Current Medicinal Chemistry, vol. 11, No. 23, 2004, pp. 3093-3118.
Rajgaria et al., "Distance dependent centroid to centroid force fields using high resolution decoys," Proteins, vol. 70, 2007, pp. 950-970.
U.S. Office Action for U.S. Appl. No. 16/850,838, dated Jun. 10, 2025.
Indian Hearing Notice for counterpart Indian Application No. 202117046716, dated Sep. 19, 2025.
Communication pursuant to Article 94(3) EPC issued in European Application No. 20792167.7 on Oct. 21, 2025.
Office Action issued in Canadian Application No. 3,136,930 on Oct. 29, 2025.
Gilis D. et al., "PoPMuSiC, an algorithm for predicting protein mutant stability changes. Application to prion proteins". Protein Engineering 13(12): 849-856. (Year: 2000).
Ingolfson Hi et al., "The power of coarse graining in biomolecular simulations". Wiley Interdisciplinary Reviews Computational Molecular Science 4:225-248 (Year: 2014).
Office Action issued in U.S. Appl. No. 16/850,838 on Dec. 2, 2025.
Extended European Search Report issued in European Patent Application No. 25201733.0 on Dec. 12, 2025.

* cited by examiner

FIG. 8
| | THREE-DIMENSIONAL AAM DESCRIPTOR (LEVEL SURFACE WITH RESPECT TO THRESHOLD) | THREE-DIMENSIONAL AAM DESCRIPTOR (LEVEL SURFACE WITH RESPECT TO THRESHOLD) AND THREE-DIMENSIONAL STRUCTURE OF COMPOUND |
|---|---|---|
| DIRECTION 1 | 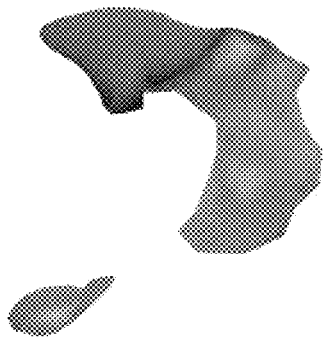 | 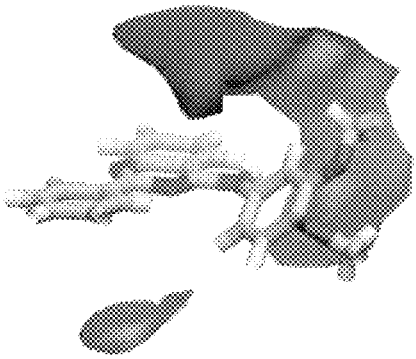 |
| DIRECTION 2 | 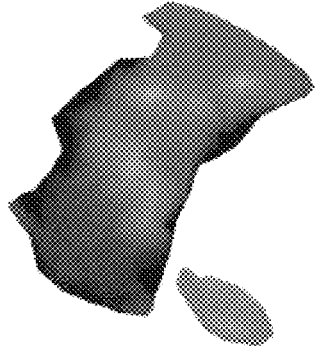 | 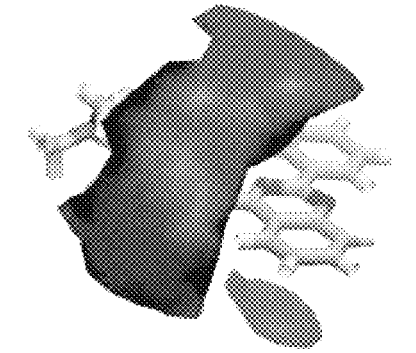 |
| DIRECTION 3 | 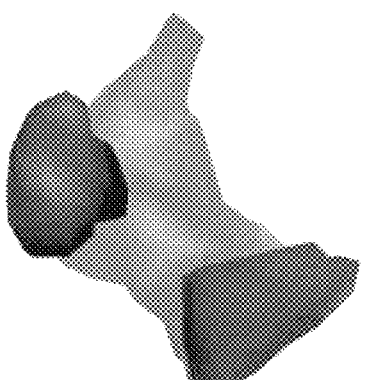 | 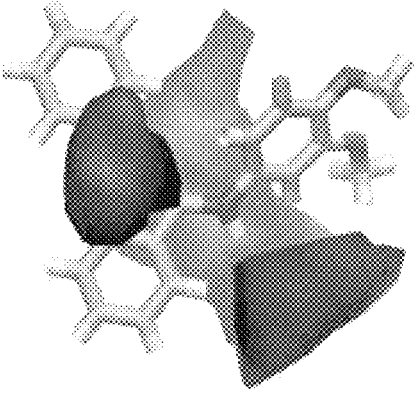 |

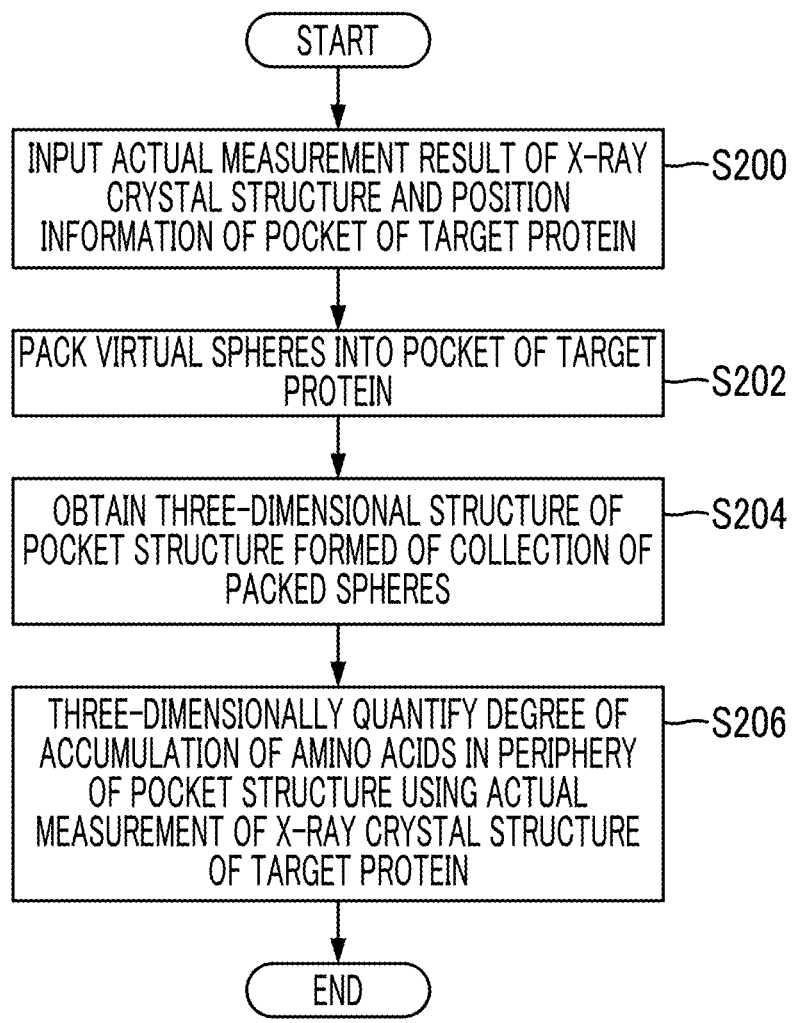

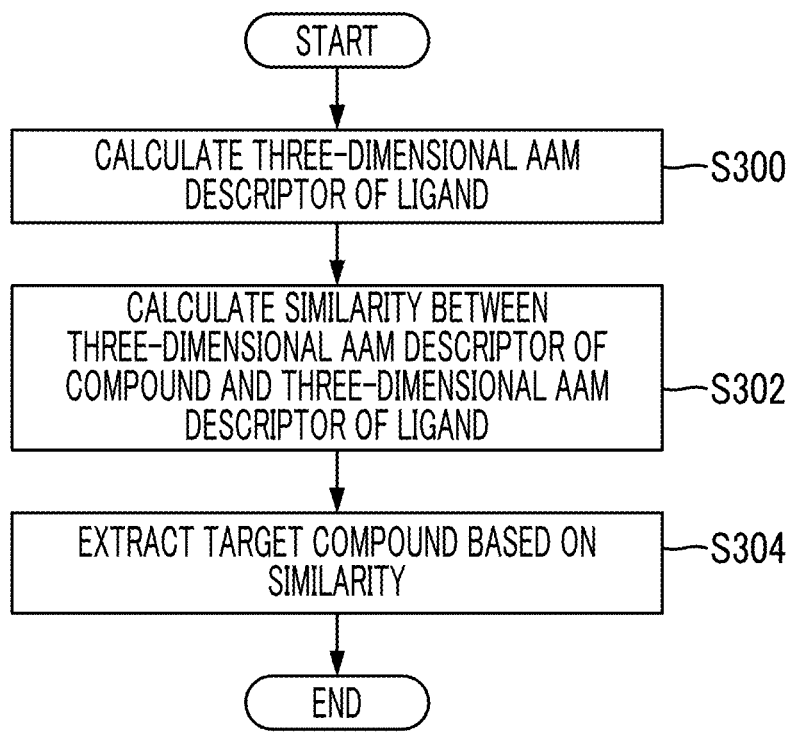

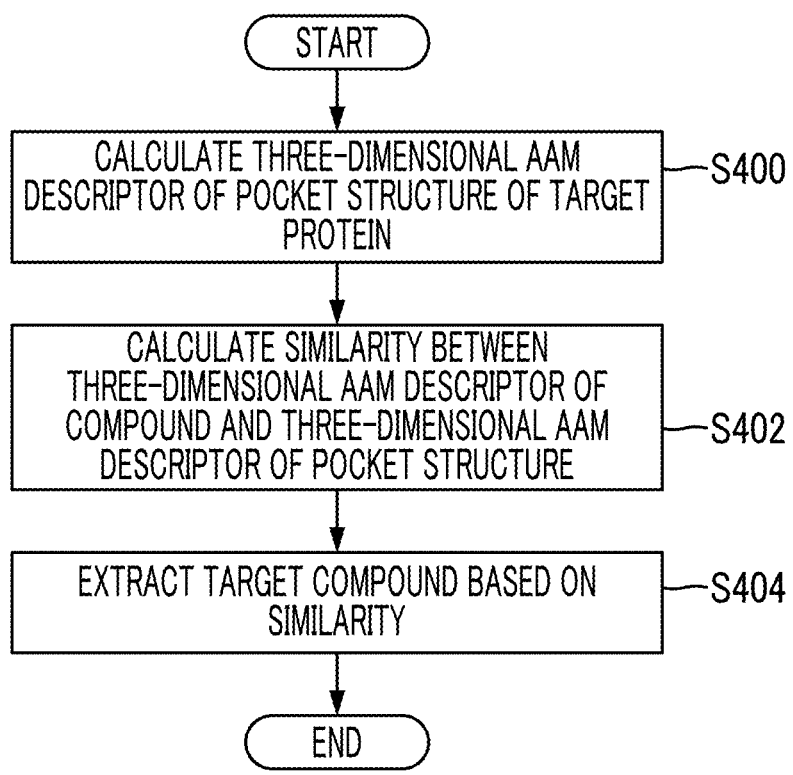

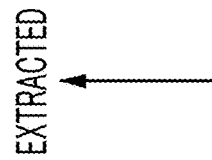

FIG. 24
Step1: CALCULATE THREE-DIMENSIONAL AAM DESCRIPTOR OF PLURALITY OF COMPOUNDS AND CREATE PAIR OF STRUCTURAL FORMULA AND THREE-DIMENSIONAL AAM DESCRIPTOR
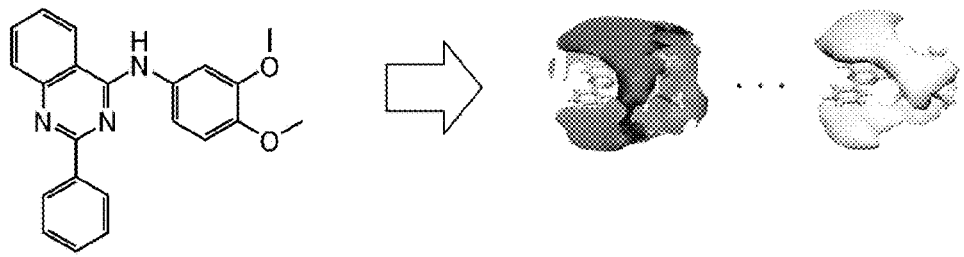
Step2: THREE-DIMENSIONAL DESCRIPTOR (EXPLANATORY VARIABLE)    THREE-DIMENSIONAL STRUCTURE OF COMPOUND (TEACHER DATA)
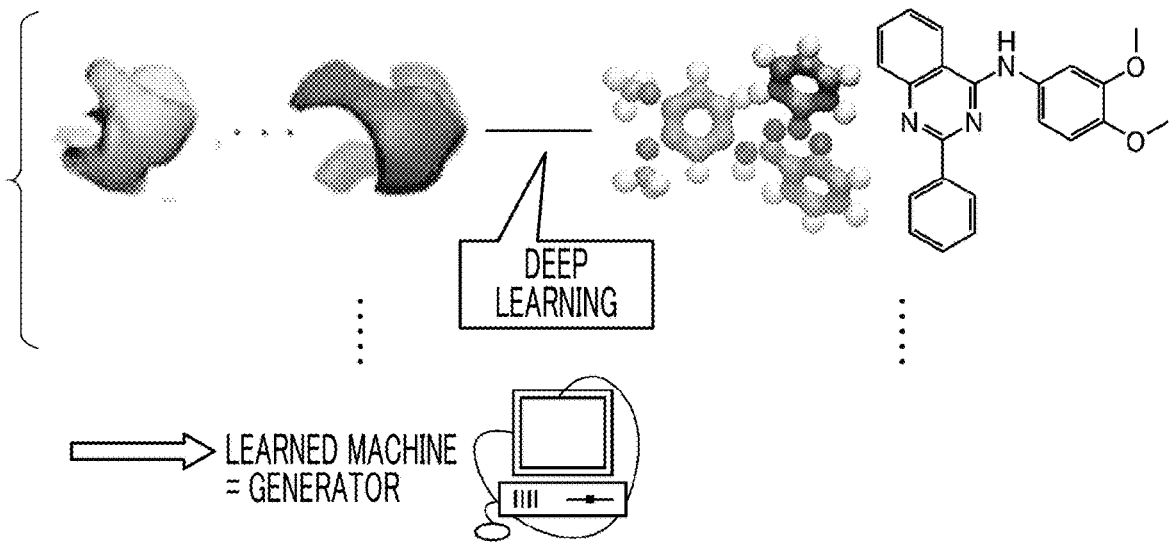
DEEP LEARNING
⇒ LEARNED MACHINE = GENERATOR FIG. 25
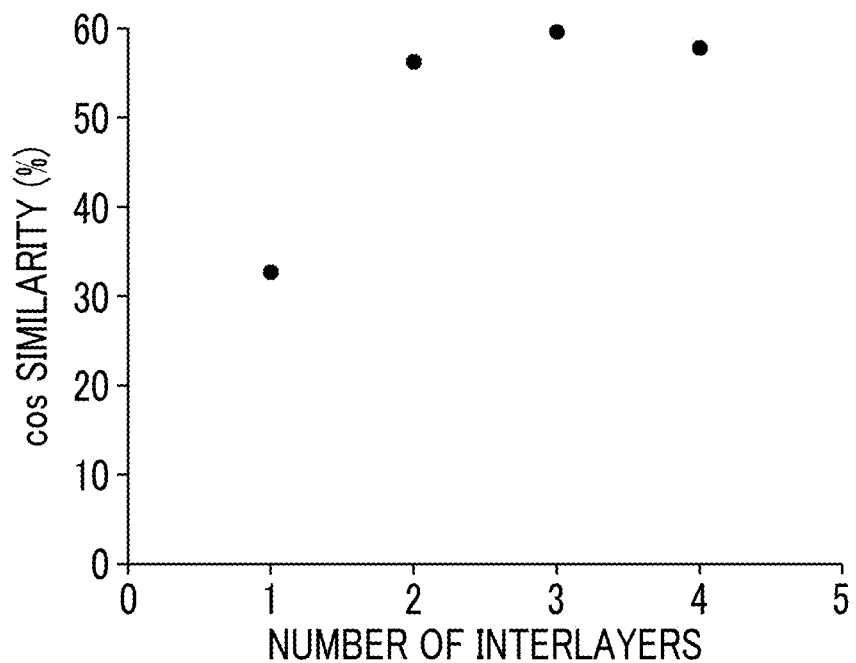
FIG. 26A
STRUCTURAL FORMULA
GENERATED FROM
THREE-DIMENSIONAL AAM
DESCRIPTOR
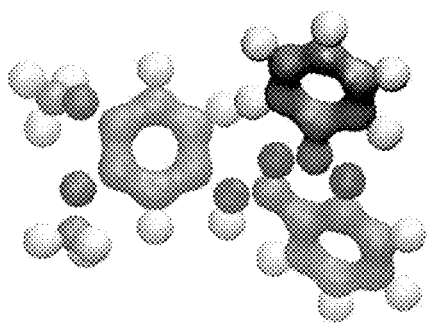
FIG. 26B
CORRECT STRUCTURAL
FORMULA

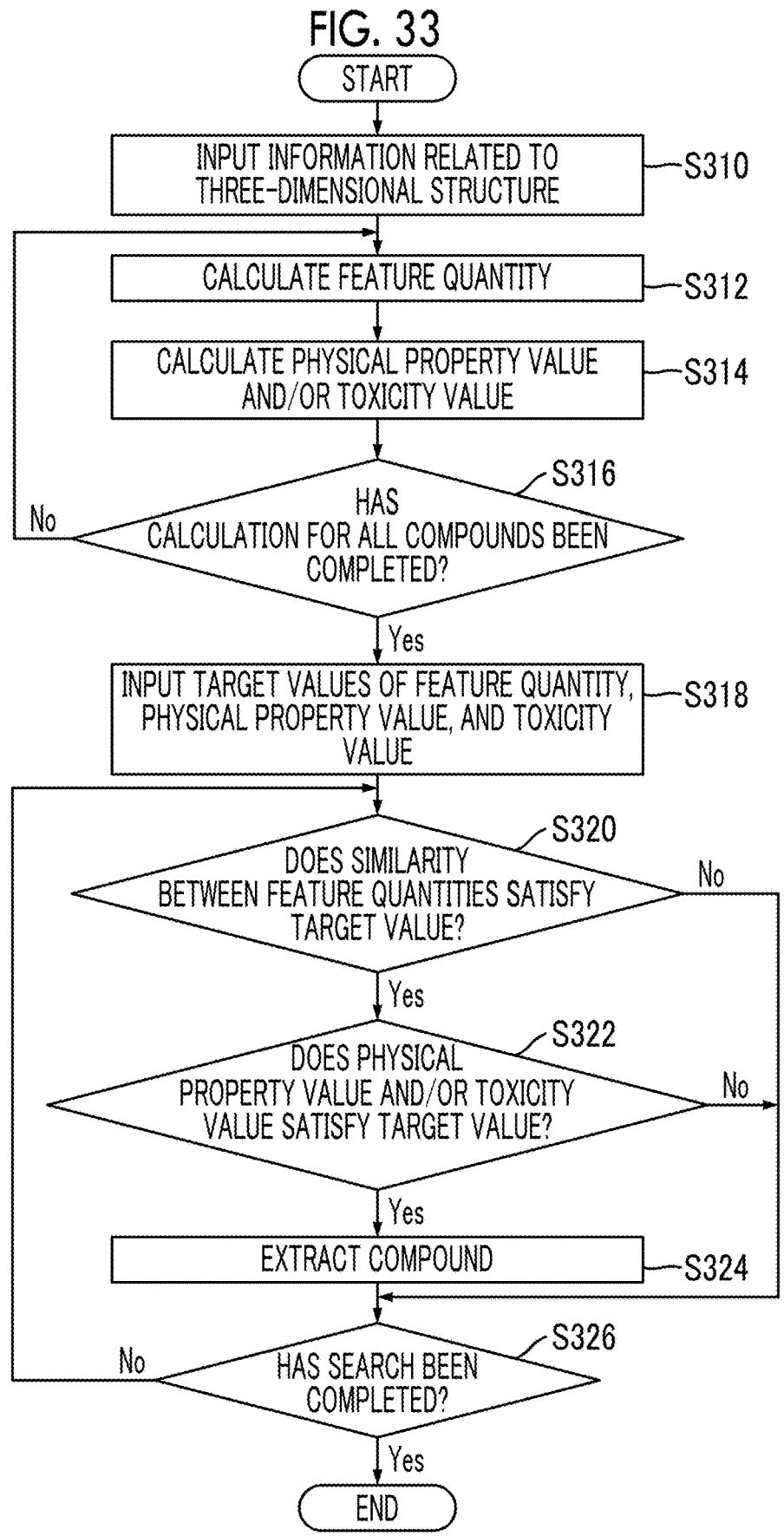

ClogP : 2.0

ClogP : 2.0                    ClogP : 0.9

|  | COMPOUND A | COMPOUND B |
|---|---|---|
| CASE 1 | (structure) | (structure) |
| CASE 2 | (structure) | (structure) |
| CASE 3 | (structure) | (structure) |

|  | SIMILARITY DISTANCE (AAM DESCRIPTOR) | COMPOUND A ClogP | COMPOUND B ClogP |
|---|---|---|---|
| CASE 1 | 30.7 | 1.04 | 1.96 |
| CASE 2 | 44.7 | 1.64 | 3.40 |
| CASE 3 | 40.0 | 0.56 | 2.10 |

| | SIMILARITY DISTANCE (AAM DESCRIPTOR) | COMPOUND A ClogP | COMPOUND B ClogP |
|---|---|---|---|
| | 12418.5 | 5.63 | 9.18 |

FIG. 48

```
START
  ↓
INPUT INFORMATION RELATED TO
THREE-DIMENSIONAL STRUCTURE
  ↓
INPUT TARGET VALUE OF FEATURE QUANTITY
  ↓
INPUT TARGET VALUE OF PHYSICAL PROPERTY
VALUE AND/OR TARGET VALUE OF TOXICITY
VALUE
  ↓
ACQUIRE CANDIDATE STRUCTURE
  ↓
CALCULATE FEATURE QUANTITY
  ↓
CALCULATE PHYSICAL PROPERTY VALUE
AND/OR TOXICITY VALUE
  ↓
DOES FEATURE QUANTITY SATISFY TARGET VALUE? —No→
  ↓ Yes
DOES PHYSICAL PROPERTY VALUE AND/OR TOXICITY VALUE SATISFY TARGET VALUE? —No→
  ↓ Yes
ADOPT CANDIDATE STRUCTURE
  ↓
HAS CREATION BEEN COMPLETED? —No→ (loop back to ACQUIRE CANDIDATE STRUCTURE)
  ↓ Yes
END
```

FIG. 66
| NAME | COMPOUND | | FEATURE QUANTITY (DEGREE OF ACCUMULATION OF EACH AMINO ACID) | |
| --- | --- | --- | --- | --- |
| | STRUCTURAL FORMULA | THREE-DIMENSIONAL STRUCTURE | ALANINE | ... |
| lig001 | 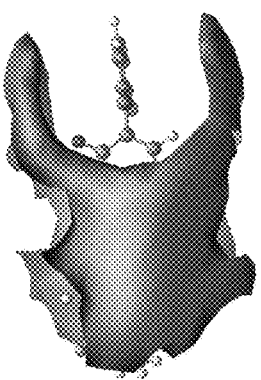 | 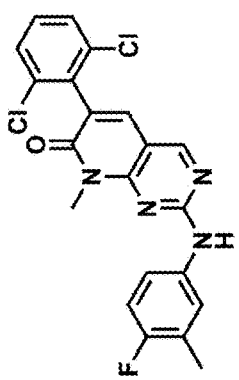 | | ... |
| lig002 | .... | .... | .... | ... |

FIG. 67
| NAME | STRUCTURAL FORMULA | DEGREE OF ACCUMULATION OF AMINO ACIDS | SHARE OF SELECTED ATOM GROUP IN DEGREE OF ACCUMULATION OF AMINO ACIDS |
|---|---|---|---|
| lig001 | 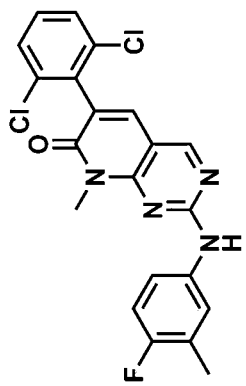 | 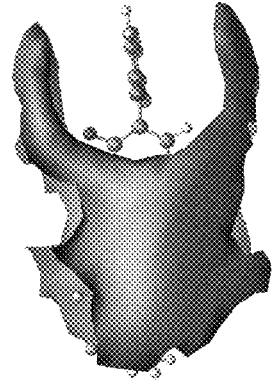 | 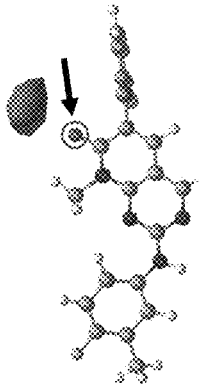 |

DEGREE OF ACCUMULATION: HIGH

DEGREE OF ACCUMULATION: LOW

DEGREE OF ACCUMULATION: HIGH

FIG. 74

| NAME | STRUCTURAL FORMULA | SIMILARITY WITH TARGET COMPOUND |
|---|---|---|
| TARGET COMPOUND — lig001 | (structure) | 1 |
| COMPOUND TO BE SCREENED — lig002 | (structure) | 0.1 |
| COMPOUND TO BE SCREENED — lig003 | .... | .... |
| .... | .... | .... |

FEATURE QUANTITY CALCULATING METHOD, FEATURE QUANTITY CALCULATING PROGRAM, FEATURE QUANTITY CALCULATING DEVICE, SCREENING METHOD, SCREENING PROGRAM, AND COMPOUND CREATING METHOD

CROSS-REFERENCE TO RELATED APPLICATIONS

The present application is a Continuation of PCT International Application No. PCT/JP2020/015198 filed on Apr. 2, 2020 claiming priority under 35 U.S.C § 119(a) to Japanese Patent Application No. 2019-078090 filed on Apr. 16, 2019. Each of the above applications is hereby expressly incorporated by reference, in its entirety, into the present application.

BACKGROUND OF THE INVENTION

1. Field of the Invention

The present invention relates to a method, a program, and a device which perform calculation of a feature quantity, screening of a compound, and creation of a three-dimensional structure of a compound and particularly relates to a technique for searching for a pharmaceutical candidate compound.

2. Description of the Related Art

In the related art, in the drug discovery research using a computer, pharmaceutical candidate compounds (hereinafter, referred to as "hits") have been searched for by preparing a library having tens of thousands to one hundred thousand of existing compounds, providing the structural formulae of the compounds, and examining the binding force with respect to one target protein. For example, U.S. Pat. No. 9,373,059B predicts a binding force by providing the structural formula of a compound. Further, JP5946045B also describes that a compound having a desired binding force is searched for gradually by repeating generation of a structural formula and prediction of a binding force (trial and error).

Further, JP4564097B describes that a search is performed using a descriptor referred to as "compound fingerprint". The "descriptor" indicates information obtained from the structural formula of a compound, and the "compound fingerprint" indicates information related to the presence or absence of various functional groups. Such a descriptor has a characteristic in that "in a case where the descriptors of compounds are similar, the skeletons of the compounds are similar".

SUMMARY OF THE INVENTION

Recently, since highly required target proteins have been complicated and difficult, it is difficult to find hits simply by screening libraries. Meanwhile, the theoretical number of compounds is (the 60th power of 10) even limiting the number to low molecules with a molecular weight of 500 or less. The number thereof is further increased in a case of widening the range to middle molecules with a molecular weight of approximately 1000, and thus there is still a possibility of finding hits, considering that the number of compounds synthesized since the dawn of history is approximately (the ninth power of 10). However, it is almost impossible to examine the binding force with respect to all the astronomical numbers of compounds by experiments or simulations. Even in a case of examination of the binding force with respect to some compounds, the efficiency is low only by repeating trial and error as described in U.S. Pat. No. 9,373,059B and JP5946045B. Further, in the case of a descriptor (feature quantity) in the related art such as the fingerprint described in JP4564097B, the feature quantities of compounds are not necessarily similar even in a case where the compounds exhibit the same drug efficacy. Further, since the feature quantities did not accurately show the chemical properties of the target structure, the efficiency of search using the feature quantities was low.

As described above, in the related art, feature quantities do not accurately show the chemical properties of the target structures, and thus the efficiency of screening using the feature quantity and creation of a three-dimensional structure is low.

The present invention has been made in consideration of the above-described circumstances, and an object thereof is to provide a feature quantity calculating method, a feature quantity calculating program, and a feature quantity calculating device which enable calculation of a feature quantity accurately showing chemical properties of a target structure. Further, another object of the present invention is to provide a screening method and a screening program which enable efficient screening of a pharmaceutical candidate compound using a feature quantity. Further, still another object of the present invention is to provide a compound creating method which enable efficient creation of a three-dimensional structure of a pharmaceutical candidate compound using a feature quantity.

In order to achieve the above-described object, according to a first aspect of the present invention, there is provided a feature quantity calculating method comprising: a target structure designating step of designating a target structure formed of a plurality of unit structures having chemical properties; and a feature quantity calculating step of calculating a feature quantity obtained by quantifying, in a three-dimensional space, a degree of accumulation of one or more kinds of probes in a periphery of a three-dimensional structure of the target structure and calculating the feature quantity from the target structure using a generator formed through machine learning, in which the probe is a structure in which a plurality of points having a real electric charge and generating a van der Waals force are disposed to be separated from each other.

Since the chemical properties of target structures are exhibited as the result of an interaction between the target structure and one or more kinds of probes in the periphery thereof, the fact that target structures have a similarity in the degree of accumulation of probes indicates that the chemical properties of the target structures are similar. That is, target structures having similar feature quantities calculated according to the first aspect exhibit similar chemical properties. Therefore, according to the first aspect, the feature quantity accurately showing the chemical properties of a target structure can be calculated.

In the first aspect, the "generator" (prediction model, learned model) used for calculating a feature quantity can be constructed by "a method of constructing a generator, including a learning processing step of inputting [a data set for learning using information (three-dimensional images and the like) related to the three-dimensional structures of compounds as teacher data and the feature quantities as explanatory variables for a plurality of compounds] to the generator to perform learning through machine learning". The generator may be constructed using a hierarchical neural network.

In the first aspect, the "point" constituting a probe is different from the mathematical "point" and may have a size (an actual atom, an actual ion, or the like). Further, a virtual point electric charge (one aspect of the "point"), a dipole, or the like may be used as a probe instead of an actual atom or the like. The probe can be selected according to a target compound (target structure).

Further, the feature quantity calculating method according to the first aspect can be performed by a computer realized using one or more of various processors such as a central processing unit (CPU) or a feature quantity calculating device, a feature quantity calculating system, or the like comprising such a computer. The same applies to the feature quantity calculating method, the screening method, and the compound creating method according to each of the following aspects.

In the feature quantity calculating method according to a second aspect, in the first aspect, a compound is designated as the target structure in the target structure designating step, and a first feature quantity which is a feature quantity obtained by quantifying, in the three-dimensional space, a degree of accumulation of amino acids as the probes in the periphery of the three-dimensional structure of the compound is calculated using the generator in the feature quantity calculating step. In the second aspect, the "probe", the "target structure", and the "plurality of unit structures" in the first aspect are respectively an amino acid, a compound, and a plurality of atoms. Further, the number of kinds of amino acids used for quantifying the degree of accumulation is not limited to one, and a peptide in which two or more kinds of amino acids are bound may be used.

Similar to the first aspect, since the drug efficacy of a compound (the binding force with respect to the target protein) is locally exhibited as the result of an interaction between the compound and each amino acid (one aspect of a probe), in a case where the degree of accumulation of amino acids is similar between compounds, the compounds have similar binding forces (with respect to the target proteins). That is, compounds having similar feature quantities (first feature quantities) according to the second aspect exhibit similar drug efficacies. Therefore, according to the second aspect, the feature quantity accurately showing the chemical properties of a compound can be calculated. Further, in the second aspect, a compound such as a biological ligand which has a three-dimensional structure and whose binding to a target protein is known can be designated as a target structure.

In the feature quantity calculating method according to a third aspect, in the first aspect, a pocket structure bound to a pocket that is an active site of a target protein is designated as the target structure in the target structure designating step, and a second feature quantity which is a feature quantity obtained by quantifying, in the three-dimensional space, a degree of accumulation of amino acids as the probes in the periphery of a three-dimensional structure of the pocket structure formed of a plurality of virtual spheres is calculated using the generator in the feature quantity calculating step. In the third aspect, the "probe", the "target structure", and the "unit structure" in the first aspect are respectively an amino acid, a pocket structure, and a plurality of virtual spheres. The "active site" of the target protein indicates a site where the activity of the target protein is promoted or suppressed by binding a pocket structure, and the "virtual sphere" can be considered to have chemical properties such as the van der Waals radius and the electric charge.

Similar to the description of the second aspect, since the pocket structures having similar feature quantities (second feature quantities) according to the third aspect exhibit similar chemical properties, the feature quantity accurately showing the chemical properties of the pocket structure can be calculated according to the third aspect. Further, the pocket structure corresponds to a compound that is bound to a pocket of the target protein. Further, in the third aspect, as the result of actual measurement on the three-dimensional structure of the target protein, simulation based on position information and the like of the pocket can be used for calculation of the second feature quantity. Further, the measuring techniques (for example, an X-ray crystal structure, a nuclear magnetic resonance (NMR) structure, and a cryo-transmission electron microscopy (TEM) structure) are not limited as long as the three-dimensional structure of the target protein is a three-dimensional structure with a resolution that enables identification of each residue of an amino acid.

In the feature quantity calculating method according to a fourth aspect, in the first aspect, a compound is designated as the target structure in the target structure designating step, and a third feature quantity which is a feature quantity obtained by quantifying, in the three-dimensional space, a degree of accumulation of the probes in the periphery of the three-dimensional structure of the compound which is the degree of accumulation using one or more selected from one or more kinds of nucleic acid bases, one or more kinds of lipid molecules, one or more kinds of monosaccharide molecules, water, or one or more kinds of ions formed of a plurality of atoms, as the probes is calculated using the generator in the feature quantity calculating step. In the fourth aspect, the "probe", the "target structure", and the "plurality of unit structures" in the first aspect are respectively one or more kinds of nucleic acid bases (the kind, the number, and the combination thereof may be optional), a compound, and a plurality of atoms.

In the present invention, deoxyribonucleic acid (DNA), ribonucleic acid (RNA), cell membranes, and polysaccharides, which are biopolymers (compounds) other than proteins can be treated as the targets of drugs. In the fourth aspect, the method of calculating the feature quantities of these target compounds is defined, and the probe is not an amino acid but another substance (a building block of each target). Specifically, in a case where the targets are DNA, RNA, cell membranes, and polysaccharides, the probes are respectively set as one or more kinds of nucleic acid bases, one or more kinds of nucleic acid bases, one or more kinds of lipid molecules, and one or more kinds of monosaccharide molecules. Further, water and one or more kinds of ions formed of a plurality of atoms may be considered in a case of the quantification of the degree of accumulation using these as probes. In the same manner as in the first to third aspects described above, since the drug efficacy of a compound (the binding force with respect to the target such as DNA) is locally exhibited as the result of an interaction between a compound and a nucleic acid base or the like (probe), in a case where the degree of accumulation of nucleic acid bases and the like is similar between compounds, the compounds have similar binding forces with respect to the targets. That is, compounds having similar feature quantities (third feature quantities) according to the fourth aspect exhibit similar drug efficacies. Therefore, according to the fourth aspect, the feature quantity accurately showing the chemical properties of a compound can be calculated.

In the first to fourth aspects, an invariant conversion step of converting the feature quantity into an invariant with respect to rotation and translation of the compound may be provided. By converting the feature quantity into an invariant, the feature quantity is easily handled and the data capacity can be reduced. The conversion of the feature quantity into an invariant can be performed by Fourier transform, angular integration of a correlation function, or the like.

In order to achieve the above-described object, according to a fifth aspect of the present invention, there is provided a feature quantity calculating program which causes a computer to execute the feature quantity calculating method according to any one of the first to fourth aspects. The "computer" in the fifth aspect can be realized using one or more of various processors such as a central processing unit (CPU). This "computer" may be a computer comprised in a feature quantity calculating device or a feature quantity calculating system. Further, a non-transitory recording medium on which a computer-readable code of the feature quantity calculating program according to the fifth aspect is recorded can also be exemplified as an aspect of the present invention.

In order to achieve the above-described object, according to a sixth aspect of the present invention, there is provided a feature quantity calculating device comprising: a target structure designation unit which designates a target structure formed of a plurality of unit structures having chemical properties; and a feature quantity calculation unit which calculates a feature quantity obtained by quantifying, in a three-dimensional space, a degree of accumulation of one or more kinds of probes in a periphery of a three-dimensional structure of the target structure and calculating the feature quantity from the target structure using a generator formed through machine learning, in which the probe is a structure in which a plurality of points having a real electric charge and generating a van der Waals force are disposed to be separated from each other. According to the sixth aspect, similarly to the first aspect, the feature quantity accurately showing the chemical properties of the target structure can be calculated. Further, the feature quantity calculating device according to the sixth aspect may perform the feature quantity calculating method according to present invention by reading the code of the feature quantity calculating program according to the present invention using various processors such as a CPU.

In order to achieve the above-described object, according to a seventh aspect of the present invention, there is provided a screening method of extracting a target compound which is bound to a target protein from a plurality of compounds, the method comprising: a storing step of storing a three-dimensional structure of a compound formed of a plurality of atoms and the first feature quantity of the three-dimensional structure of the compound which is calculated using the feature quantity calculating method according to the second aspect in association with each other for each of the plurality of compounds; a feature quantity calculating step of calculating the first feature quantity of a ligand that is a compound whose binding to the target protein has been confirmed using the feature quantity calculating method according to the second aspect; a similarity calculating step of calculating a similarity between the first feature quantity of the plurality of compounds and the first feature quantity of the ligand; and a compound extracting step of extracting the target compound from the plurality of compounds based on the similarity. As the description for the second aspect, in a case where the ligand and the target compound have similar first feature quantities (the feature quantities three-dimensionally quantified), the drug efficacies of both the ligand and the target compound are similar. Therefore, according to the seventh aspect, a target compound having drug efficacy similar to that of the ligand can be extracted based on the first feature quantity so that screening of a pharmaceutical candidate compound can be efficiently performed. Further, a compound that has a similarity satisfying the target value (for example, greater than or equal to the threshold) may be extracted or a compound may be extracted in a descending order of the similarity in the compound extracting step.

In order to achieve the above-described object, according to an eighth aspect of the present invention, there is provided a screening method of extracting a target compound which is bound to a target protein from a plurality of compounds, the method comprising: a storing step of storing a three-dimensional structure of a compound formed of a plurality of atoms and the first feature quantity calculated using the feature quantity calculating method according to the second aspect in association with each other for each of the plurality of compounds; a feature quantity calculating step of calculating the second feature quantity of the pocket structure of the target protein using the feature quantity calculating method according to the third aspect; a similarity calculating step of calculating a similarity between the first feature quantity of the plurality of compounds and the second feature quantity of the pocket structure; and a compound extracting step of extracting the target compound from the plurality of compounds based on the similarity.

As the description for the third aspect, in a case where the pocket structure and the target compound have similar second feature quantities, the chemical properties of both the pocket structure and the target compound are similar. Therefore, according to the eighth aspect, a target compound having chemical properties similar to those of the pocket structure is extracted so that screening of a pharmaceutical candidate compound can be efficiently performed. Since the pocket structure corresponds to the compound that is bound to the target protein, the feature quantity (the second feature quantity) of the pocket structure can be compared with the feature quantity (the first feature quantity) of the compound, and the similarity can be calculated.

In order to achieve the above-described object, according to a ninth aspect of the present invention, there is provided a screening method of extracting a target compound which is bound to a target biopolymer other than a protein from a plurality of compounds, the method comprising: a storing step of storing a three-dimensional structure of a compound formed of a plurality of atoms and the third feature quantity of the three-dimensional structure of the compound which is calculated using the feature quantity calculating method according to the fourth aspect in association with each other for each of the plurality of compounds; a feature quantity calculating step of calculating the third feature quantity of a binding compound that is a compound whose binding to the target biopolymer other than the protein has been confirmed using the feature quantity calculating method according to the fourth aspect; a similarity calculating step of calculating a similarity between the third feature quantity of the plurality of compounds and the third feature quantity of the binding compound; and a compound extracting step of extracting the target compound from the plurality of compounds based on the similarity. As described above for the fourth aspect, according to the present invention, DNA or the like which is a target biopolymer other than a protein can be handled, and in a case where the target compound and the binding compound that is bound to the target biopolymer have similar third feature quantities, the drug efficacies of both the target compound and the binding compound are similar. Therefore, according to the ninth aspect, a target compound having drug efficacy similar to that of the binding compound is extracted based on the third feature quantity so that screening of a pharmaceutical candidate compound can be efficiently performed.

In order to achieve the above-described object, according to a tenth aspect of the present invention, there is provided a screening method comprising: an input step of inputting information related to three-dimensional structures of a plurality of compounds; a feature quantity calculating step of calculating the feature quantity of each of the plurality of compounds using the feature quantity calculating method according to any one of first to fourth aspects based on the information; a characteristic value calculating step of calculating a physical property value indicating a physical property and/or a toxicity value indicating toxicity of each of the plurality of compounds based on the information; and an extracting step of extracting compounds in which a similarity between the feature quantities satisfies a target value and the physical property value and/or the toxicity value satisfies a target value, from the plurality of compounds.

According to the feature quantities of the present invention (the feature quantities calculated by the feature quantity calculating method according to the first to fourth aspects), even in a case where an existing compound has a problem in terms of physical properties and toxicity, the skeleton of the compound can be significantly changed by recreating a novel compound having the same binding force to the target protein or the like (that is, the feature quantities of the novel compound and the existing compound are the same as each other), and thus the possibility of overcoming the problem of the physical properties and the toxicity can be increased. Further, in order to achieve both "maintenance of the binding force" and "avoidance of the problems of physical properties and toxicity", it is effective to combine the feature quantities according to the present invention with indices showing the physical properties and the toxicity. The tenth aspect defines one aspect of the screening method based on such an idea, and compounds in which a similarity between the feature quantities satisfies the target value and the physical property value and/or the toxicity value satisfies the target value are extracted from the plurality of compounds using the feature quantity calculating method according to any one of the first to fourth aspects. Therefore, the screening of the pharmaceutical candidate compound can be efficiently performed.

In the tenth aspect, it is preferable the feature quantities of compounds for which the similarity is determined are calculated according to the same aspect (using the same feature quantity calculating method). The same applies to the eleventh to thirteenth aspects described below.

In order to achieve the above-described object, according to an eleventh aspect of the present invention, there is provided a screening method comprising: an input step of inputting information related to three-dimensional structures of a plurality of compounds; a first feature quantity calculating step of calculating the feature quantity of each of the plurality of compounds using the feature quantity calculating method according to any one of the first to fourth aspects based on the information; a second feature quantity calculating step of calculating a structural feature quantity indicating a compound structure of each of the plurality of compounds based on the information; and an extracting step of extracting compounds in which a similarity between the feature quantities satisfies a target value and a similarity between the structural feature quantities is less than or equal to a threshold, from the plurality of compounds.

In order to ensure that a novel compound obtained by search has a skeleton different from the skeleton of the original (existing) compound serving as the starting point of the search, it is effective to impose a condition that "the feature quantities (according to the present invention) of the original compound and the novel compound are the same as each other, but the structural formulae thereof are different from each other" in a case of the search of the compound. The eleventh aspect defines one aspect of the screening method based on such an idea, and compounds in which a similarity between the feature quantities satisfies the target value and a similarity between the structural feature quantities is less than or equal to the threshold are extracted from the plurality of compounds using the feature quantity calculating method according to any one of the first to fourth aspects. Therefore, the screening of the pharmaceutical candidate compound can be efficiently performed. Further, it is effective to use the index of the similarity between the structural formulae to indicate that "the structural formulae thereof are different from each other", but many known indices which have been suggested can be used as such an index.

In order to achieve the above-described object, according to a twelfth aspect of the present invention, there is provided a screening method comprising: an input step of inputting information related to three-dimensional structures of a plurality of compounds; a feature quantity calculating step of calculating the feature quantity of each of the plurality of compounds using the feature quantity calculating method according to any one of the first to fourth aspects based on the information; a predicting step of predicting a binding force using a prediction model that outputs the binding force between each of the plurality of compounds and another compound based on the feature quantity; and an extracting step of extracting compounds, in which the binding force satisfies a target value, from the plurality of compounds. In the screening method according to the twelfth aspect, compounds in which the binding force satisfies the target value can be efficiently extracted (screening of the pharmaceutical candidate compound can be efficiently performed) by changing the information serving as the starting point of the search to information related to "the prediction model of the binding force based on the feature quantity of the present invention" and "the target value of the binding force (which can be set to be higher than the current value)" from the information related to only the structural formula of one compound.

In order to achieve the above-described object, according to a thirteenth aspect of the present invention, there is provided a screening method comprising: an input step of inputting information related to three-dimensional structures of a plurality of compounds; a setting step of setting a target value of a binding force between each of the plurality of compounds and another compound; an estimating step of estimating the feature quantity corresponding to the target value using a prediction model that outputs the binding force based on the feature quantity calculated by the feature quantity calculating method according to any one of the first to fourth aspects; a feature quantity calculating step of calculating the feature quantity of each of the plurality of compounds using the feature quantity calculating method according to any one of the first to fourth aspects based on the information; and an extracting step of extracting compounds in which a similarity between the calculated feature quantity and the estimated feature quantity is greater than or equal to a threshold, from the plurality of compounds based on the calculation results. In the twelfth aspect described above, the compound satisfying the "target value of the binding force" is extracted by predicting the binding force using the "prediction model". Meanwhile, in the screening method according to the thirteenth aspect, the "prediction model" is used in the opposite manner to that of the twelfth aspect. Specifically, the feature quantity (the feature quantity according to any one of the first to fourth aspects) is estimated from the "target value of the binding force" using the "prediction model" to search a compound having the estimated feature quantity. Even in a case of using such a method, screening of the pharmaceutical candidate compound can be efficiently performed as in the twelfth aspect.

Further, in the twelfth and thirteenth aspects, the "prediction model of the binding force" can be generated from, for example, a set of structural formulae of a plurality of binding compounds and experimental values of the binding force thereof.

In order to achieve the above-described object, according to a fourteenth aspect of the present invention, there is provided a screening program which causes a computer to execute the screening method according to any one of the seventh to thirteenth aspects. The "computer" in the fourteenth aspect can be realized using one or more of various processors such as a CPU. This "computer" may be a computer comprised in a screening device or a screening system. Further, a non-transitory recording medium on which a computer-readable code of the screening program according to the fourteenth aspect is recorded can also be exemplified as an aspect of the present invention.

In order to achieve the object described above, according to a fifteenth aspect of the present invention, there is provided a compound creating method of creating a three-dimensional structure of a target compound that is bound to a target protein from a plurality of compounds, the method comprising: a storing step of storing a three-dimensional structure of a compound formed of a plurality of atoms and the first feature quantity calculated using the feature quantity calculating method according to the second aspect in association with each other for each of the plurality of compounds; a feature quantity calculating step of calculating the first feature quantity of a ligand that is a compound whose binding to the target protein has been confirmed using the feature quantity calculating method according to the second aspect; a generator constructing step of constructing a generator through machine learning using the three-dimensional structures of the plurality of compounds as teacher data and the first feature quantity as an explanatory variable; and a compound three-dimensional structure generating step of generating the three-dimensional structure of the target compound from the first feature quantity of the ligand using the generator.

In the screening methods according to the seventh to thirteenth aspects described above, a compound that is compatible with a ligand or a target protein is found among a plurality of compounds whose structural formulae have already been determined (written down). Accordingly, after the feature quantity of the compound is calculated, a method of extracting the compound based on the similarity with the feature quantity of the separately calculated ligand or the pocket structure of the target protein, that is, a search method is employed. Therefore, in a case where the correspondence between the structural formula of the compound and the feature quantity thereof is recorded, a structural formula having a high similarity (greater than or equal to the threshold) can be found. Meanwhile, in the fifteenth aspect, a structural formula of a compound having a feature quantity similar to the feature quantity (the first feature quantity) of the ligand (accordingly, the drug efficacies are similar) is generated without performing search.

The generation of the structural formula in a case where the feature quantity has been provided can be performed using a generator constructed through machine learning. Specifically, in the fifteenth aspect, a generator is constructed through machine learning (the learning method is not particularly limited) using the three-dimensional structures of the compounds as teacher data and the first feature quantity as an explanatory variable, and a three-dimensional structure of the target compound is generated from the first feature quantity of the ligand using the generator. In the fifteenth aspect, since search is not performed, the three-dimensional structure of the compound can be generated even in a case of "no solution was found as the result of screening search", and thus the three-dimensional structure of the pharmaceutical candidate compound can be efficiently created. Further, the three-dimensional structure to be generated in the fifteenth aspect is affected by the features of the compound provided as teacher data. Therefore, by selecting the features of the compound to be provided as teacher data, a compound having a three-dimensional structure with different features can be generated. For example, a compound having a three-dimensional structure that is easily synthesized can be generated by providing a compound that is easily synthesized as teacher data.

In order to achieve the object described above, according to a sixteenth aspect of the present invention, there is provided a compound creating method of creating a three-dimensional structure of a target compound that is bound to a target protein from a plurality of compounds, the method comprising: a storing step of storing a three-dimensional structure of a compound formed of a plurality of atoms and the first feature quantity calculated using the feature quantity calculating method according to the second aspect in association with each other for each of the plurality of compounds; a feature quantity calculating step of calculating the second feature quantity of the pocket structure of the target protein using the feature quantity calculating method according to the third aspect; a generator constructing step of constructing a generator through machine learning using the three-dimensional structures of the plurality of compounds as teacher data and the first feature quantity as an explanatory variable; and a compound three-dimensional structure generating step of generating the three-dimensional structure of the target compound from the second feature quantity of the pocket structure using the generator. According to the sixteenth aspect, similar to the fifteenth aspect, a structural formula of a compound having a feature quantity similar to the feature quantity (the second feature quantity) of the pocket structure (accordingly, the drug efficacies are similar) is generated without performing search, and thus the three-dimensional structure of the pharmaceutical candidate compound can be efficiently created. Further, similar to the fifteenth aspect, by selecting the features of the compound to be provided as teacher data, a compound having a three-dimensional structure with different features can be generated.

In order to achieve the above-described object, according to a seventeenth aspect of the present invention, there is provided a compound creating method of creating a three-dimensional structure of a target compound that is bound to a target biopolymer other than a protein from a plurality of compounds, the method comprising: a storing step of storing a three-dimensional structure of a compound formed of a plurality of atoms and a third feature quantity in association with each other for each of the plurality of compounds; a feature quantity calculating step of calculating the third feature quantity of a binding compound that is a compound whose binding to the target biopolymer other than the protein has been confirmed using the feature quantity calculating method according to the fourth aspect; a generator constructing step of constructing a generator through machine learning using the three-dimensional structures of the plurality of compounds as teacher data and the third feature quantity as an explanatory variable; and a compound three-dimensional structure generating step of generating the three-dimensional structure of the target compound from the third feature quantity of the binding compound using the generator.

According to the seventeenth aspect, similar to the fifteenth and sixteenth aspects, a structural formula of a compound having a feature quantity similar to the feature quantity (the third feature quantity) of the binding compound (accordingly, the drug efficacies are similar) is generated without performing search, and thus the three-dimensional structure of the pharmaceutical candidate compound can be efficiently created. Further, similar to the fifteenth and sixteenth aspects, by selecting the features of the compound to be provided as teacher data, a compound having a three-dimensional structure with different features can be generated.

As described above, according to the feature quantity calculating method, the feature quantity calculating program, and the feature quantity calculating device of the present invention, it is possible to calculate a feature quantity that accurately shows chemical properties of a target structure. Further, according to the screening method and the screening program of the present invention, screening of a pharmaceutical candidate compound can be efficiently performed. Further, according to the compound creating method of the present invention, the three-dimensional structure of a pharmaceutical candidate compound can be efficiently created.

BRIEF DESCRIPTION OF THE DRAWINGS

FIG. 8 is a table showing an example of a three-dimensional AAM feature quantity.

FIG. 9 is a flowchart showing a procedure for a three-dimensional AAM descriptor for a pocket structure.

FIG. 16 is a flowchart showing a procedure for extracting a target compound based on the similarity between descriptors.

FIG. 18 is another flowchart showing a procedure for extracting a target compound based on the similarity between descriptors.

FIGS. 19A and 19B are other tables showing an example of a result of extracting a target compound based on the similarity between the descriptors.

FIG. 24 is a diagram showing a state of generating a three-dimensional structure using a result of machine learning.

FIG. 25 is a graph showing a relationship between the number of interlayers and the cos similarity.

FIGS. 26A and 26B are diagrams showing an example of generating a three-dimensional structure.

FIG. 33 is a flowchart showing a screening process in a case where the feature quantity according to the present invention and another feature quantity are used in combination.

FIG. 48 is a flowchart showing a process of creating a compound in a case where the feature quantity according to the present invention and another feature quantity are used in combination.

FIG. 66 is a diagram showing an output example of the degree of accumulation of amino acids.

FIG. 67 is another diagram showing an output example of the degree of accumulation of amino acids.

FIG. 74 is a diagram showing the state in which a difference in the degree of accumulation of amino acids is expressed as the similarity.

DESCRIPTION OF THE PREFERRED EMBODIMENTS

Hereinafter, embodiments of a feature quantity calculating method, a feature quantity calculating program, a feature quantity calculating device, a screening method, a screening program, and a compound creating device of the present invention will be described in detail with reference to the accompanying drawings.

First Embodiment

Figure 1:
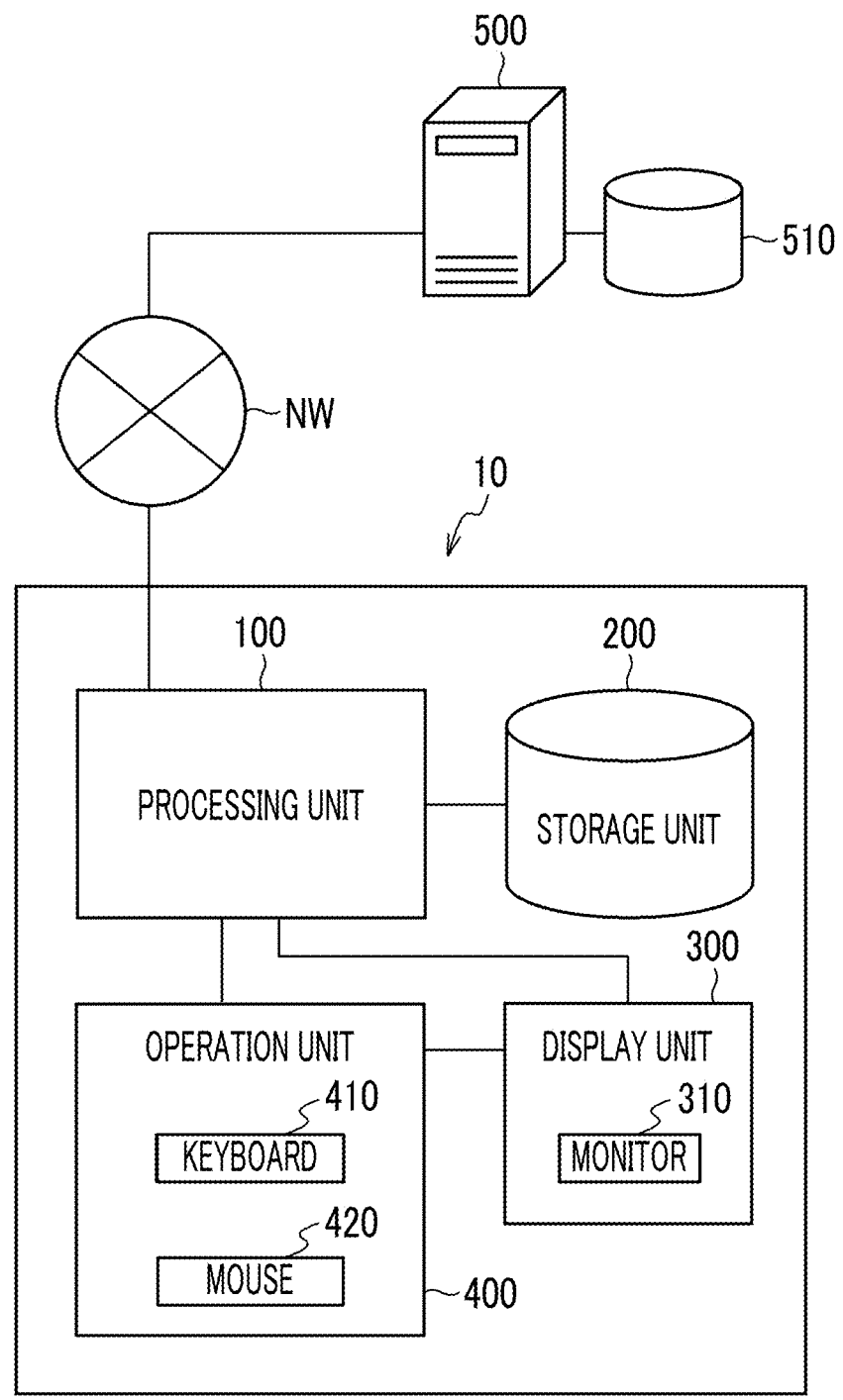
FIG. 1 is a block diagram showing a configuration of a screening device according to a first embodiment.

FIG. 1 is a block diagram showing a configuration of a screening device 10 (a feature quantity calculating device or a screening device) according to a first embodiment. The screening device 10 is a device that calculates a feature quantity of a compound (target structure) and/or a pocket structure (target structure) and extracts (screens) a target compound, and can be realized using a computer. As shown in FIG. 1, the screening device 10 includes a processing unit 100, a storage unit 200, a display unit 300, and an operation unit 400, and these units are connected to one another to transmit and receive necessary information. These constituent elements may be installed by employing various installation forms. Respective constituent elements may be installed in one site (in one housing, one room, or the like) or may be installed in places separated from each other and connected via a network. Further, the screening device 10 is connected to an external server 500 and an external database 510 such as a Protein Data Bank (PDB) via a network NW such as the Internet, and information related to structural formulae of compounds and crystal structures of proteins can be obtained as necessary.

<Configuration of Processing Unit>

Figure 2:
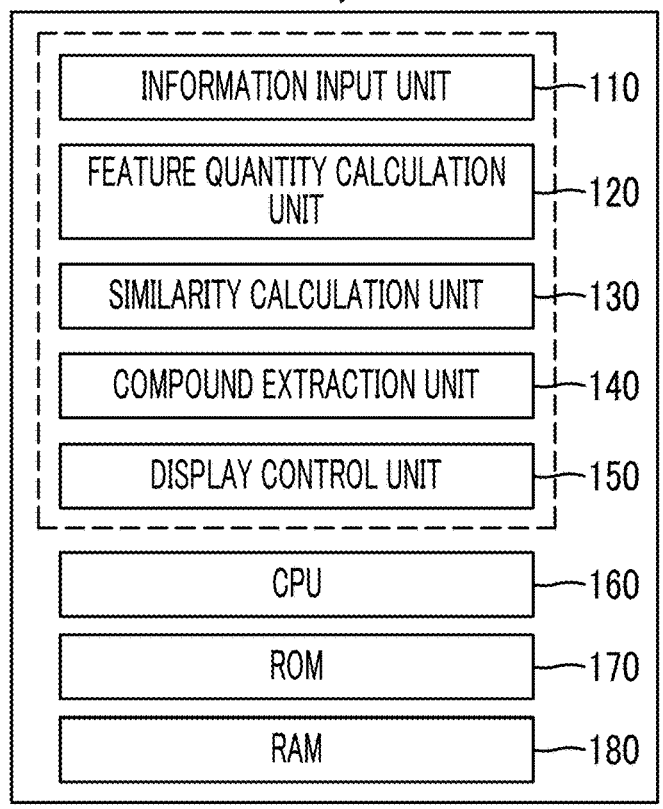
FIG. 2 is a block diagram showing a configuration of a processing unit.

FIG. 2 is a diagram showing a configuration of the processing unit 100. The processing unit 100 includes an information input unit 110, a feature quantity calculation unit 120, a similarity calculation unit 130, a compound extraction unit 140, a display control unit 150, a CPU 160 (CPU: Central Processing Unit), a ROM 170 (ROM: Read Only Memory), and a RAM 180 (RAM: Random Access Memory).

The information input unit 110 inputs information related to a structural formula of a compound, an X crystal structure of a target protein, and a pocket position via a recording medium interface such as a DVD drive (not shown) or a semiconductor memory terminal and/or a network NW. The feature quantity calculation unit 120 (the target structure designation unit, the three-dimensional structure generation unit, the feature quantity calculation unit, and the invariant conversion unit) calculates the feature quantity according to the present invention. The similarity calculation unit 130 (the similarity calculation unit) calculates the similarity between the calculated feature quantities. The compound extraction unit 140 (the compound extraction unit) extracts a target compound from a plurality of compounds based on the similarity. The display control unit 150 controls input information and display of the process result on the monitor 310. The process of calculation of the feature quantity and screening of the target compound using these functions of the processing unit 100 will be described below in detail. Further, the process using these functions is performed under the control of the CPU 160.

The function of each unit of the processing unit 100 described above can be realized using various processors. Various processors include a CPU that is a general-purpose processor that executes software (program) to realize various functions. Further, the various processors described above include a graphics processing unit (GPU) serving as a processor specialized in image processing and a programmable logic device (PLD) serving as a processor that can change the circuit configuration after manufacture of a field programmable gate array (FPGA). Further, the above-described various processors include an exclusive electric circuit serving as a processor having a circuit configuration designed exclusively for executing a specific process such as an application specific integrated circuit (ASIC).

The functions of each unit may be realized by one processor, or may be realized by a plurality of same or different processors (for example, a plurality of FPGAs, a combination of a CPU and an FPGA, or a combination of a CPU and a GPU). Further, a plurality of functions may be realized by one processor. As an example in which a plurality of functions are configured by one processor, first, as represented by a computer such as a client or a server, a form of one processor which is configured by a combination of one or more CPUs and software and can be realized as a plurality of functions is exemplified. Second, as represented by a system-on-chip (SoC) or the like, there is a form in which a processor that realizes the functions of the entire system by one integrated circuit (IC) chip is used. As described above, various functions are configured using one or more of the above-described various processors as a hardware structure. Further, the hardware structure of these various processors is more specifically an electric circuit (circuitry) in which circuit elements such as semiconductor elements are combined.

In a case where the above-described processor or electric circuit executes software (program), a code that can be read by the computer (for example, various processors or electric circuits constituting the processing unit 100, and/or a combination thereof) to execute the software is stored in a non-transitory recording medium such as a ROM 170 (see FIG. 2), and the processor refers to the software. The software stored in the non-transitory recording medium includes the feature quantity calculating method and a program (a feature quantity calculating program and a screening program) for executing a target compound extraction process according to the present invention. The code may be recorded on non-transitory recording media such as various magneto-optical recording devices and semiconductor memories instead of the ROM 170. During the process using software, for example, the RAM 180 is used as a temporary storage area, and the data stored in, for example, an electronically erasable and programmable read only memory (EEPROM) (not shown) can also be referred to.

<Configuration of Storage Unit>

Figure 3:
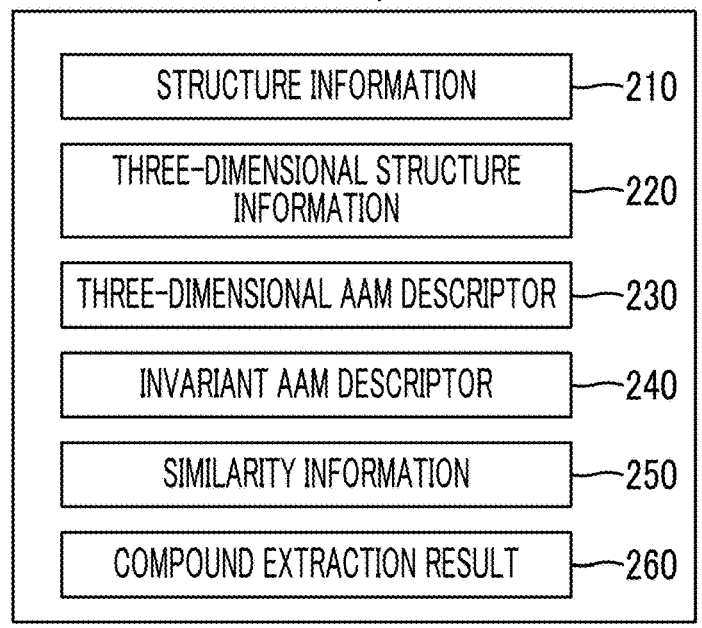
FIG. 3 is a diagram showing information stored in a storage unit.

The storage unit 200 is formed of non-transitory recording media such as a digital versatile disk (DVD), a hard disk, and various semiconductor memories and control units thereof and stores images and information shown in FIG. 3. Structure information 210 includes the structural formula of the compound, the three-dimensional structure of the target protein, and the position of the pocket. Three-dimensional structure information 220 is information related to the three-dimensional structure of the compound and/or the pocket structure generated from the structure information 210. A three-dimensional AAM descriptor 230 is a feature quantity obtained by quantifying, in a three-dimensional space, the degree of accumulation of one or more kinds of amino acids in the periphery of the three-dimensional structure of the compound or the pocket structure, and is calculated according to the feature quantity calculating method described below. Further, "AAM" stands for "Amino Acid Mapping". An invariant AAM descriptor 240 is a feature quantity obtained by converting the three-dimensional AAM descriptor 230 into an invariant with respect to rotation and translation of the compound or the pocket structure. Similarity information 250 is information related to the similarity between the feature quantities, and a compound extraction result 260 is information related to the target compound extracted based on the similarity.

Figure 4:
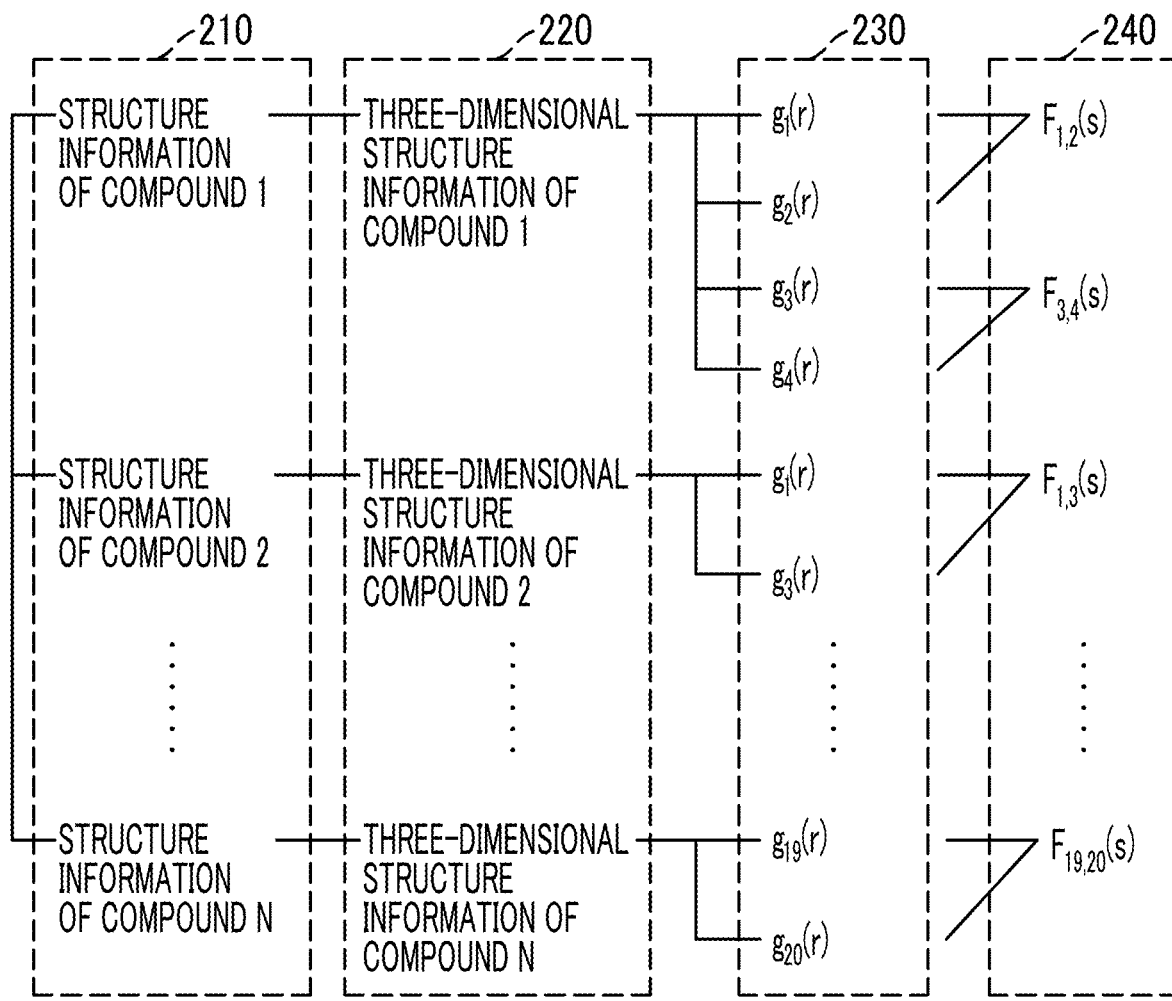
FIG. 4 is a diagram showing a state in which structure information of a compound and a feature quantity thereof are stored in association with each other.

FIG. 4 shows a state in which the structure information 210, the three-dimensional structure information 220, the three-dimensional AAM descriptor 230, and the invariant AAM descriptor 240 are associated with one another and stored in the storage unit 200 for N compounds (N represents an integer of 2 or greater). In FIG. 4, for example, a structural formula can be used as the structure information 210, and a three-dimensionalized structural formula (described below) can be used as the three-dimensional structure information 220. In FIG. 4, the three-dimensional AAM descriptor 230 (described as "$g_a(r)$"; a is a subscript indicating the kind of amino acid) and the invariant AAM descriptor 240 (described as "$F_{ab}(s)$"; a and b are subscripts indicating the kinds of amino acids) corresponding to the three-dimensional AAM descriptor 230 for each of twenty kinds of amino acids for each compound are stored in association with each other. The three-dimensional AAM descriptor 230 and the invariant AAM descriptor 240 may be stored not for all twenty kinds of amino acids but for some amino acids according to the number of descriptors used for screening.

A plurality of sets (libraries) of information as shown in FIG. 4 may be stored in the storage unit 200. FIG. 4 shows a state in which information related to compounds is stored, and information related to target proteins can be stored with the same configuration. Further, a method for calculating a three-dimensional AAM descriptor and/or an invariant AAM descriptor using such structure information and three-dimensional structure information will be described below.

<Configuration of Display Unit and Operation Unit>

The display unit 300 includes the monitor 310 (display device) and can display input images, images and information stored in the storage unit 200, results of the process carried out by the processing unit 100, and the like. The operation unit 400 includes a keyboard 410 and a mouse 420 as an input device and/or a pointing device, and execution of the feature quantity calculating method according to the present invention and the operation required for extraction of the target compounds can be performed by a user through these devices and the screen of the monitor 310 (described later). The operations that can be performed by the user include, for example, a processing mode, the kind of descriptor to be calculated, a descriptor used for screening, and designation of a threshold with respect to the similarity.

<Process in Screening Device>

In the screening device 10 with the above-described configuration, calculation of a feature quantity (descriptor) and/or extraction of a target compound can be performed according to the user's instruction via the operation unit 400. Hereinafter, the details of each process will be described.

<Calculation of Feature Quantity>

The screening device 10 is capable of calculating a three-dimensional AAM descriptor and/or an invariant AAM descriptor according to the user's instruction via the operation unit 400.

<Calculation of Three-Dimensional AAM Descriptor for Compound>

Figure 5:
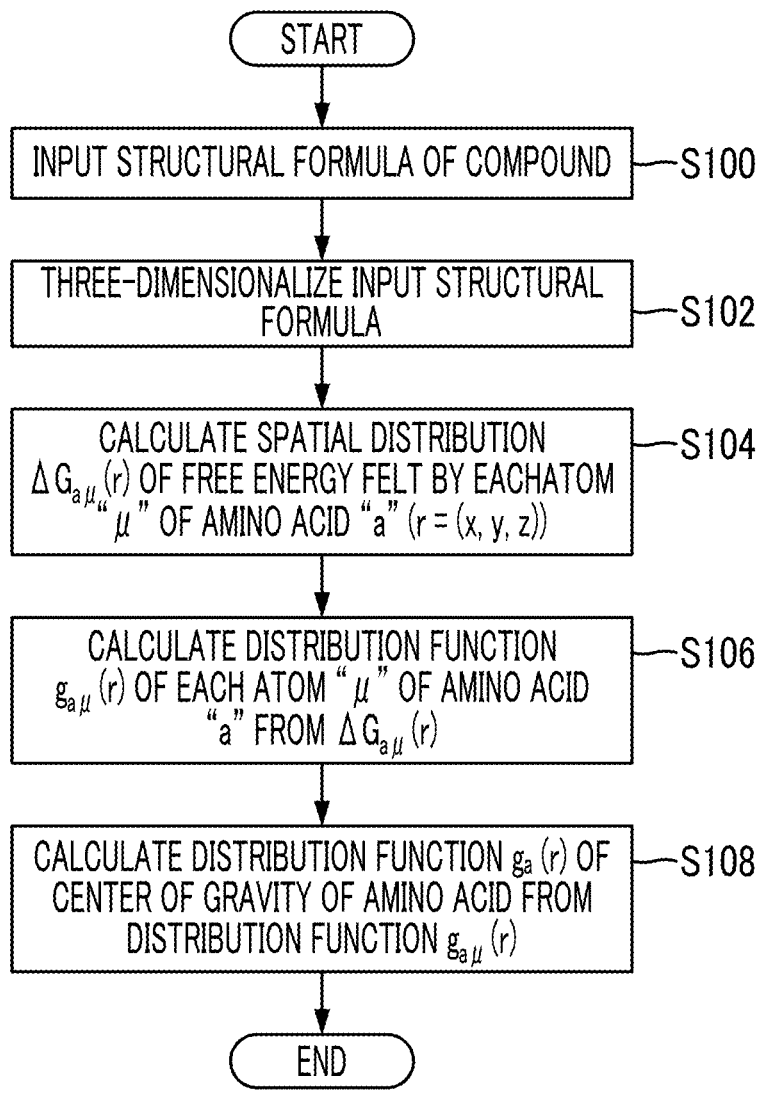
FIG. 5 is a flowchart showing a procedure for calculating a three-dimensional AAM feature quantity of a compound.

FIG. 5 is a flowchart showing a procedure for calculating a three-dimensional AAM descriptor for a compound (target structure). The ligand is a compound whose binding to the target protein has been confirmed, and the three-dimensional AAM descriptor can be calculated according to the procedure of FIG. 5. In Step S100, the information input unit 110 inputs a structural formula of a compound according to an operation by the user. In this manner, the compound represented by the input chemical formula is designated as the target structure (target structure designating step).

Figure 6A:
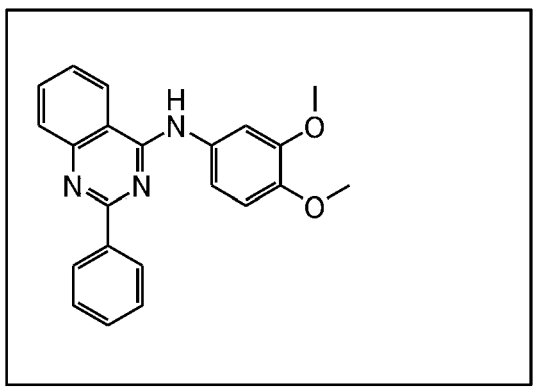
FIGS. 6A and 6B are diagrams showing an example of three-dimensionalization of a structural formula.
Figure 6B:
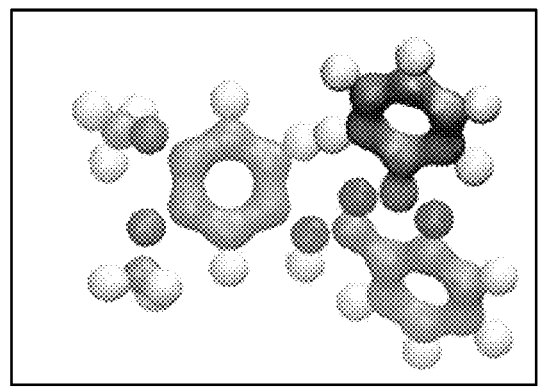

The feature quantity calculation unit 120 three-dimensionalizes the input structural formula to generate a three-dimensional structure of a compound formed of a plurality of atoms (a plurality of unit structures having chemical properties) (Step S102: a three-dimensional structure generating step). Various methods are known for three-dimensionalization of a structural formula, and the present invention is not particularly limited to the method used in Step S102. FIGS. 6A and 6B show an example of a three-dimensionalized structural formula. FIG. 6A shows an input structural formula and FIG. 6B shows a three-dimensionalized structural formula.

The feature quantity calculation unit 120 calculates a spatial distribution $\Delta G_{a\mu}(r)$ of free energy felt by each atom "$\mu$" of an amino acid "a" (a represents a number representing the kind of amino acid; 1 to 20) (Step S104; feature quantity calculating step). As a method of calculating $\Delta G_{a\mu}(r)$, a molecular dynamics (MD) method can be employed, but the present invention is not limited thereto. The amino acid for calculating the feature quantity may be a predetermined kind of amino acid or may be determined according to the user's instruction (one or more kinds of amino acids may be used, and a plurality of kinds of amino acids may also be used).

The feature quantity calculation unit 120 calculates a distribution function $g_{a\mu}(r)$ of each atom "$\mu$" of the amino acid "a" from $\Delta G_{a\mu}(r)$ (Step S106: feature quantity calculating step). $g_{a\mu}(r)$ is represented by Equation (1) in a case where T is set as room temperature and $K_B$ is set as a Boltzmann constant.

$$g_{a\mu}(r)=\exp(-\Delta G_{a\mu}(r)/K_B T) \quad (1)$$

The feature quantity calculation unit 120 calculates a distribution function $g_a(r)$ of the center of gravity of an amino acid from the distribution function $g_{a\mu}(r)$ (Step S108: feature quantity calculating step). For the calculation, $g_{a\mu}(r)$ is geometrically averaged for each atom "$\mu$". This distribution function $g_a(r)$ is a three-dimensional AAM descriptor obtained by quantifying, in a three-dimensional space, the degree of accumulation of one or more kinds of amino acids "a" in the periphery of the three-dimensional structure of the compound. The feature quantity calculation unit 120 stores the calculated three-dimensional AAM descriptor in the storage unit 200 as the three-dimensional AAM descriptor 230 in association with the structure information (structure information 210) and the three-dimensional structure information (three-dimensional structure information 220) of the compound. (See FIG. 4).

Figure 7A:
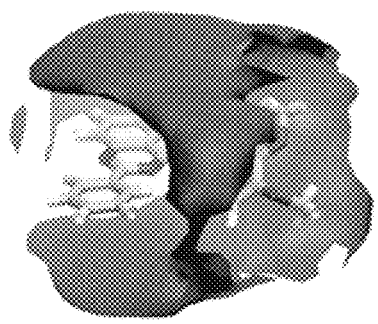
FIGS. 7A and 7B are diagrams showing an example of a three-dimensional AAM feature quantity.
Figure 7B:
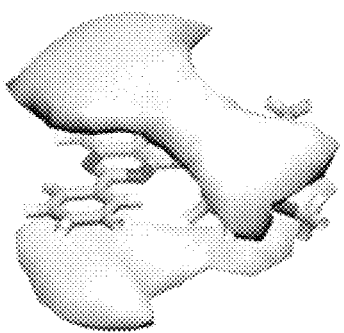

FIGS. 7A and 7B are an example of a three-dimensional AAM descriptor of the compound shown in FIGS. 6A and 6B. FIG. 7A shows a three-dimensional AAM descriptor of alanine, and FIG. 7B shows a three-dimensional AAM descriptor of valine. In FIGS. 7A and 7B, the dark region is a region where the degree of accumulation of amino acids (existence probability) is high. FIG. 8 is a table showing another example of the three-dimensional AAM descriptor of the compound shown in FIGS. 6A and 6B, and the three-dimensional AAM descriptor is shown in a direction 1, a direction 2, and a direction 3 (the first, second, and third rows of the table, respectively) which are different from one another. The left columns of the table show the three-dimensional AAM descriptor (the level surface with respect to the threshold), and the right columns of the table show the three-dimensional AAM descriptor (the level surface with respect to the threshold) and the three-dimensional structure of the compound.

<Calculation of Three-Dimensional AAM Descriptor for Pocket Structure>

Figure 10A:
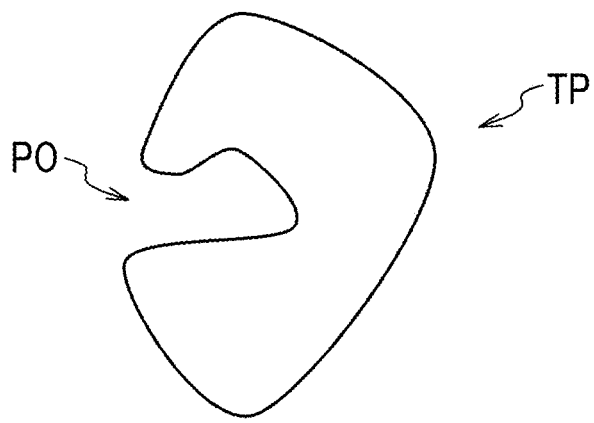
FIGS. 10A to 10C are conceptual views showing a state of a three-dimensional AAM descriptor for a pocket structure.
Figure 10B:
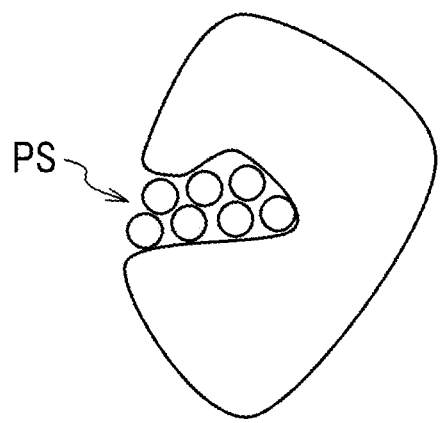
Figure 10C:
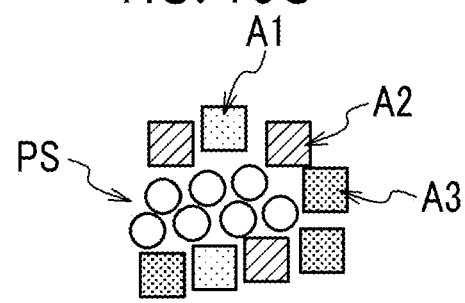

In the screening device 10, a pocket structure that is bound to a target protein instead of a compound is designated as a target structure, and the feature quantity (the three-dimensional AAM descriptor) of this pocket structure can be calculated. The pocket structure is a target structure that is bound to a pocket, which is an active site of the target protein, and the "active site" indicates a site where the activity of the target protein is promoted or suppressed by the binding of the pocket structure. FIG. 9 is a flowchart showing a procedure for calculating the three-dimensional AAM descriptor for the pocket structure. FIGS. 10A to 10C are conceptual views showing a state of the three-dimensional AAM descriptor for the pocket structure.

In the flowchart of FIG. 9, the information input unit 110 inputs the actual measurement of the three-dimensional structure of the target protein and the position information of the pocket (Step S200: target structure designating step). FIG. 10A shows a pocket PO in a target protein TP. The pocket structure is designated as the target structure by the process of Step S200.

The feature quantity calculation unit 120 packs a plurality of virtual spheres (a plurality of unit structures having chemical properties) into the pocket of the target protein (Step S202: the target structure designating step or the three-dimensional structure generating step). The "virtual sphere" can be considered to have chemical properties such as a van der Waals radius and an electric charge, and "packing the virtual spheres" can be performed by simulation (for example, a molecular dynamics method). A collection of the packed virtual spheres (three-dimensional structure) can be obtained as a three-dimensional structure of the pocket structure (target structure) in Step S202 (Step S204: three-dimensional structure generating step). FIG. 10B shows an example of a pocket structure PS of the target protein TP.

The feature quantity calculation unit 120 three-dimensionally quantifies the degree of accumulation of one or more kinds of amino acids in the periphery of the pocket structure using actual measurement of the three-dimensional structure of the target protein (Step S206: feature quantity calculating step). Practically, it is possible to read out what kinds of amino acids are accumulated in the periphery of the pocket structure. FIG. 10C shows that three kinds of amino acids A1, A2, and A3 are accumulated in the periphery of the pocket structure PS. Further, the number of amino acids for quantifying the degree of accumulation may be one or more (a plurality of kinds of amino acids may be used). In addition, a predetermined kind of amino acid may be quantified or an amino acid which has been set according to the operation of the user may be quantified. The feature quantity calculation unit 120 stores the calculated three-dimensional AAM descriptor in the storage unit 200 as the three-dimensional AAM descriptor 230 in association with the structure information (structure information 210) and the three-dimensional structure information (three-dimensional structure information 220) of the compound (see FIGS. 3 and 4; the storing step). In a case where the invariant AAM descriptor described below has been calculated, the feature quantity calculation unit 120 associates the three-dimensional AAM descriptor with the invariant AAM descriptor.

<Conversion of Three-Dimensional AAM Descriptor into Invariant>

The above-described three-dimensional AAM descriptor indicates the degree of three-dimensional accumulation of amino acids. However, in a case where shift or rotation of the center of gravity occurs even though the compounds are the same as each other, the value changes and the data capacity is large because the information is three-dimensional information. Therefore, in the screening device 10 according to the first embodiment, "an invariant AAM descriptor obtained by converting the three-dimensional AAM descriptor into an invariant with respect to rotation and translation of the compound" (the invariant feature quantity) can be calculated in addition to or instead of the three-dimensional AAM descriptor. Further, conversion into an invariant can be performed according to the same procedures in both cases of a compound and a pocket structure. In a case where a three-dimensional AAM descriptor of a compound is used, an invariant AAM descriptor of the compound is obtained. Further, in a case where a three-dimensional AAM descriptor of the pocket structure is used, an invariant AAM descriptor of the pocket structure is obtained.

The feature quantity calculation unit 120 (invariant conversion unit) calculates $f_a(k)$ using Fourier transform as shown in Equation (2) (invariant conversion step). As described above, "a" is a subscript (1 to 20) indicating the kind of amino acid. Further, "i" is an imaginary unit.

$$f_a(k) = \int d^3 r (g_a(r) - 1) e^{ikr} \tag{2}$$

The feature quantity calculation unit 120 is capable of calculating $F_{ab}(s)$ (invariant feature quantity) that is an invariant AAM descriptor using the $f_a(k)$ according to Equation (3) (invariant conversion step). In Equation (3), an invariant AAM descriptor is calculated by angular integration of a correlation function using three-dimensional AAM descriptors ($g_a(r)$ and $g_b(r)$) of two different kinds of amino acids (denoted by "a" and "b"). Further, the combination of the two kinds of amino acids used for calculation of the invariant AAM descriptors among twenty kinds of amino acids is not particularly limited.

$$F_{ab}(s) = \int d^3 k f_a(-k) f_b(+k) \delta(k^2 - s) \tag{3}$$

In Equation (3), a delta function is used for conversion into an invariant. However, as shown in Equation (4), conversion into an invariant can be performed using an optional function ($h(k^2-s)$).

$$F_{ab}(s) = \int d^3 k f_a(-k) f_b(+k) h(k^2 - s) \tag{4}$$

Figure 11A:
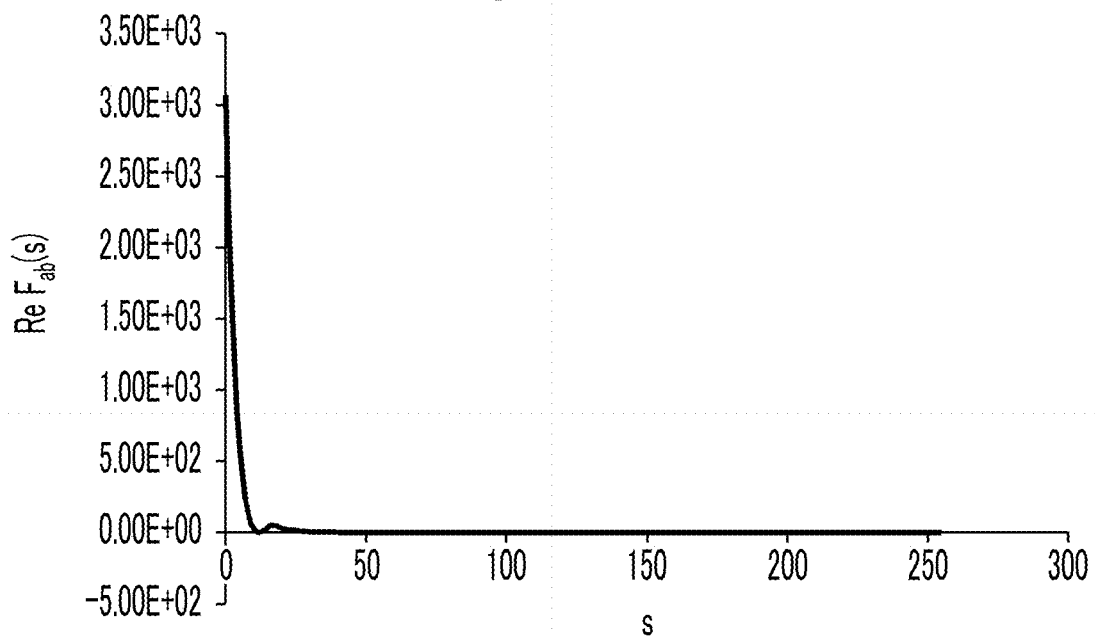
FIGS. 11A and 11B are graphs showing an example of an invariant AAM descriptor.
Figure 11B:
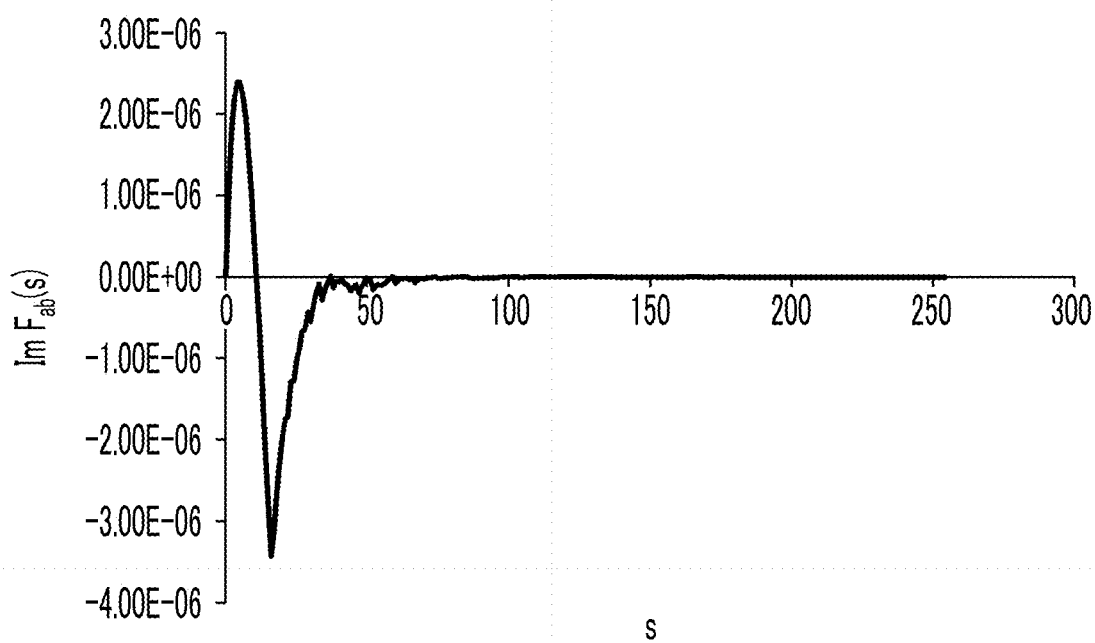

FIGS. 11A and 11B show an example of the invariant AAM descriptor calculated in the above-described manner. FIG. 11A shows a real part of $F_{12}(s)$ (an invariant AAM descriptor of amino acids 1 and 2), which is an invariant AAM descriptor, and FIG. 11B shows an imaginary part. In this manner, the conversion into an invariant can be performed while information related to the interaction between amino acids is maintained by performing conversion into an invariant using a three-dimensional AAM descriptor of two different kinds of amino acids so that compound comparison (drug efficacy determination) based on the feature quantities (the invariant feature quantities) can be accurately performed.

The feature quantity calculation unit 120 stores the calculated invariant AAM descriptor in the storage unit 200 as the invariant AAM descriptor 240 in association with the structure information (structure information 210), the three-dimensional structure information (three-dimensional structure information 220), and the original three-dimensional AAM descriptor 230 of the compound (see FIGS. 3 and 4; the storing step). In the first embodiment, since the invariant AAM descriptor is calculated using the three-dimensional AAM descriptor of two different kinds of amino acids, a plurality of associations between the three-dimensional AAM descriptor and the invariant AAM descriptor may be present.

<Evaluation of Effectiveness of Invariant AAM Descriptor>

The effectiveness of the invariant AAM descriptor calculated by the above-described process will be described.

<Example of Activity of Compound Having Similar Invariant AAM Descriptor>

Figure 12A:
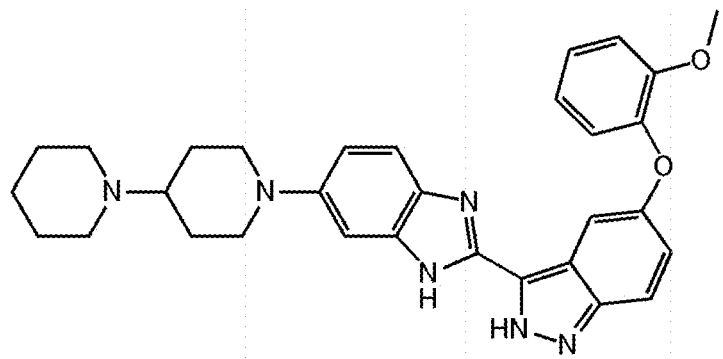
FIGS. 12A and 12B show an example of compounds with similar invariant AAM descriptors.
Figure 12B:
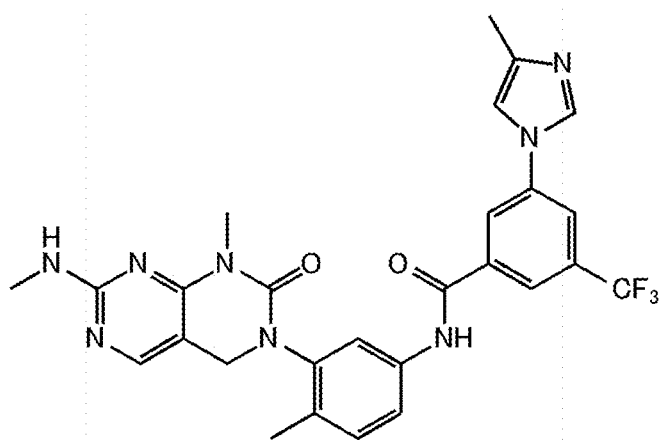

FIG. 12A shows a structural formula of a ligand for a protein ABL1 (an example of a target protein). The binding force of this ligand is at a level of 1 µM with an IC50 (50% inhibitory concentration). Meanwhile, FIG. 12B shows a structural formula of a compound having almost the same invariant AAM descriptor as that of the ligand. In a case where the activity of this compound is actually measured, the activity is at the same level as that of the ligand. That is, FIGS. 11A and 11B are an example showing that compounds having similar invariant AAM descriptors have similar drug efficacies. As described above, according to the first embodiment, a feature quantity (invariant AAM descriptor) accurately showing the chemical properties of the target structure can be obtained. Further, the index or unit indicating the strength of the binding force can be classified into two parts. One relates to the binding energy, and kJ/mol and kcal/mol are used as the units. The other one relates to IC50 or Kd (binding dissociation constant) described above, and the concentration M (=mol/L; molar) is used as the unit.

<Easiness of Finding Hits>

The easiness of finding hits using invariant AAM descriptors is evaluated according to the following procedures 1 to 5.

(Procedure 1) X hit compounds and Y non-hit compounds are mixed with a certain protein (target protein).
(Procedure 2) Invariant AAM descriptors of all (X+Y) compounds are calculated.
(Procedure 3) The similarity of each descriptor is calculated.
(Procedure 4) The (X+Y) compounds are divided into teams based on the similarities of the invariant AAM descriptors.
(Procedure 5) It is checked whether the teams in which hits are collected are mechanically generated.

As a result of division of 10,933 compounds having 183 hits (a hit content of 1.6%) for the protein ABL1 (kinase) into teams by according to the above-described procedures, the number of teams is 221. A certain team contains 16 hits and 14 other compounds, and the hit content is 53.3%. Further, this team also contains the compound shown in FIG. 12A and the compound shown in FIG. 12B. However, in a case where the fingerprint, which is a descriptor of the related art, is used, the similarity of these compounds is 25%. It is recognized as not being a hit even though it is a hit originally. As described above, in a case where the invariant AAM descriptor according to the first embodiment of the present invention is used in the above-described team, it was found that hits which are not collected in a case of using the fingerprint belong to the same team.

Figure 13:
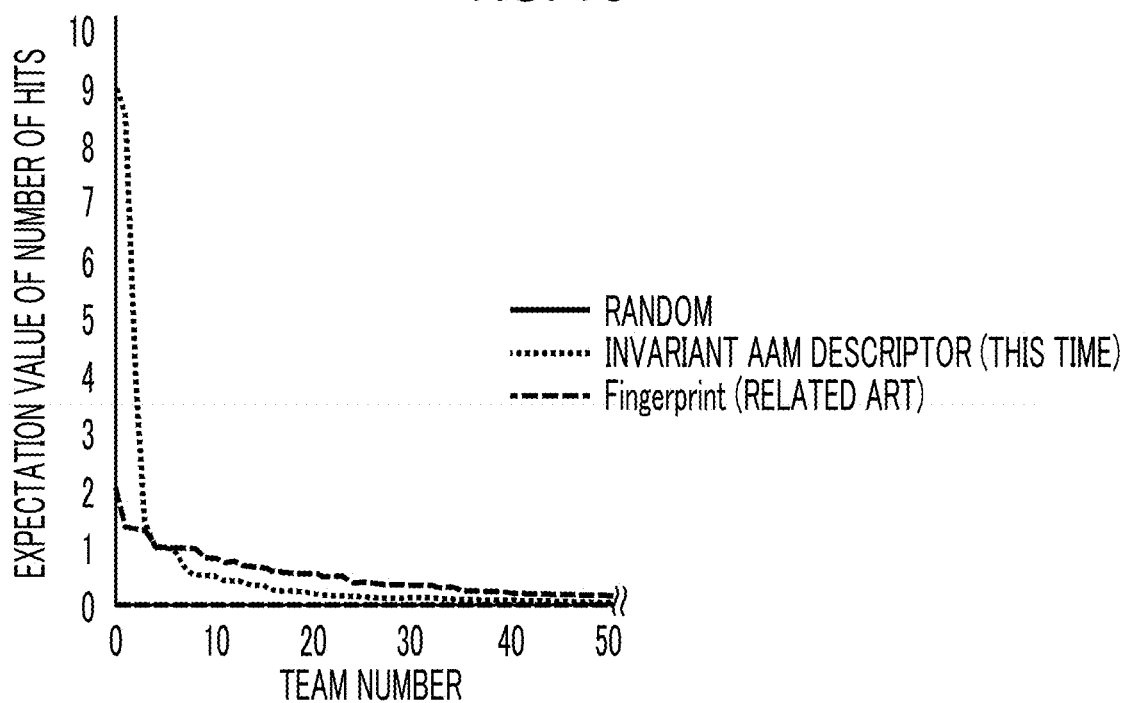
FIG. 13 is a graph showing easiness of finding a hit in a case where an invariant AAM descriptor is used.

FIG. 13 shows the results of acquiring the easiness of finding hits (=expectation value; number of hits×hit content) for each of the 221 teams described above. For comparison, the result obtained in a case where the teams are randomly divided and the result obtained in a case where teams are divided using the fingerprint are shown. Based on these results, it was found that in a case where the invariant AAM descriptor is used for the above-described compound group, teams having hits more than the hits of the randomly divided teams or the teams divided using the fingerprint are generated. In FIG. 13, the team numbers vary depending on the team division method (random, the invariant AAM descriptor, the fingerprint), and thus the superiority of the team division is determined not by comparing the expectation values with the same team number but by verifying "whether teams with high expectation values (having more hits) are included or not".

<Hit Search Time (Part 1)>

Figure 14:
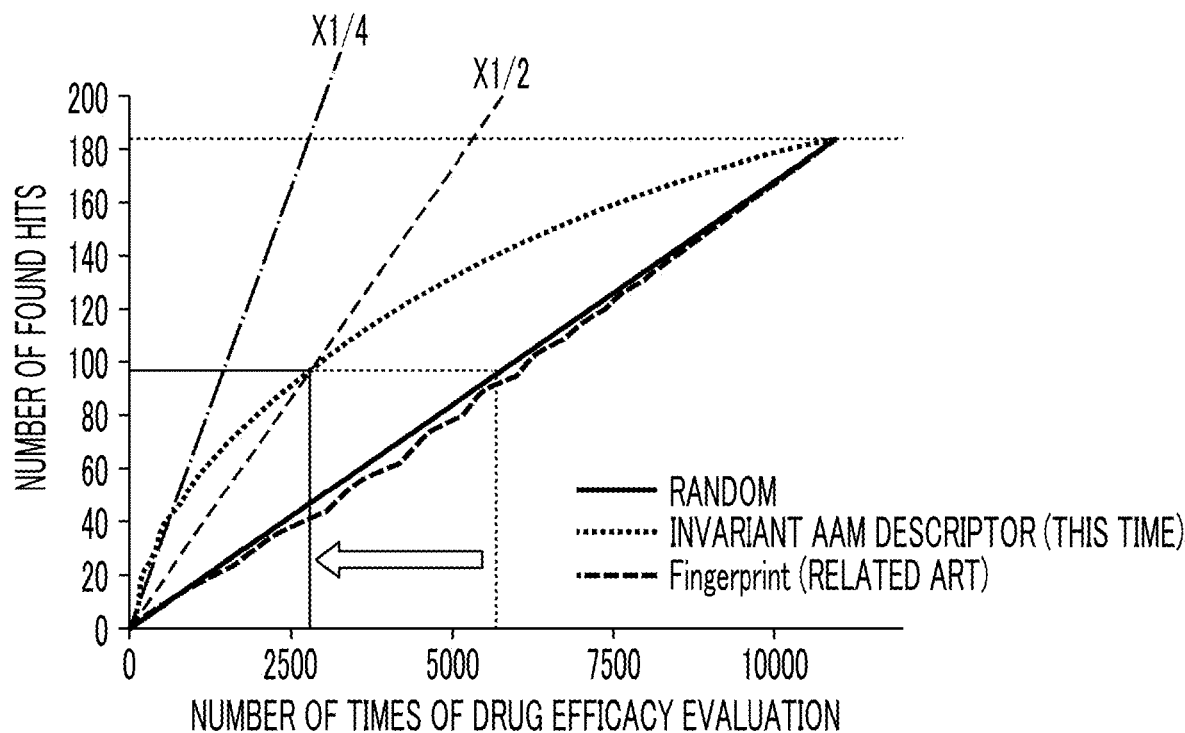
FIG. 14 is a graph showing the time of search for a hit in a case where an invariant AAM descriptor is used.

FIG. 14 is a graph showing simulation results of Importance Sampling for the above-described compound group. In a case where the invariant AAM descriptor according to the first embodiment is used, the hit search time (the number of times of drug efficacy evaluations for finding the number of same hits) compared with a case of the random team division is reduced to approximately one-half in a case of 50% search and reduced to one-fourth in a case of 25% search. Meanwhile, in a case of the team division using the fingerprint, the hit search time is not shortened. Further, the simulation of the Importance Sampling here indicates a method of providing variables showing the priority for each team and collecting more hits with a smaller number of times of measurements while updating the variables such that the priority of the team from which hits have found is raised and the priority of the team that does not have hits is lowered for each measurement. FIG. 14 shows an example in which an NB method (NB: Naive Bayes), which is a kind of machine learning method is used for controlling the priority, but the present invention is not limited thereto.

<Hit Search Time (Part 2)>

Figure 15:
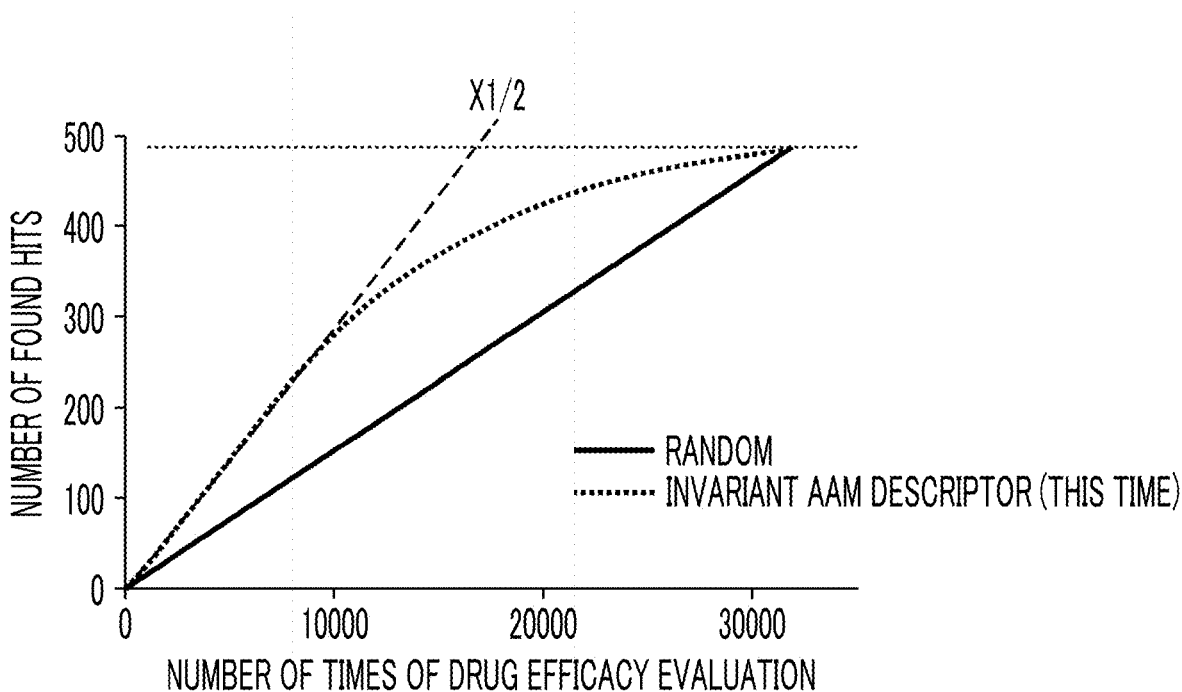
FIG. 15 is another graph showing the time of search for a hit in a case where an invariant AAM descriptor is used.

FIG. 15 shows a simulation result of Importance Sampling for 32,464 compounds (having 483 hits) for a protein AA2AR, similar to the case of (part 1). The protein AA2AR is a membrane protein from which an X-ray crystal structure is difficult to obtain, but the hit search time is reduced to approximately one-half in a case of 50% search even with such a membrane protein.

According to the invariant AAM descriptor described above, since compounds having similar descriptors exhibit similar drug efficacies (binding to a target protein), the chemical properties of the target structure (a compound or a pocket structure) are accurately exhibited. According to the invariant AAM descriptor in which the three-dimensional AAM descriptor is converted into an invariant, the feature quantity is easily handled and the data capacity can be easily reduced while comparison (determination of the drug efficacy) of compounds based on the descriptor is accurately performed by performing conversion into an invariant using the three-dimensional AAM descriptor of two kinds of different amino acids. Further, according to the invariant AAM descriptor, hits are easily found, and the search can be sped up.

<Effects of Feature Quantity Calculating Method and Feature Quantity Calculating Program>

As described above, the screening device 10 according to the first embodiment is capable of calculating the feature quantity (the three-dimensional AAM descriptor or the invariant AAM descriptor) accurately showing the chemical property of the target structure using the feature quantity calculating method and the feature quantity calculating program according to the embodiment of the present invention.

<Extraction of Target Compound (Screening)>

Extraction of a target compound (pharmaceutical candidate compound) from a plurality of compounds using the above-described three-dimensional AAM descriptor and invariant AAM descriptor will be described. A target compound is extracted in a mode (first mode) in which the extraction is carried out based on the descriptor (the three-dimensional AAM descriptor or the invariant AAM descriptor) of the ligand or in a mode (second mode) in which the extraction is carried out based on the descriptor (the three-dimensional AAM descriptor or the invariant AAM descriptor) of the pocket structure of the target protein. The mode for extraction can be selected from the above-described modes according to the operation of the user via the operation unit 400.

<Screening of Ligand Input>

FIG. 16 is a flowchart showing a procedure for screening using a three-dimensional AAM descriptor of a ligand. After the start of the process, the feature quantity calculation unit 120 calculates a three-dimensional AAM descriptor of the ligand (Step S300: the feature quantity calculating step). Since the ligand is a compound whose binding to the target protein has been confirmed, the three-dimensional AAM descriptor in Step S300 can be calculated according to the procedure shown in the flowchart of FIG. 5.

As described above with reference to FIG. 4, in the screening device 10, the three-dimensional structure of the compound formed of a plurality of atoms and the three-dimensional AAM descriptor corresponding to the three-dimensional structure are stored in the storage unit 200 in association with each other for each of the plurality of compounds. The similarity calculation unit 130 calculates the similarity between the three-dimensional AAM descriptor of the compound and the three-dimensional AAM descriptor of the ligand calculated in Step S300 (Step S302: the similarity calculating step). After the calculation of the similarity, the compound extraction unit 140 extracts the target compound based on the similarity (Step S304: the target compound extracting step). As described above, in a case where three-dimensional AAM descriptors are similar, since similar drug efficacies (binding to the target protein) are exhibited, a compound having drug efficacy similar to that of the ligand (that is, a target compound serving as a pharmaceutical candidate) can be extracted by using the similarity of the three-dimensional AAM descriptor. Further, the extraction of the target compound based on the similarity (Step S304) can be specifically performed by "extracting a compound having a similarity greater than or equal to the threshold" or "extracting a compound in a descending order of the similarity".

FIG. 16 shows the procedure for screening using a three-dimensional AAM descriptor, but the screening using an invariant AAM descriptor can also be performed in the same procedure as described above. Specifically, the feature quantity calculation unit 120 calculates the invariant AAM descriptor (the invariant feature quantity) of the ligand according to the procedure of FIG. 5 and Equations (2) and (3), and the similarity calculation unit 130 calculates the similarity between the compound stored in the storage unit 200 and the invariant AAM descriptor. After the calculation of the similarity, the compound extraction unit 140 extracts the target compound based on the similarity. Specifically, the target compound can be extracted based on the similarity in the same manner as the extraction of the three-dimensional AAM descriptor.

Figures 17A, 17B:
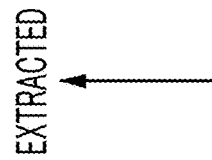
FIGS. 17A and 17B are tables showing an example of a result of extracting a target compound based on the similarity between descriptors.

FIGS. 17A and 17B are tables showing an example of a screening result of ligand input. FIG. 17A shows the result in a case of "extraction of a compound having a similarity greater than or equal to the threshold" using a three-dimensional AAM descriptor, and FIG. 17B shows the result in a case of "extraction of a compound in a descending order of the similarity" using an invariant AAM descriptor. Further, in FIG. 17A, the compound is extracted based on a three-dimensional AAM descriptor ($g_1(r)$) of the amino acid 1, but the compound may be extracted based on the three-dimensional AAM descriptor (for example, $g_2(r)$) of other amino acids (amino acids 2 to 20). In addition, the similarities (the similarity between the values of $g_1(r)$ and the similarity between the values of $g_2(r)$) of a plurality of three-dimensional AAM descriptors (for example, $g_1(r)$ and $g_2(r)$) of different amino acids are respectively calculated, and compounds may be extracted based on the results. The number of kinds of the three-dimensional AAM descriptors used for extraction of a compound may be one, but extraction of a compound based on the similarity can be accurately performed using a plurality of kinds of three-dimensional AAM descriptors. Further, in a case where a plurality of kinds of three-dimensional AAM descriptors are used, the combination of amino acids among the descriptors is not particularly limited (for example, a combination of $g_1(r)$ and $g_2(r)$ or a combination of $g_3(r)$ and $g_4(r)$ may be used).

Similarly, in FIG. 17B, a compound is extracted based on an invariant AAM descriptor ($F_{12}(s)$) of the amino acids 1 and 2, but the combination of amino acids used for calculation of the invariant AAM descriptor may vary (for example, $F_{34}(s)$ with amino acids 3 and 4). Further, a compound may be extracted based on a plurality of invariant AAM descriptors (for example, $F_{12}(s)$ and $F_{34}(s)$) with different combinations of amino acids (for example, the similarity between the values of $F_{12}(s)$ and the similarity between the values of $F_{34}(s)$ are used). The number of kinds of the invariant AAM descriptors used for extraction of a compound may be one, but extraction of a compound based on the similarity can be accurately performed using a plurality of kinds of invariant AAM descriptors. Further, in a case where a plurality of kinds of invariant AAM descriptors are used, the combination of amino acids among the descriptors is not particularly limited (for example, a combination of $F_{12}(s)$ and $F_{34}(s)$ or a combination of $F_{12}(s)$ and $F_{13}(s)$ may be used). The processing unit 100 (the feature quantity calculation unit 120, the similarity calculation unit 130, and the compound extraction unit 140) may determine which amino acid is to be used for calculation of the descriptor and the similarity according to the user's instruction via the operation unit 400, but the determination may be made by the processing unit 100 regardless of the user's instruction.

Further, the threshold of the similarity is set to 80% in FIG. 17A, and the number of times of extraction is set to 100 in FIG. 17B, but these values are merely examples. The threshold and the number of times of extraction can be set according to the conditions, for example, the accuracy of screening. The setting can be performed in response to a user input via the operation unit 400. Further, "a compound may be extracted in a descending order of the similarity" in a case where a three-dimensional AAM descriptor is used in contrast to FIGS. 17A and 17B, and "a compound having a similarity greater than or equal to the threshold may be extracted" in a case where an invariant AAM descriptor is used. The compound extraction unit 140 stores the extraction result as shown in FIGS. 17A and 17B in the storage unit 200 as the compound extraction result 260 (see FIG. 3).
<Screening of Target Protein Input>

FIG. 18 is a flowchart showing a procedure for screening of a pocket structure of a target protein using a three-dimensional AAM descriptor. After the start of the process, the feature quantity calculation unit 120 calculates a three-dimensional AAM descriptor of the pocket structure of the target protein (Step S400: the feature quantity calculating step). The three-dimensional AAM descriptor in Step S400 can be calculated according to the procedure shown in the flowchart of FIG. 9. The similarity calculation unit 130 calculates the similarity between the three-dimensional AAM descriptor of the compound and the three-dimensional AAM descriptor of the pocket structure calculated in Step S400 (Step S402: the similarity calculating step). After the calculation of the similarity, the compound extraction unit 140 extracts the target compound based on the similarity (Step S404: the target compound extracting step). Similar to the case of the ligand input described above, the extraction of the target compound based on the similarity (Step S404) can be specifically performed by "extracting a compound having a similarity greater than or equal to the threshold" or "extracting a compound in a descending order of the similarity".

Even in a case of using the invariant AAM descriptor, a target compound can be extracted according to the same procedure as in the flowchart of FIG. 18.

FIGS. 19A and 19B are tables showing an example of a screening result of target protein input. FIG. 19A shows the result in a case of "extraction of a compound having a similarity greater than or equal to the threshold" using a three-dimensional AAM descriptor, and FIG. 19B shows the result in a case of "extraction of a compound in a descending order of the similarity" using an invariant AAM descriptor. The threshold of the similarity and the number of times of extraction can be set according to the conditions, for example, the accuracy of screening. The setting can be performed in response to a user input via the operation unit 400. Further, "a compound may be extracted in a descending order of the similarity" in a case where a three-dimensional AAM descriptor is used in contrast to FIGS. 19A and 19B, and "a compound having a similarity greater than or equal to the threshold may be extracted" in a case where an invariant AAM descriptor is used.

In a case of screening for the target protein input, the kind of amino acid may be changed in the same manner as in the case of screening for the ligand input (see FIGS. 17A and 17B and the description of these tables), or a plurality of descriptors of different amino acids (the three-dimensional AAM descriptor and the invariant AAM descriptor) may be used. The number of kinds of the descriptors used for extraction of a compound may be one, but extraction of a compound based on the similarity can be accurately performed using a plurality of kinds of descriptors. Further, in a case where a plurality of kinds of descriptors are used, the combination of amino acids among the descriptors is not particularly limited. The processing unit 100 (the feature quantity calculation unit 120, the similarity calculation unit 130, and the compound extraction unit 140) may determine which amino acid is to be used for calculation of the descriptor and the similarity according to the user's instruction via the operation unit 400, but the determination may be made by the processing unit 100 regardless of the user's instruction.

The compound extraction unit 140 stores the extraction result as shown in FIGS. 19A and 19B in the storage unit 200 as the compound extraction result 260 (see FIG. 3).
<Effect of Screening Device>

As described above, the screening device 10 according to the first embodiment is capable of efficient screening of a pharmaceutical candidate compound according to the screening method and the screening program according to the embodiment of the present invention using the feature quantity (the three-dimensional AAM descriptor or the invariant AAM descriptor) calculated by the feature quantity calculating method and the feature quantity calculating program according to the embodiment of the present invention.

Second Embodiment

Figure 20:
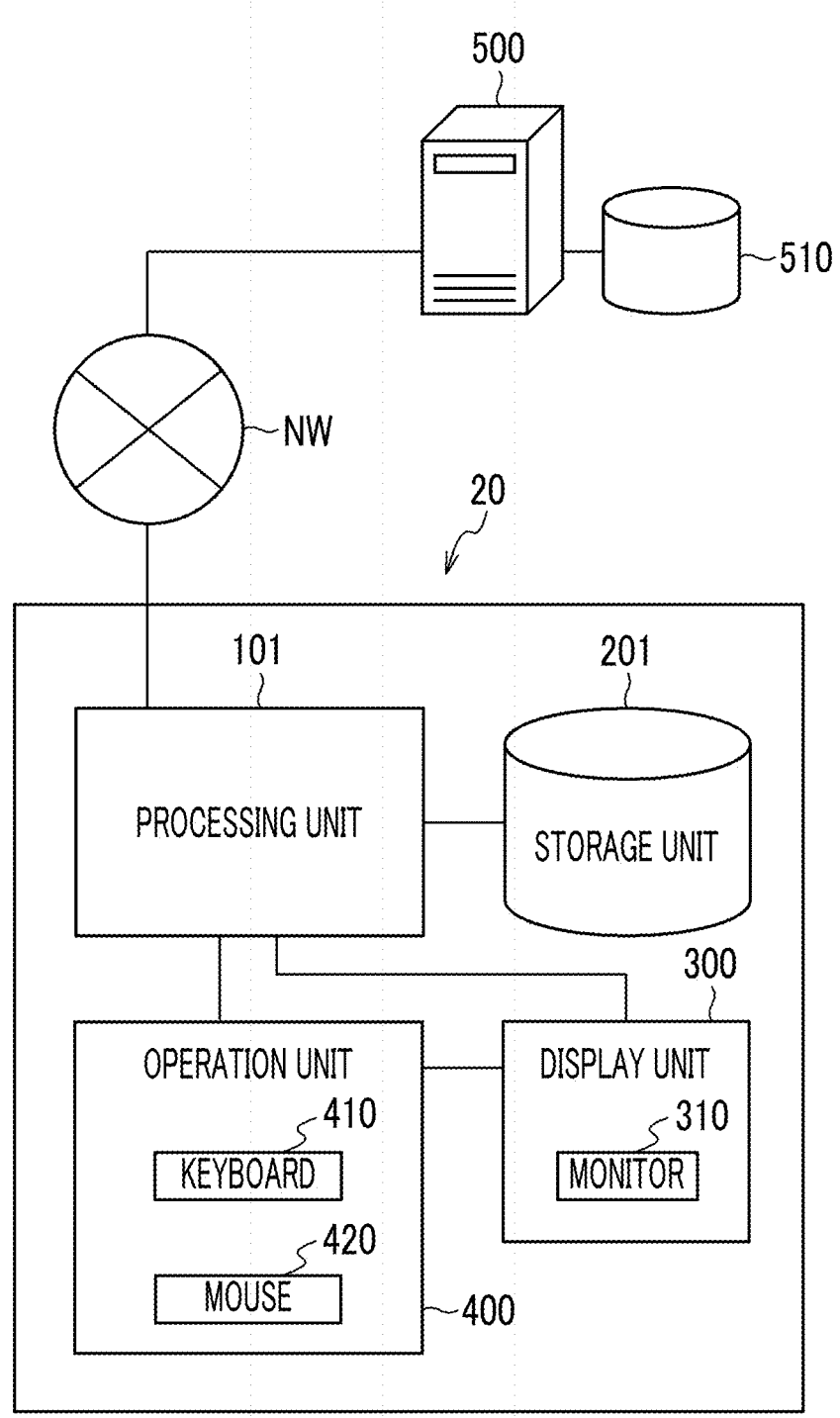
FIG. 20 is a block diagram showing a configuration of a compound creating device according to a second embodiment.

A compound creating device according to a second embodiment of the present invention will be described. FIG. 20 is a block diagram showing a configuration of a compound creating device 20 (a feature quantity calculating device or a compound creating device). Further, the same elements as those in the first embodiment are denoted by the same reference numerals, and detailed description thereof will not be provided.

Figure 21:
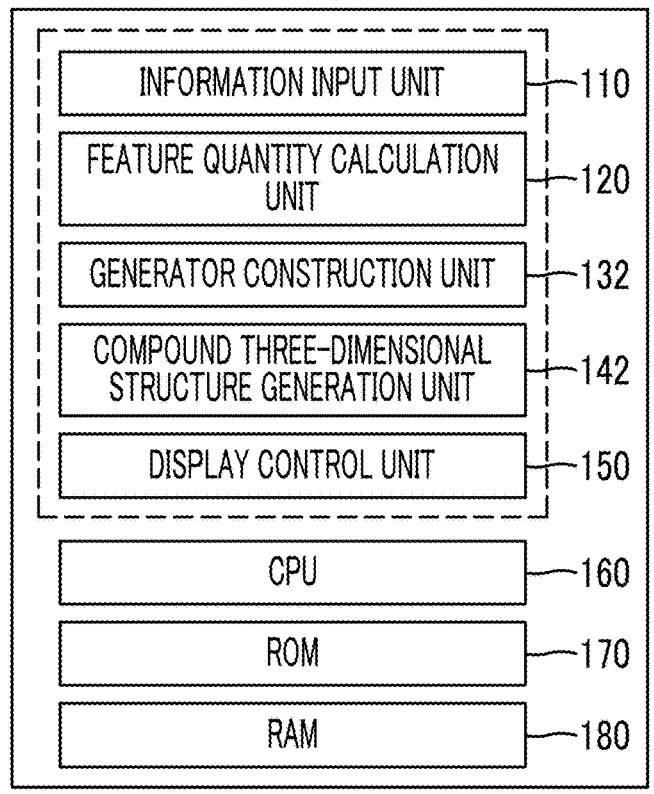
FIG. 21 is a diagram showing a configuration of a processing unit.

The compound creating device 20 includes a processing unit 101. The processing unit 101 is formed as shown in FIG. 21 and includes an information input unit 110, a feature quantity calculation unit 120 (feature quantity calculation unit), a generator construction unit 132 (generator construction unit), a compound three-dimensional structure generation unit 142 (compound three-dimensional structure generation unit), and a display control unit 150. The functions of the information input unit 110, the feature quantity calculation unit 120, and the display control unit 150 are respectively the same as the information input unit 110, the feature quantity calculation unit 120, and the display control unit 150 in the above-described screening device 10. The functions of these units can be realized using various processors in the same manner as described above in the section of the screening device 10.

Figure 22:
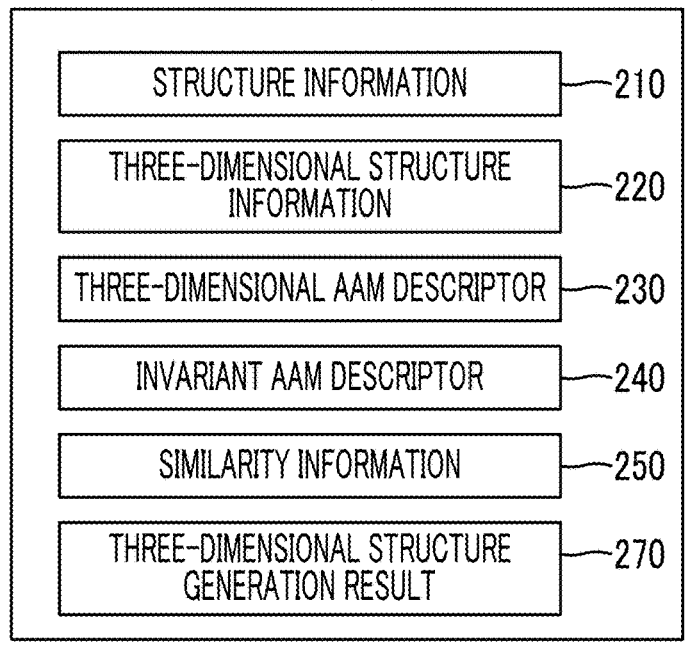
FIG. 22 is a diagram showing information stored in a storage unit.

FIG. 22 is a diagram showing information stored in the storage unit 201. The storage unit 201 stores a three-dimensional structure generation result 270 instead of the compound extraction result 260 in the screening device 10. The information stored in the storage unit 201 is stored in association as described above with reference to FIG. 4.
<Generation of Three-Dimensional Structure of Target Compound>

Generation of a three-dimensional structure of a target compound (pharmaceutical candidate compound) using the above-described three-dimensional AAM descriptor and invariant AAM descriptor will be described. Since search is not performed in the generation of a three-dimensional structure of a target compound using the compound creating device 20, the three-dimensional structure of the compound can be generated even in a case of "no solution was found as the result of screening search", and thus the three-dimensional structure of the pharmaceutical candidate compound can be efficiently created. A three-dimensional structure is generated in a mode in which the generation is carried out based on the descriptor (the three-dimensional AAM descriptor or the invariant AAM descriptor) of the ligand or in a mode in which the generation is carried out based on the descriptor (the three-dimensional AAM descriptor or the invariant AAM descriptor) of the pocket structure of the target protein. The mode for generation of a three-dimensional structure can be selected from the above-described modes according to the operation of the user via the operation unit 400.

<Generation of Three-Dimensional Structure in Case of Ligand Input>

Figure 23:
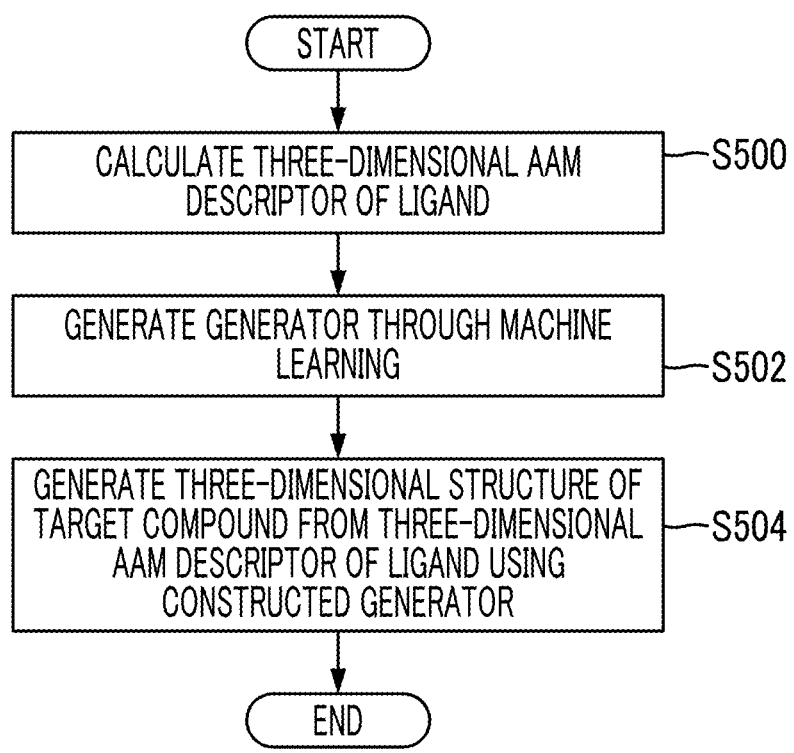
FIG. 23 is a flowchart showing a procedure for generating a three-dimensional structure in the case where a ligand is input.

FIG. 23 is a flowchart showing a procedure for generating a three-dimensional structure in a case of ligand input. After the start of the process, the feature quantity calculation unit 120 calculates a descriptor (a three-dimensional AAM descriptor) of the ligand (Step S500: the target structure designating step, the three-dimensional structure generating step, and the feature quantity calculating step). The process of Step S500 can be performed using the feature quantity calculating method and the feature quantity calculating program according to the embodiment of the present invention in the same manner as in the first embodiment (see FIGS. 5 to 8 and the description of these drawings).

In Step S502, the generator construction unit 132 constructs a generator through machine learning (a generator constructing step). Hereinafter, the process of Step S502 will be described with reference to FIG. 24. (Step 1) The feature quantity calculation unit 120 calculates three-dimensional AAM descriptors of a plurality of compounds and creates a pair (three-dimensional data) of a structural formula (a three-dimensionalized structural formula) and a three-dimensional AAM descriptor. (Step 2) The generator construction unit 132 constructs a generator through machine learning (deep learning) using a three-dimensional structure of a compound as teacher data and a three-dimensional AAM descriptor as an explanatory variable. The method of deep learning is not limited to a specific method, and a simple fully-coupled neural network or a convolutional neural network (CNN) may be employed. However, since the generation accuracy of the three-dimensional structure depends on the learning method to be used, it is preferable to select a learning method according to the condition for generating the three-dimensional structure and the condition such as the required accuracy. As a generator construction method, the methods described in additional notes 14 and 15 described below may be used.

After the completion of the processes of Steps 1 and 2 described above, the process returns to the flowchart of FIG. 23. The compound three-dimensional structure generation unit 142 generates a three-dimensional structure (three-dimensionalized structural formula) of the target compound (hit) from the three-dimensional AAM descriptor of the ligand using the constructed generator (Step S504: the compound three-dimensional structure generating step). In this manner, the three-dimensional structure of a compound having drug efficacy (binding to a target protein) similar to that of a ligand, that is, a pharmaceutical candidate compound can be obtained. Further, a plurality of three-dimensional structures that provide the same three-dimensional AAM descriptor may be present. The compound three-dimensional structure generation unit 142 stores the generated three-dimensional structure in the storage unit 201 in association with the three-dimensional AAM descriptor (the three-dimensional AAM descriptor 230) as the three-dimensional structure generation result 270 (see FIG. 22). The display control unit 150 may display the generated three-dimensional structure on the monitor 310 in response to the user's instruction via the operation unit 400.

Further, in the procedure described above, the number of kinds of amino acids used for calculation of the three-dimensional AAM descriptor for machine learning may be one or plural. However, the accuracy of the generated three-dimensional structure can be improved by calculating the three-dimensional AAM descriptor of a plurality of kinds of amino acids and providing the result for learning. Further, in a case where a plurality of three-dimensional AAM descriptors having different kinds of amino acids are used, the combination of amino acids among the descriptors is not particularly limited. The processing unit 100 (the feature quantity calculation unit 120, the similarity calculation unit 130, and the compound extraction unit 140) may determine which amino acid is to be used for calculation of the three-dimensional AAM descriptor and for provision for learning according to the user's instruction via the operation unit 400, but the determination may be made by the processing unit 100 regardless of the user's instruction.

<Example of Generation of Three-Dimensional Structure>

An example of a three-dimensional structure generated using a generator constructed through machine learning will be described. In this example, 1,800 compounds among the library compounds are learned according to the above-described method using a simple fully-coupled neural network, and the extent to which the three-dimensional structures of the remaining 200 compounds can be reproduced is examined. The results are shown in FIG. 25. In a case where the number of interlayers in the neural network is increased, the average cos similarity reaches 59%. FIGS. 26A and 26B are diagrams showing a three-dimensional structure (structural formula) and a correct structural formula (FIGS. 26A and 26B, respectively) generated from a three-dimensional AAM descriptor as an example showing such similarity.

<Relationship Between Features of Teacher Data and Generated Three-Dimensional Structure>

The three-dimensional structure generated according to the above-described procedure is affected by the features of the compound provided as teacher data. Therefore, by selecting the features of the compound to be provided as teacher data, a compound having a three-dimensional structure with different features can be generated. For example, a compound having drug efficacy similar to that of a ligand and having a three-dimensional structure that is easy to synthesize can be generated by providing, as teacher data, a three-dimensional AAM descriptor of a compound having a three-dimensional structure that is easy to synthesize. It is possible to select which compound to be provided for the three-dimensional AAM descriptor as the teacher data according to the features of the compound intended to be generated.

<Generation of Three-Dimensional Structure Using Invariant AAM Descriptor>

In FIGS. 23 to 26, the generation of the three-dimensional structure using the three-dimensional AAM descriptor has been described. Meanwhile, similarly to the case of using the three-dimensional AAM descriptor, the three-dimensional structure of the target compound can be generated through machine learning (deep learning) using the invariant AAM descriptor as teacher data and the three-dimensional structure (three-dimensionalized structural formula) as an explanatory variable even in a case of using the invariant AAM descriptor (invariant feature quantity).

<Generation of Three-Dimensional Structure in Case of Target Protein Input>

The compound creating device 20 is capable of generating a three-dimensional structure of a target compound by setting a target protein as an input, in addition to the generation of the three-dimensional structure by ligand input. Even in this case, similarly to the case of ligand input, generation of a three-dimensional structure can be performed using a three-dimensional AAM descriptor and generation of a three-dimensional structure can be performed using an invariant AAM descriptor.

Figure 27:
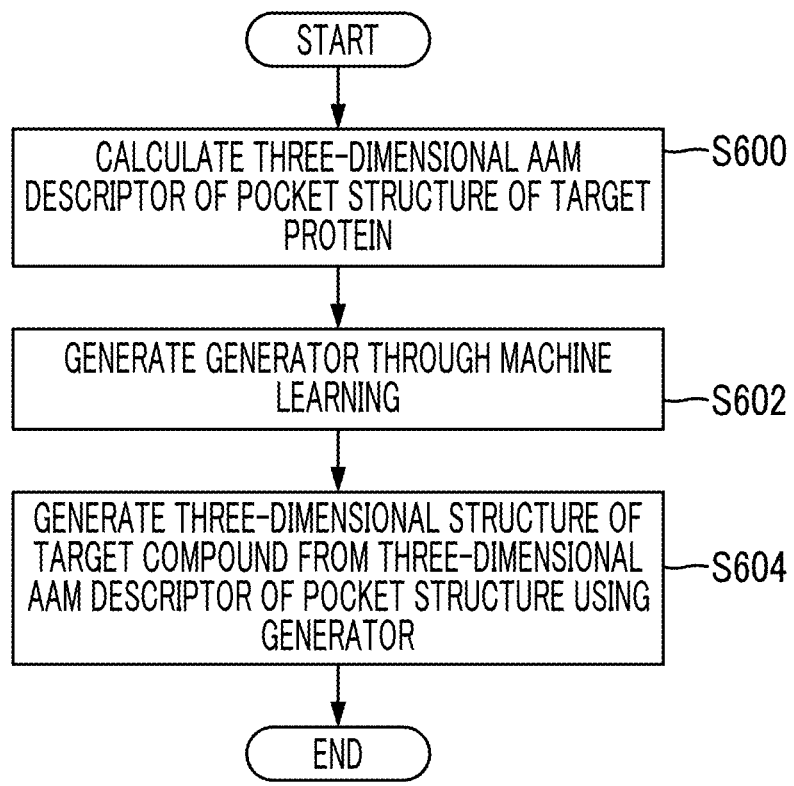
FIG. 27 is a flowchart showing a procedure for generating a three-dimensional structure in a case where a target protein is input.

FIG. 27 is a flowchart showing a procedure for generating a three-dimensional structure in a case of setting a target protein as an input (a three-dimensional AAM descriptor is set to be used). In a case where the process is started, the feature quantity calculation unit 120 calculates the three-dimensional AAM descriptor of the pocket structure of the target protein (Step S600: the target structure designating step, the three-dimensional structure generating step, and the feature quantity calculating step). The process of Step S600 can be performed using the feature quantity calculating method according to the embodiment of the present invention, similarly to the first embodiment (see FIGS. 9 and 10 and the description of these drawings).

In Step S602, the generator construction unit 132 constructs a generator through machine learning (deep learning) similar to the case of ligand input (the generator constructing step). The construction of the generator can be performed in the same manner as in Steps 1 and 2 described above. The compound three-dimensional structure generation unit 142 generates a three-dimensional structure (three-dimensionalized structural formula) of the target compound (hit) from the three-dimensional AAM descriptor of the pocket structure using the constructed generator (Step S604: the compound three-dimensional structure generating step). In this manner, the three-dimensional structure of a compound having drug efficacy (binding to a target protein) similar to that of the pocket structure, that is, a pharmaceutical candidate compound can be obtained. Further, a plurality of three-dimensional structures that provide the same three-dimensional AAM descriptor may be present. The compound three-dimensional structure generation unit 142 stores the generated three-dimensional structure in the storage unit 201 in association with the three-dimensional AAM descriptor (the three-dimensional AAM descriptor 230) as the three-dimensional structure generation result 270 (see FIG. 22). The display control unit 150 may display the generated three-dimensional structure on the monitor 310 in response to the user's instruction via the operation unit 400.

<Effects of Compound Creating Device>

As described above, the compound creating device 20 according to the second embodiment efficiently creates a three-dimensional structure of a pharmaceutical candidate compound according to the feature quantity calculating method and the compound creating program according to the embodiment of the present invention using the feature quantity (the three-dimensional AAM descriptor or the invariant AAM descriptor) calculated using the compound creating method and the feature quantity calculating program according to the embodiment of the present invention.

Third Embodiment

The first embodiment described above is an aspect in which the calculation of the feature quantity and screening based on the calculation are performed, and the second embodiment is an aspect in which the calculation of the feature quantity and creation of the three-dimensional structure of the target compound based on the calculation are performed. In addition to the calculation of the feature quantity, both the screening and the creation of a three-dimensional structure of the target compound may be performed. Therefore, a pharmaceutical candidate compound search device 30 (the feature quantity calculating device, the screening device, and the compound creating device; see FIG. 28) according to the third embodiment includes a processing unit 102 shown in FIG. 28 in place of the processing unit 100 of the screening device 10 shown in FIG. 1 or the processing unit 101 of the compound creating device 20 shown in FIG. 20. As shown in FIG. 29, the processing unit 102 includes a feature quantity calculation unit 120 (the feature quantity calculation unit and the invariant conversion unit), a similarity calculation unit 130 (the similarity calculation unit), a generator construction unit 132 (the generator construction unit), a compound extraction unit 140 (the compound extraction unit), and a compound three-dimensional structure generation unit 142 (the compound three-dimensional structure generation unit) and can perform calculation of a feature quantity, screening, and creation of a three-dimensional structure of a compound. In addition, the pharmaceutical candidate compound search device 30 stores information related to the above-described performance in the storage unit 202. Specifically, as shown in FIG. 30, information (see FIGS. 3 and 22) stored in the storage unit 200 and the storage unit 201 is stored in the storage unit 202 together.

Since other elements are the same as those of the screening device 10 shown in FIG. 1 and the compound creating device 20 shown in FIG. 20, the elements are denoted by the same reference numerals and the detailed description thereof will not be provided.

With the above-described configuration, also in the pharmaceutical candidate compound search device 30 according to the third embodiment, the feature quantity accurately showing the chemical properties of the target structure is calculated, screening of a pharmaceutical candidate compound is efficiently performed, and a three-dimensional structure of the pharmaceutical candidate compound can be efficiently created, similarly to the screening device 10 and the compound creating device 20.

The embodiments of the present invention have been described above, but the present invention is not limited to the above-described aspects, and various modifications can be made without departing from the spirit of the present invention as exemplified below.

<Target of Drug that can be Treated>

In the present invention, deoxyribonucleic acid (DNA), ribonucleic acid (RNA), cell membranes, and polysaccharides can be treated in addition to proteins as the targets of drugs. However, in the first to third embodiments, it is necessary to change the amino acid to another one. Specifically, an amino acid is changed to a nucleic acid base in a case of DNA, an amino acid is changed to a nucleic acid base in a case of RNA, an amino acid is changed to a lipid molecule in a case of cell membranes, and an amino acid is changed to a monosaccharide molecule in a case of polysaccharides. In the description below, the reason why DNA, RNA, cell membranes, and polysaccharides can be treated with this change in the present invention will be described. Proteins, DNA, RNA, cell membranes, and polysaccharides are collectively referred to as biopolymers and are made up of unique building blocks. Specifically, the building block of proteins is an amino acid, the building block of DNA is a nucleic acid base, the building block of RNA is similarly a nucleic acid base, the building block of cell membranes is a lipid molecule, and the building block of polysaccharides is a monosaccharide molecule. Since DNA, RNA, cell membranes, and polysaccharides, which are biopolymers other than proteins also have pockets that are active sites similarly to the proteins, even in a case where a drug target (target biopolymer) is DNA, RNA, cell membranes and polysaccharides, the present invention can deal with this by changing amino acids to the building blocks of the targets in the first to third embodiments shown in the case of proteins. Further, water can be considered in a case of quantifying the degree of accumulation of amino acids, nucleic acid bases, lipid molecules, and monosaccharide molecules in the periphery of a compound or a pocket structure.

<Activities that can be Treated>

In the present invention, in addition to the typical activity which is the "activity of a target biomolecule alone by a compound", the "activity of a cell, which is a composite formed of other biomolecules in addition to the target biomolecule by a compound" can also be treated.

(Modification Example 1) Feature Quantity of Biopolymer Other than Amino Acid and Use Thereof <Target and Probe>

In a case of treating DNA, RNA, cell membranes, and polysaccharides, which are biopolymers (compounds) other than proteins as drug targets (target biopolymers), the probe used for calculation of the feature quantity is not an amino acid but a different substance (the building block of each target). Specifically, in a case where the targets are "DNA, RNA, cell membranes, and polysaccharides", the probes are respectively set as "one or more kinds of nucleic acid bases, one or more kinds of nucleic acid bases, one or more kinds of lipid molecules, and one or more kinds of monosaccharide molecules". Further, water and one or more kinds of ions may be considered during the quantification of the degree of accumulation using these as probes. Further, in a case where the targets are formed of a plurality of kinds of biopolymers among "DNA, RNA, cell membranes, and polysaccharides", the probe can also be set as one or more of "one or more kinds of nucleic acid bases, one or more kinds of lipid molecules, one or more kinds of monosaccharide molecules, water, and one or more kinds of ions" (the kind, the number, and the combination thereof may be optional according to the configurations of the targets) in accordance of the configurations of the targets. The ions constituting the probes may be monatomic ions or polyatomic ions. Further, all the probes are assumed to generate van der Waals forces.

<Calculation of Feature Quantity and Screening>

The configurations of devices for calculating the feature quantity (the feature quantity according to Modification Example 1) and performing screening (the feature quantity calculating device and the screening device) are the same as those in the first embodiment (see FIGS. 1 to 3). However, the descriptor according to Modification Example 1 is calculated and stored instead of the three-dimensional AAM descriptor 230 in FIG. 3, and the invariant feature quantity according to Modification Example 1 is calculated and stored instead of the invariant AAM descriptor 240. The procedures for calculation of the feature quantity and screening are the same as those in the first embodiment, and the feature quantity calculating method, the feature quantity calculating program, the screening method, and the screening program according to the embodiment of the present invention can be used. Specifically, the invariant feature quantity according to Modification Example 1 is calculated (see Equation (2)) by calculating the distribution function (see Equation (1)) using "one or more (the kind, the number, and the combination thereof may be optional) selected from one or more kinds of nucleic acid bases, one or more kinds of lipid molecules, one or more kinds of monosaccharide molecules, water, and one or more kinds of ions" instead of the "amino acid" as the probe in the calculation of the feature quantity (see FIG. 5) according to the first embodiment, calculating the feature quantity according to Modification Example 1 from the distribution function, and performing Fourier transform on the feature quantity according to Modification Example 1. Further, the invariant feature quantity according to Modification Example 1 may be calculated by angular integration of the correlation function (see Equations (3) and (4)) using the feature quantity of two different kinds of probes according to Modification Example 1 (the first probe formed of one or more selected from one or more kinds of nucleic acid bases, one or more kinds of lipid molecules, one or more kinds of monosaccharide molecules, water, and one or more kinds of ions and the second probe that is formed of one or more selected from one or more kinds of nucleic acid bases, one or more kinds of lipid molecules, one or more kinds of monosaccharide molecules, water, and one or more kinds of ions and different from the first probe).

In addition, the target compound can be extracted based on the similarity between the feature quantity of according to Modification Example 1 a plurality of compounds and the feature quantity according to Modification Example 1 of the binding compound using the feature quantity according to Modification Example 1 instead of the three-dimensional AAM descriptor in the first embodiment. A compound having a similarity greater than or equal to the threshold may be extracted, or a compound may be extracted in a descending order of the similarity.

<Calculation of Feature Quantity and Creation of Compound>

The configurations of devices for calculating a feature quantity (the feature quantity according to Modification Example 1) and creating a compound (the feature quantity calculating device and the compound creating device) are the same as those in the second embodiment (see FIGS. 20 to 22). However, the descriptor according to Modification Example 1 (the feature quantity according to Modification Example 1) is calculated and stored instead of the three-dimensional AAM descriptor 230 in FIG. 22, and the invariant feature quantity according to Modification Example 1 is calculated and stored instead of the invariant AAM descriptor 240. The procedures for calculation of the feature quantity and creation of a compound are the same as those in the second embodiment, and the feature quantity calculating method, the feature quantity calculating program, the compound creating method, and the compound creating program according to the embodiment of the present invention can be used. In Modification Example 1, a generator is constructed through machine learning (deep learning) using the three-dimensional structure of the compound as teacher data and the feature quantity according to Modification Example 1 as an explanatory variable, and the three-dimensional structure of the target biopolymer can be generated from the feature quantity according to Modification Example 1 of the binding compound that is a compound whose binding to the target biopolymer has been confirmed using the constructed generator. Further, similar to the first to third embodiments, a compound having a three-dimensional structure with different features can be generated by selecting features of a compound to be provided as teacher data.

In the same manner as in the first to third embodiments described above, since the drug efficacy of a compound (the binding force with respect to the target such as DNA) is locally exhibited as the result of an interaction between a compound and a nucleic acid base (probe), in a case where the degree of accumulation of nucleic acid bases and the like is similar between compounds, the compounds have similar binding forces with respect to the targets. That is, the compounds with similar feature quantities according to Modification Example 1 exhibit similar drug efficacies. Therefore, in Modification Example 1, the chemical properties of the compound can be accurately exhibited by the feature quantity according to Modification Example 1. In addition, in a case where the feature quantities according to Modification Example 1 are similar between the target compound and the binding compound that is bound to the target biopolymer, the drug efficacies of both the binding compound and the target compound are similar. Therefore, according to Modification Example 1, a target compound having drug efficacy similar to that of the binding compound is extracted based on the feature quantity according to Modification Example 1 so that screening of a pharmaceutical candidate compound can be efficiently performed. Further, according to Modification Example 1, similarly to the above-described embodiments, a structural formula of a compound having a feature quantity similar to the feature quantity (the feature quantity according to Modification Example 1) of the binding compound (accordingly, the drug efficacies are similar) is generated without performing search, and thus the three-dimensional structure of the pharmaceutical candidate compound can be efficiently created.

Figure 28:
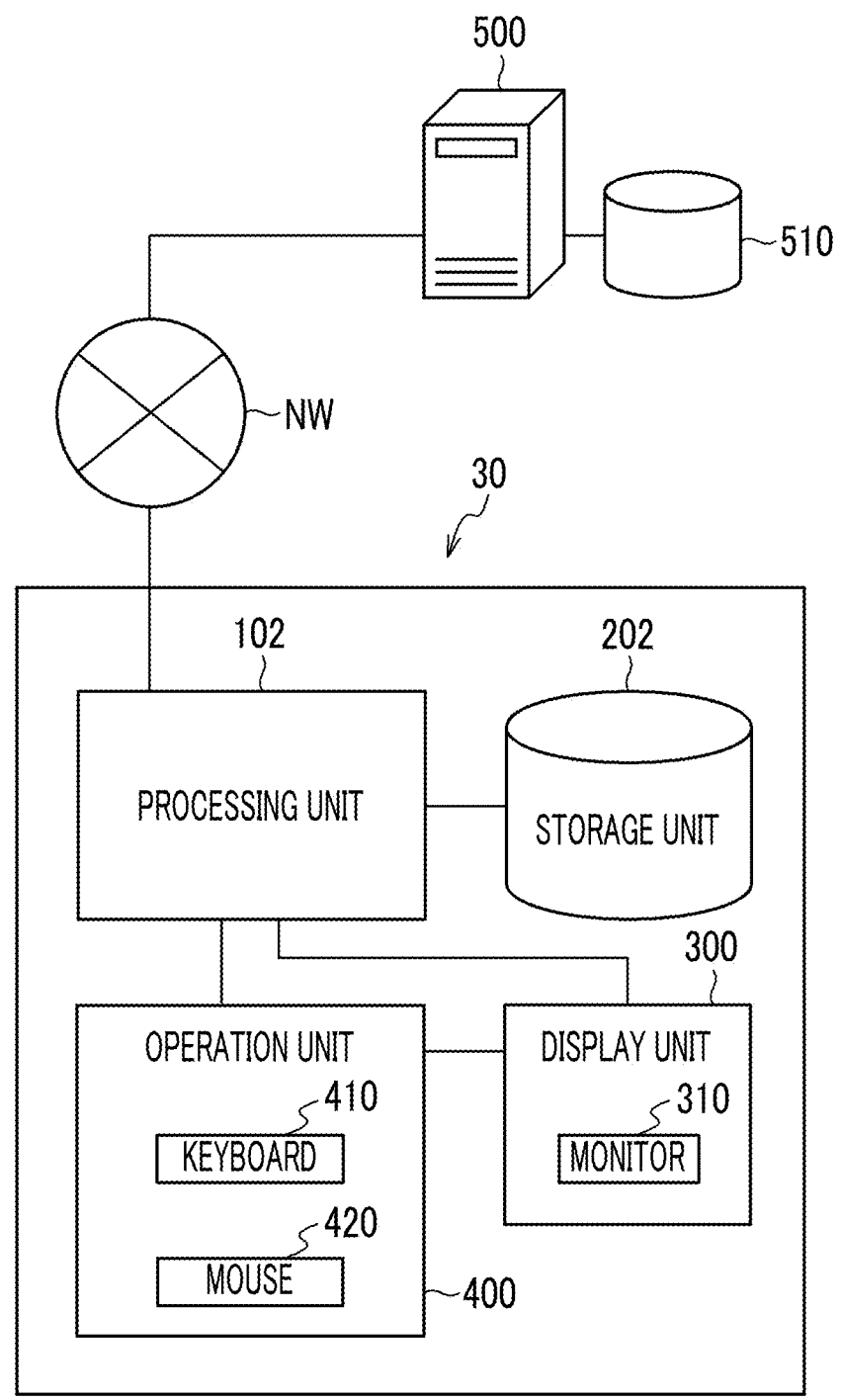
FIG. 28 is a block diagram showing a configuration of a pharmaceutical candidate compound search device according to a third embodiment.
Figure 29:
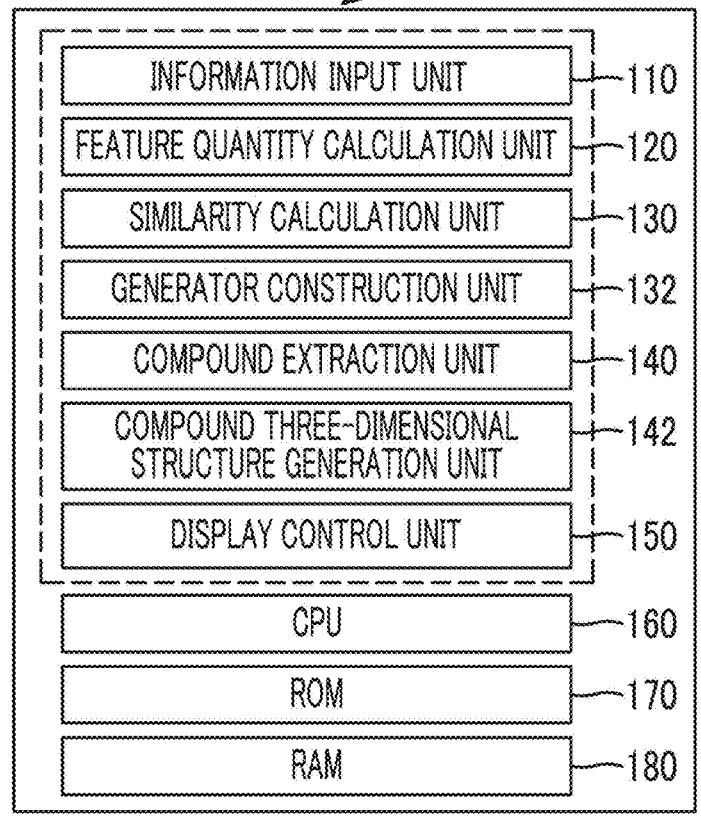
FIG. 29 is a diagram showing a configuration of a processing unit.
Figure 30:
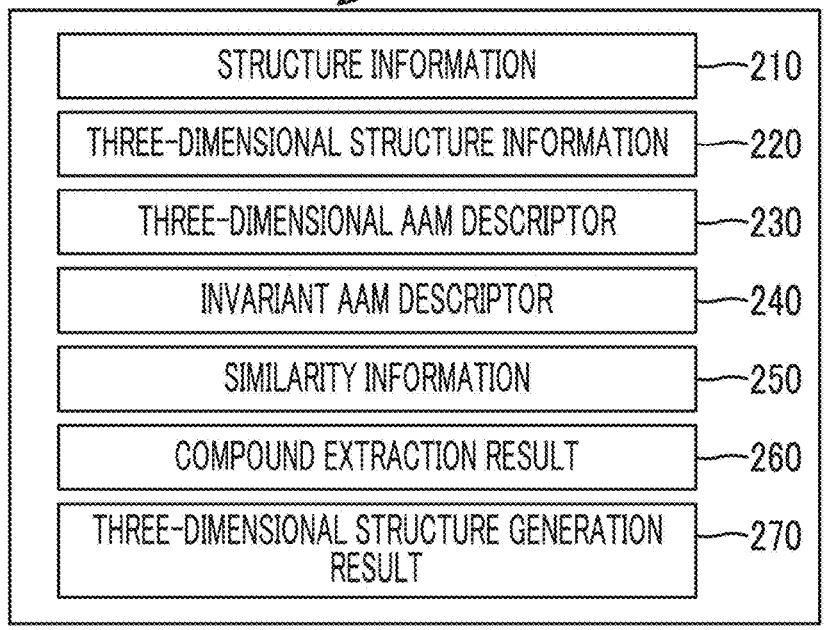
FIG. 30 is a diagram showing information stored in a storage unit.

In addition, in a case where the calculation of a feature quantity, the screening, and the creation of a compound are performed (corresponding to the third embodiment), the calculation, the screening, and the creation can be performed using the same configurations as in FIGS. 28 to 30.

(Modification Example 2) Feature Quantity of Amino Acid and Others and Use Thereof <Target and Probe>

In Modification Example 2, "composite of proteins and biopolymers other than the proteins (DNA, RNA, cell membranes, and polysaccharides)" are set as targets. Further, "one or more kinds of amino acids" (first probe) and "one or more selected from one or more kinds of nucleic acid bases, one or more kinds of lipid molecules, one or more kinds of monosaccharide molecules, water, and one or more kinds of ions" (second probe; the kind, the number, and the combination thereof may be optional) are set as probes. The configurations of the first and second probes (the kind, the number, and the combination thereof) can be set according to the configurations of the targets. The ions constituting the probes may be monatomic ions or polyatomic ions. Further, all the probes are assumed to generate van der Waals forces.

<Calculation of Feature Quantity and Screening>

The configurations of devices for calculating the feature quantity (the feature quantity according to Modification Example 2) and performing screening (the feature quantity calculating device and the screening device) are the same as those in the first embodiment (see FIGS. 1 to 3). However, a descriptor according to Modification Example 2 (the feature quantity according to Modification Example 2) is calculated and stored instead of the three-dimensional AAM descriptor 230 in FIG. 3, and an invariant feature quantity according to Modification Example 2 is calculated and stored instead of the invariant AAM descriptor 240. The procedures for calculation of the feature quantity and screening are the same as those in the first embodiment, and the feature quantity calculating method, the feature quantity calculating program, the screening method, and the screening program according to the embodiment of the present invention can be used. Specifically, the invariant feature quantity according to Modification Example 2 is calculated (see Equation (2)) by calculating the distribution function (see Equation (1)) using "one or more kinds of amino acids" (the first probe) and "one or more selected from one or more kinds of nucleic acid bases, one or more kinds of lipid molecules, water, one or more kinds of monosaccharide molecules, and one or more kinds of ions" (the second probe; the kind, the number, and the combination thereof may be optional) instead of the "amino acid" as the probe in the calculation of the feature quantity according to Modification Example 2 (see FIG. 5), calculating the feature quantity according to Modification Example 2 from the distribution function, and performing Fourier transform on the feature quantity according to Modification Example 2. Further, the invariant feature quantity according to Modification Example 2 may be calculated by angular integration of the correlation function (see Equations (3) and (4)) using the feature quantity according to Modification Example 2 of two kinds of probes in which at least one of "one or more kinds of amino acids" (first probe) or "one or more selected from one or more kinds of nucleic acid bases, one or more kinds of lipid molecules, one or more kinds of monosaccharide molecules, water, and one or more kinds of ions" (second probe; the kind, the number, and the combination thereof may be optional) is different.

In addition, the target compound can be extracted based on the similarity between the feature quantity according to Modification Example 2 of a plurality of compounds and the feature quantity according to Modification Example 2 of the binding compound using the feature quantity according to Modification Example 2 instead of the three-dimensional AAM descriptor in the first embodiment. A compound having a similarity greater than or equal to the threshold may be extracted, or a compound may be extracted in a descending order of the similarity.

<Calculation of Feature Quantity and Creation of Compound>

The configurations of devices for calculating a feature quantity (the feature quantity according to Modification Example 2) and creating a compound (the feature quantity calculating device and the compound creating device) are the same as those in the second embodiment (see FIGS. 20 to 22). However, the descriptor according to Modification Example 2 (the feature quantity according to Modification Example 2) is calculated and stored instead of the three-dimensional AAM descriptor 230 in FIG. 22, and the invariant feature quantity according to Modification Example 2 is calculated and stored instead of the invariant AAM descriptor 240. The procedures for calculation of the feature quantity and creation of a compound are the same as those in the second embodiment, and the feature quantity calculating method, the feature quantity calculating program, the compound creating method, and the compound creating program according to the embodiment of the present invention can be used. In Modification Example 2, a generator is constructed through machine learning (deep learning) using the three-dimensional structure of the compound as teacher data and the feature quantity according to Modification Example 2 as an explanatory variable, and the three-dimensional structure of the target biopolymer can be generated from the feature quantity according to Modification Example 2 of the binding compound that is a compound whose binding to the target biopolymer has been confirmed using the constructed generator. Further, similar to the first to third embodiments and Modification Example 1, a compound having a three-dimensional structure with different features can be generated by selecting features of a compound to be provided as teacher data.

In the same manner as in the first to third embodiments and Modification Example 1 described above, since the drug efficacy of a compound (the binding force with respect to the target) is locally exhibited as the result of an interaction between a compound and a probe, in a case where the degree of accumulation of probes is similar between compounds, the compounds have similar binding forces with respect to the targets. That is, the compounds with similar feature quantities according to Modification Example 2 exhibit similar drug efficacies. Therefore, in Modification Example 2, the chemical properties of the compound can be accurately exhibited by the feature quantity according to Modification Example 2. In addition, in a case where the feature quantities according to Modification Example 2 are similar between the target compound and the binding compound that is bound to the target biopolymer, the drug efficacies of both the binding compound and the target compound are similar. Therefore, according to Modification Example 2, a target compound having drug efficacy similar to that of the binding compound is extracted based on the feature quantity according to Modification Example 2 so that screening of a pharmaceutical candidate compound can be efficiently performed. Further, according to Modification Example 2, similarly to the above-described embodiments and Modification Example 1, a structural formula of a compound having a feature quantity similar to the feature quantity (the feature quantity according to Modification Example 2) of the binding compound (accordingly, the drug efficacies are similar) is generated without performing search, and thus the three-dimensional structure of the pharmaceutical candidate compound can be efficiently created.

In addition, in a case where the calculation of a feature quantity, the screening, and the creation of a compound are performed (corresponding to the third embodiment), the calculation, the screening, and the creation can be performed using the same configurations as in FIGS. 28 to 30.

(Modification Example 3) Feature Quantity of Virtual Point Electric Charge and the Like and Use Thereof <Target and Probe>

In Modification Example 3, a biopolymer (compound) is used as the target, and "one or more selected from a first point electric charge having an electric charge of +1, a second point electric charge having an electric charge of −1, a third point electric charge having an electric charge of +0.1, a fourth point electric charge having an electric charge of −0.1, and a fifth point electric charge having an electric charge of 0 (the kind, the number, and the combination thereof may be optional)" (virtual point electric charges having a real electric charge and generating a van der Waals force) are used as the probes. These point electric charges are an example of the "single point".

<Calculation of Feature Quantity and Screening>

The configurations of devices for calculating the feature quantity (the feature quantity according to Modification Example 3; the second feature quantity and the second invariant feature quantity) and performing screening (the feature quantity calculating device and the screening device) are the same as those in the first embodiment (see FIGS. 1 to 3). However, a second descriptor (the second feature quantity) is calculated and stored instead of the three-dimensional AAM descriptor 230 in FIG. 3, and a second invariant feature quantity is calculated and stored instead of the invariant AAM descriptor 240. The procedures for calculation of the feature quantity and screening are the same as those in the first embodiment, and the feature quantity calculating method, the feature quantity calculating program, the screening method, and the screening program according to the embodiment of the present invention can be used. Specifically, the second invariant feature quantity is calculated (see Equation (2)) by calculating the distribution function (see Equation (1)) using "one or more selected from a first point electric charge having an electric charge of +1, a second point electric charge having an electric charge of −1, a third point electric charge having an electric charge of +0.1, a fourth point electric charge having an electric charge of −0.1, and a fifth point electric charge having an electric charge of 0 (the kind, the number, and the combination thereof may be optional)" instead of the "amino acid" as the probe in the calculation of the feature quantity according to the first embodiment (see FIG. 5), calculating the second feature quantity from the distribution function, and performing Fourier transform on the second feature quantity. Further, the second invariant feature quantity may be calculated by angular integration of the correlation function (see Equations (3) and (4)) using the second feature quantity of two different kinds of probes (the first probe formed of one or more selected from the first point electric charge, the second point electric charge, the third point electric charge, the fourth point electric charge, and the fifth point electric charge and the second probe that is formed of one or more selected from the first point electric charge, the second point electric charge, the third point electric charge, the fourth point electric charge, and the fifth point electric charge and different from the first probe).

In addition, the target compound can be extracted based on the similarity between the second feature quantity of a plurality of compounds and the second feature quantity of the binding compound using the second feature quantity instead of the three-dimensional AAM descriptor in the first embodiment. A compound having a similarity greater than or equal to the threshold may be extracted, or a compound may be extracted in a descending order of the similarity.

<Calculation of Feature Quantity and Creation of Compound>

The configurations of devices for calculating a feature quantity (the second feature quantity) and creating a compound (the feature quantity calculating device and the compound creating device) are the same as those in the second embodiment (see FIGS. 20 to 22). However, the second descriptor (the second feature quantity) is calculated and stored instead of the three-dimensional AAM descriptor 230 in FIG. 22, and the second invariant feature quantity is calculated and stored instead of the invariant AAM descriptor 240. The procedures for calculation of the feature quantity and creation of a compound are the same as those in the second embodiment, and the feature quantity calculating method, the feature quantity calculating program, the compound creating method, and the compound creating program according to the embodiment of the present invention can be used. In Modification Example 3, a generator is constructed through machine learning (deep learning) using the three-dimensional structure of the compound as teacher data and the second feature quantity as an explanatory variable, and the three-dimensional structure of the target biopolymer can be generated from the second feature quantity of the binding compound that is a compound whose binding to the target biopolymer has been confirmed using the constructed generator. Further, similar to the first to third embodiments and Modification Examples 1 and 2, a compound having a three-dimensional structure with different features can be generated by selecting features of a compound to be provided as teacher data.

In the same manner as in the first to third embodiments and Modification Examples 1 and 2 described above, since the drug efficacy of a compound (the binding force with respect to the target) is locally exhibited as the result of an interaction between a compound and a probe, in a case where the degree of accumulation of probes is similar between compounds, the compounds have similar binding forces with respect to the targets. That is, compounds having similar second feature quantities exhibit similar drug efficacies. Therefore, in Modification Example 3, the chemical properties of the compound can be accurately exhibited by the second feature quantity. In addition, in a case where the second feature quantities are similar between the target compound and the binding compound that is bound to the target biopolymer, the drug efficacies of both the binding compound and the target compound are similar. Therefore, according to Modification Example 3, a target compound having drug efficacy similar to that of the binding compound is extracted based on the second feature quantity so that screening of a pharmaceutical candidate compound can be efficiently performed. Further, according to Modification Example 3, similarly to the above-described first to third embodiments and Modification Examples 1 and 2, a structural formula of a compound having a feature quantity similar to the feature quantity (the second feature quantity) of the binding compound (accordingly, the drug efficacies are similar) is generated without performing search, and thus the three-dimensional structure of the pharmaceutical candidate compound can be efficiently created.

In addition, in a case where the calculation of a feature quantity, the screening, and the creation of a compound are performed (corresponding to the third embodiment), the calculation, the screening, and the creation can be performed using the same configurations as in FIGS. 28 to 30.

(Modification Example 4) Feature Quantity of Amino Acid and Virtual Point Electric Charge and Use Thereof <Target and Probe>

In Modification Example 4, a biopolymer (compound) is used as the target, and "a first probe that is one or more kinds of amino acids and a second probe that is one or more selected from a first point electric charge having an electric charge of +1, a second point electric charge having an electric charge of −1, a third point electric charge having an electric charge of +0.1, a fourth point electric charge having an electric charge of −0.1, a dipole in which the first point electric charge and the second point electric charge are disposed to be separated from each other, and a fifth point electric charge having an electric charge of 0 (the kind, the number, and the combination thereof may be optional)" are used as the probes. The second probe may be formed of point electric charges (one or more of the first to fifth point electric charges) excluding the dipole. The first to fifth point electric charges are an example of the "single point".

<Calculation of Feature Quantity and Screening>

The configurations of devices for calculating the feature quantity (the feature quantity according to Modification Example 4) and performing screening (the feature quantity calculating device and the screening device) are the same as those in the first embodiment (see FIGS. 1 to 3). However, a descriptor according to Modification Example 4 (the feature quantity according to Modification Example 4) is calculated and stored instead of the three-dimensional AAM descriptor 230 in FIG. 3, and an invariant feature quantity according to Modification Example 4 is calculated and stored instead of the invariant AAM descriptor 240. The procedures for calculation of the feature quantity and screening are the same as those in the first embodiment, and the feature quantity calculating method, the feature quantity calculating program, the screening method, and the screening program according to the embodiment of the present invention can be used. Specifically, the invariant feature quantity according to Modification Example 4 is calculated (see Equation (2)) by calculating the distribution function (see Equation (1)) using "a first probe that is formed of one or more kinds of amino acids and a second probe that is formed of one or more selected from a first point electric charge having an electric charge of +1, a second point electric charge having an electric charge of −1, a third point electric charge having an electric charge of +0.1, a fourth point electric charge having an electric charge of −0.1, a dipole in which the first point electric charge and the second point electric charge are disposed to be separated from each other, and a fifth point electric charge having an electric charge of 0 (the kind, the number, and the combination thereof may be optional)" instead of the "amino acid" as the probe in the calculation of the feature quantity according to the first embodiment (see FIG. 5), calculating the feature quantity according Modification Example 4 from the distribution function, and performing Fourier transform on the feature quantity according Modification Example 4. The second probe may be formed of point electric charges (one or more of the first to fifth point electric charges) excluding the dipole. Further, the invariant feature quantity according Modification Example 4 may be calculated by angular integration of the correlation function (see Equations (3) and (4)) using the feature quantity according Modification Example 4 of two kinds of probes in which at least one of the first probe or the second probe is different.

In addition, the target compound can be extracted based on the similarity between the feature quantity according Modification Example 4 of a plurality of compounds and the feature quantity according Modification Example 4 of the binding compound using the feature quantity according Modification Example 4 instead of the three-dimensional AAM descriptor in the first embodiment. A compound having a similarity greater than or equal to the threshold may be extracted, or a compound may be extracted in a descending order of the similarity.

<Calculation of Feature Quantity and Creation of Compound>

The configurations of devices for calculating a feature quantity (the feature quantity according Modification Example 4) and creating a compound (the feature quantity calculating device and the compound creating device) are the same as those in the second embodiment (see FIGS. 20 to 22). However, the descriptor according to Modification Example 4 (the feature quantity according to Modification Example 4) is calculated and stored instead of the three-dimensional AAM descriptor 230 in FIG. 22, and the invariant feature quantity according to Modification Example 4 is calculated and stored instead of the invariant AAM descriptor 240. The procedures for calculation of the feature quantity and creation of a compound are the same as those in the second embodiment, and the feature quantity calculating method, the feature quantity calculating program, the compound creating method, and the compound creating program according to the embodiment of the present invention can be used. In Modification Example 4, a generator is constructed through machine learning (deep learning) using the three-dimensional structure of the compound as teacher data and the feature quantity according to Modification Example 4 as an explanatory variable, and the three-dimensional structure of the target biopolymer can be generated from the feature quantity according to Modification Example 4 of the binding compound that is a compound whose binding to the target biopolymer has been confirmed using the constructed generator. Further, similar to the first to third embodiments, a compound having a three-dimensional structure with different features can be generated by selecting features of a compound to be provided as teacher data.

In the same manner as in the first to third embodiments, since the drug efficacy of a compound (the binding force with respect to the target) is locally exhibited as the result of an interaction between a compound and a probe, in a case where the degree of accumulation of probes is similar between compounds, the compounds have similar binding forces with respect to the targets. That is, the compounds with similar feature quantities according to Modification Example 4 exhibit similar drug efficacies. Therefore, in Modification Example 4, the chemical properties of the compound can be accurately exhibited by the feature quantity according to Modification Example 4. In addition, in a case where the feature quantities according to Modification Example 4 are similar between the target compound and the binding compound that is bound to the target biopolymer, the drug efficacies of both the binding compound and the target compound are similar. Therefore, according to Modification Example 4, a target compound having drug efficacy similar to that of the binding compound is extracted based on the feature quantity according to Modification Example 4 so that screening of a pharmaceutical candidate compound can be efficiently performed. Further, according to Modification Example 4, similarly to the above-described embodiments, a structural formula of a compound having a feature quantity similar to the feature quantity (the feature quantity according to Modification Example 4) of the binding compound (accordingly, the drug efficacies are similar) is generated without performing search, and thus the three-dimensional structure of the pharmaceutical candidate compound can be efficiently created.

In addition, in a case where the calculation of a feature quantity, the screening, and the creation of a compound are performed (corresponding to the third embodiment), the calculation, the screening, and the creation can be performed using the same configurations as in FIGS. 28 to 30.

(Modification Example 5) Feature Quantity of Nucleic Acid Base and Virtual Point Electric Charge and Use Thereof <Target and Probe>

In Modification Example 5, a biopolymer (compound) is used as the target, and a first probe "that is one or more selected from one or more kinds of nucleic acid bases, one or more kinds of lipid molecules, water, one or more kinds of monosaccharide molecules, and one or more kinds of ions (the kind, the number, and the combination thereof may be optional)" and a second probe "that is one or more selected from a first point electric charge having an electric charge of +1, a second point electric charge having an electric charge of −1, a third point electric charge having an electric charge of +0.1, a fourth point electric charge having an electric charge of −0.1, a dipole in which the first point electric charge and the second point electric charge are disposed to be separated from each other, and a fifth point electric charge having an electric charge of 0 (the kind, the number, and the combination thereof may be optional)" are used as the probes. The first probe may be formed of one or more kinds of monatomic ions, and the second probe may be formed of point electric charges (one or more of the first to fifth point electric charges). The "monatomic ions" and the "point electric charges" are an example of the "single point".

<Calculation of Feature Quantity and Screening>

The configurations of devices for calculating the feature quantity (the feature quantity according to Modification Example 5; the third feature quantity and the third invariant feature quantity) and performing screening (the feature quantity calculating device and the screening device) are the same as those in the first embodiment (see FIGS. 1 to 3). However, a third descriptor (third feature quantity) is calculated and stored instead of the three-dimensional AAM descriptor 230 in FIG. 3, and a third invariant feature quantity is calculated and stored instead of the invariant AAM descriptor 240. The procedures for calculation of the feature quantity and screening are the same as those in the first embodiment, and the feature quantity calculating method, the feature quantity calculating program, the screening method, and the screening program according to the embodiment of the present invention can be used. Specifically, the third invariant feature quantity is calculated (see Equation (2)) by calculating the distribution function (see Equation (1)) using the first probe "that is formed of one or more selected from one or more kinds of nucleic acid bases, one or more kinds of lipid molecules, water, one or more kinds of monosaccharide molecules, and one or more kinds of ions (the kind, the number, and the combination thereof may be optional)" and the second probe "that is formed of one or more selected from a first point electric charge having an electric charge of +1, a second point electric charge having an electric charge of −1, a third point electric charge having an electric charge of +0.1, a fourth point electric charge having an electric charge of −0.1, a dipole in which the first point electric charge and the second point electric charge are disposed to be separated from each other, and a fifth point electric charge having an electric charge of 0 (the kind, the number, and the combination thereof may be optional)" instead of the "amino acid" as the probe in the calculation of the feature quantity according to the first embodiment (see FIG. 5), calculating the third feature quantity from the distribution function, and performing Fourier transform on the third feature quantity. Further, the third invariant feature quantity may be calculated by angular integration of the correlation function (see Equations (3) and (4)) using the third feature quantity of two kinds of probes in which at least one of the first probe or the second probe is different. As described above, the first probe may be formed of one or more kinds of monatomic ions, and the second probe may be formed of point electric charges (one or more of the first to fifth point electric charges). The "monatomic ions" and the "point electric charges" are an example of the "single point".

In addition, the target compound can be extracted based on the similarity between the third feature quantity of a plurality of compounds and the third feature quantity of the binding compound using the third feature quantity instead of the three-dimensional AAM descriptor in the first embodiment. A compound having a similarity greater than or equal to the threshold may be extracted, or a compound may be extracted in a descending order of the similarity.

<Calculation of Feature Quantity and Creation of Compound>

The configurations of devices for calculating a feature quantity (third feature quantity) and creating a compound (the feature quantity calculating device and the compound creating device) are the same as those in the second embodiment (see FIGS. 20 to 22). However, the third descriptor (third feature quantity) is calculated and stored instead of the three-dimensional AAM descriptor 230 in FIG. 22, and the third invariant feature quantity is calculated and stored instead of the invariant AAM descriptor 240. The procedures for calculation of the feature quantity and creation of a compound are the same as those in the second embodiment, and the feature quantity calculating method, the feature quantity calculating program, the compound creating method, and the compound creating program according to the embodiment of the present invention can be used. In Modification Example 5, a generator is constructed through machine learning (deep learning) using the three-dimensional structure of the compound as teacher data and the third feature quantity as an explanatory variable, and the three-dimensional structure of the target biopolymer can be generated from the third feature quantity of the binding compound that is a compound whose binding to the target biopolymer has been confirmed using the constructed generator. Further, similar to the first to third embodiments, a compound having a three-dimensional structure with different features can be generated by selecting features of a compound to be provided as teacher data.

In the same manner as in the first to third embodiments, since the drug efficacy of a compound (the binding force with respect to the target) is locally exhibited as the result of an interaction between a compound and a probe, in a case where the degree of accumulation of probes is similar between compounds, the compounds have similar binding forces with respect to the targets. That is, compounds having similar third feature quantities exhibit similar drug efficacies. Therefore, in Modification Example 5, the chemical properties of the compound can be accurately exhibited by the third feature quantity. In addition, in a case where the third feature quantities are similar between the target compound and the binding compound that is bound to the target biopolymer, the drug efficacies of both the binding compound and the target compound are similar. Therefore, according to Modification Example 5, a target compound having drug efficacy similar to that of the binding compound is extracted based on the third feature quantity so that screening of a pharmaceutical candidate compound can be efficiently performed. Further, according to Modification Example 5, similarly to the above-described embodiments, a structural formula of a compound having a feature quantity similar to the feature quantity (the third feature quantity) of the binding compound (accordingly, the drug efficacies are similar) is generated without performing search, and thus the three-dimensional structure of the pharmaceutical candidate compound can be efficiently created.

In addition, in a case where the calculation of a feature quantity, the screening, and the creation of a compound are performed (corresponding to the third embodiment), the calculation, the screening, and the creation can be performed using the same configurations as in FIGS. 28 to 30.

(Modification Example 6) Feature Quantities of Amino Acid, Nucleic Acid Base, and Virtual Point Electric Charge and Use Thereof <Target and Probe>

In Modification Example 6, a biopolymer (compound) is used as the target, and a first probe "that is one or more kinds of amino acids", a second probe "that is one or more selected from one or more kinds of nucleic acid bases, one or more kinds of lipid molecules, water, one or more kinds of monosaccharide molecules, and one or more kinds of ions (the kind, the number, and the combination thereof may be optional)", and a third probe "that is one or more selected from a first point electric charge having an electric charge of +1, a second point electric charge having an electric charge of −1, a third point electric charge having an electric charge of +0.1, a fourth point electric charge having an electric charge of −0.1, a dipole in which the first point electric charge and the second point electric charge are disposed to be separated from each other, and a fifth point electric charge having an electric charge of 0 (the kind, the number, and the combination thereof may be optional)" are used as the probes. The second probe may be formed of one or more kinds of monatomic ions, and the third probe may be formed of one or more of the first to fifth point electric charges. The "monatomic ions" and the "point electric charges" are an example of the "single point".

<Calculation of Feature Quantity and Screening>

The configurations of devices for calculating the feature quantity (the feature quantity according to Modification Example 6) and performing screening (the feature quantity calculating device and the screening device) are the same as those in the first embodiment (see FIGS. 1 to 3). However, a descriptor according to Modification Example 6 (the feature quantity according Modification Example 6) is calculated and stored instead of the three-dimensional AAM descriptor 230 in FIG. 3, and an invariant feature quantity according to Modification Example 6 is calculated and stored instead of the invariant AAM descriptor 240. The procedures for calculation of the feature quantity and screening are the same as those in the first embodiment, and the feature quantity calculating method, the feature quantity calculating program, the screening method, and the screening program according to the embodiment of the present invention can be used. Specifically, the invariant feature quantity according to Modification Example 6 is calculated (see Equation (2)) by calculating the distribution function (see Equation (1)) using the first probe "that is formed of one or more kinds of amino acids", the second probe "that is formed of one or more selected from one or more kinds of nucleic acid bases, one or more kinds of lipid molecules, water, one or more kinds of monosaccharide molecules, and one or more kinds of ions (the kind, the number, and the combination thereof may be optional)", and a third probe "that is formed of one or more selected from a first point electric charge having an electric charge of +1, a second point electric charge having an electric charge of −1, a third point electric charge having an electric charge of +0.1, a fourth point electric charge having an electric charge of −0.1, a dipole in which the first point electric charge and the second point electric charge are disposed to be separated from each other, and a fifth point electric charge having an electric charge of 0 (the kind, the number, and the combination thereof may be optional)" instead of the "amino acid" as the probe in the calculation of the feature quantity according to the first embodiment (see FIG. 5), calculating the feature quantity according to Modification Example 6 from the distribution function, and performing Fourier transform on the feature quantity according to Modification Example 6. Further, the invariant feature quantity according to Modification Example 6 may be calculated by angular integration of the correlation function (see Equations (3) and (4)) using the feature quantity according to Modification Example 6 of two kinds of probes in which at least one of the first probe, the second probe, or the third probe is different. As described above, the second probe may be formed of one or more kinds of monatomic ions, and the third probe may be formed of one or more of the first to fifth point electric charges.

In addition, the target compound can be extracted based on the similarity between the feature quantity according to Modification Example 6 of a plurality of compounds and the feature quantity according to Modification Example 6 of the binding compound using the feature quantity according to Modification Example 6 instead of the three-dimensional AAM descriptor in the first embodiment. A compound having a similarity greater than or equal to the threshold may be extracted, or a compound may be extracted in a descending order of the similarity.

<Calculation of Feature Quantity and Creation of Compound>

The configurations of devices for calculating a feature quantity (the feature quantity according to Modification Example 6) and creating a compound (the feature quantity calculating device and the compound creating device) are the same as those in the second embodiment (see FIGS. 20 to 22). However, a descriptor according to Modification Example 6 (the feature quantity according to Modification Example 6) is calculated and stored instead of the three-dimensional AAM descriptor 230 in FIG. 22, and an invariant feature quantity according to Modification Example 6 is calculated and stored instead of the invariant AAM descriptor 240. The procedures for calculation of the feature quantity and creation of a compound are the same as those in the second embodiment, and the feature quantity calculating method, the feature quantity calculating program, the compound creating method, and the compound creating program according to the embodiment of the present invention can be used. In Modification Example 6, a generator is constructed through machine learning (deep learning) using the three-dimensional structure of the compound as teacher data and the feature quantity according to Modification Example 6 as an explanatory variable, and the three-dimensional structure of the target biopolymer can be generated from the feature quantity according to Modification Example 6 of the binding compound that is a compound whose binding to the target biopolymer has been confirmed using the constructed generator. Further, similar to the first to third embodiments, a compound having a three-dimensional structure with different features can be generated by selecting features of a compound to be provided as teacher data.

In the same manner as in the first to third embodiments, since the drug efficacy of a compound (the binding force with respect to the target) is locally exhibited as the result of an interaction between a compound and a probe, in a case where the degree of accumulation of probes is similar between compounds, the compounds have similar binding forces with respect to the targets. That is, the compounds with similar feature quantities according to Modification Example 6 exhibit similar drug efficacies. Therefore, in Modification Example 6, the chemical properties of the compound can be accurately exhibited by the feature quantity according to Modification Example 6. In addition, in a case where the feature quantities according to Modification Example 6 are similar between the target compound and the binding compound that is bound to the target biopolymer, the drug efficacies of both the binding compound and the target compound are similar. Therefore, according to Modification Example 6, a target compound having drug efficacy similar to that of the binding compound is extracted based on the feature quantity according to Modification Example 6 so that screening of a pharmaceutical candidate compound can be efficiently performed. Further, according to Modification Example 6, similarly to the above-described embodiments, a structural formula of a compound having a feature quantity similar to the feature quantity (the feature quantity according to Modification Example 6) of the binding compound (accordingly, the drug efficacies are similar) is generated without performing search, and thus the three-dimensional structure of the pharmaceutical candidate compound can be efficiently created.

In addition, in a case where the calculation of a feature quantity, the screening, and the creation of a compound are performed (corresponding to the third embodiment), the calculation, the screening, and the creation can be performed using the same configurations as in FIGS. 28 to 30.

<Comparison of Number of Hits Based on Each Feature Quantity>

Figure 31:
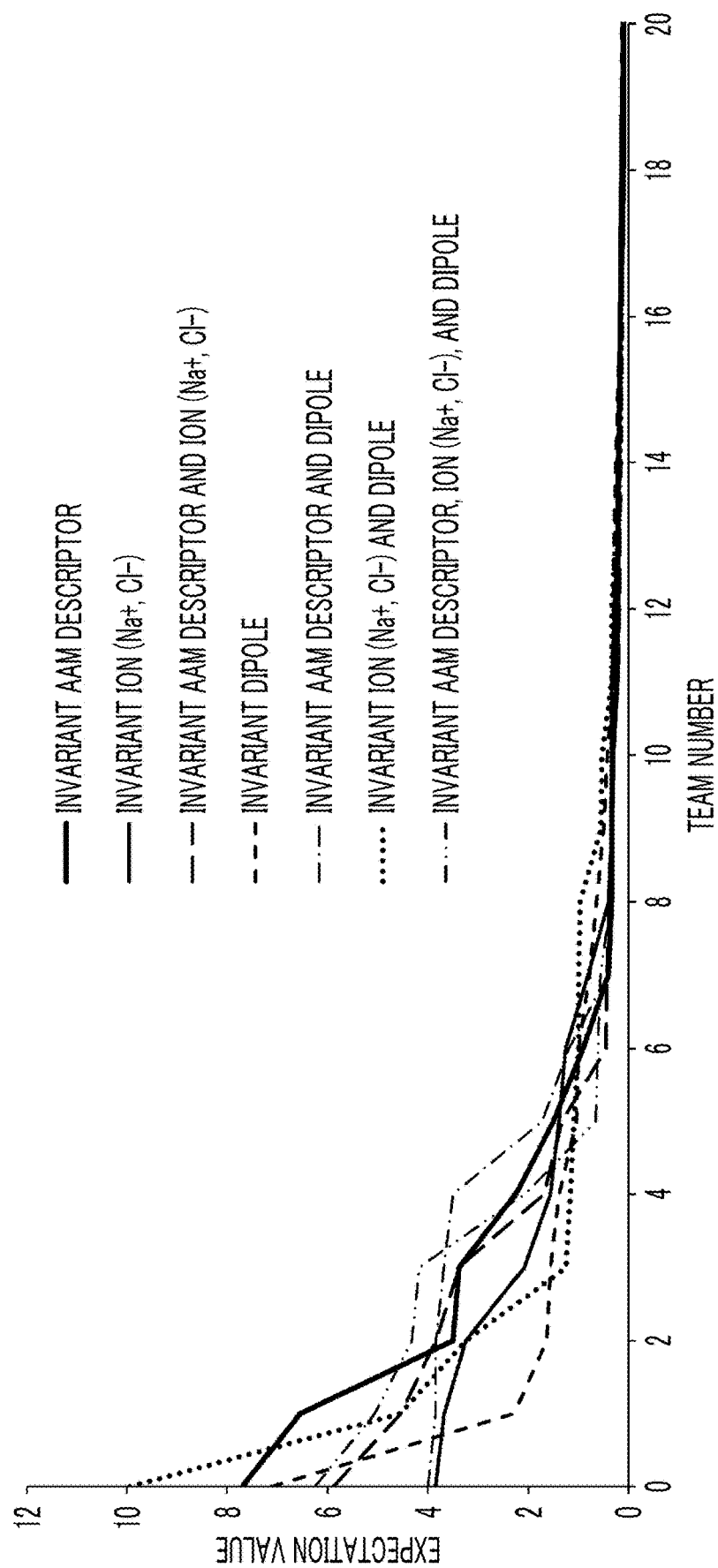
FIG. 31 is a diagram showing a comparison result of easiness of finding a hit.

FIG. 31 is a diagram showing an example of a result of comparative evaluation of the easiness of finding hits based on an invariant feature quantity (an invariant feature quantity using an amino acid as a probe and invariant feature quantities using those other than the amino acid as probes) using a compound as a target structure for the same system (protein ABL1) as in FIG. 13 described above. As shown in FIG. 31, although there is a difference in the effect (the expectation value of the number of hits) depending on the kind of descriptor (feature quantity), it can be seen that the expectation value is improved as compared with the random case (see FIG. 13). Further, FIG. 31 shows a result of clustering with (the number of teams=183), and thus the result (clustering with the number of teams=221) is different from the above-described result in a case where the number of hits for "AAM" is as shown in FIG. 13. As described above, even in a case where the invariant feature quantities using those other than the amino acid as probes are used, screening of a pharmaceutical candidate compound can be efficiently performed.

<Calculation of Feature Quantity Using Generator>

In the first to third embodiments and Modification Examples 1 to 7 described above, the feature quantity is calculated by the feature quantity calculating method including the "three-dimensional structure generating step of generating a three-dimensional structure using a plurality of unit structures for the target structure (from the structural formula or the like)", but the feature quantity (any feature quantity, the first to third feature quantities) may be calculated using the "generator formed through machine learning and calculating the feature quantity from the three-dimensional structure" in the present invention. The generator can be constructed by the "method of constructing a generator including a learning processing step of inputting [a data set for learning using information (three-dimensional images and the like) related to the three-dimensional structures of compounds as teacher data and the feature quantity (for example, any one of the feature quantity according to the first to fourth aspects) as an explanatory variable for a plurality of compounds] to the generator to perform learning through machine learning".

The generator (prediction model, learned model) described above may accept a three-dimensional image as information related to the three-dimensional structure of a compound or may comprise a hierarchical network. The hierarchical network may include a convolution layer that performs a convolution operation using a three-dimensional filter to reduce the feature map (information obtained from the input layer) and a deconvolution layer that performs a deconvolution operation using a three-dimensional filter to enlarge the feature map. The hierarchical network may accept a three-dimensional image in which the kinds of atoms constituting a compound are expressed by a difference in color (for example, a combination of weighted red, green, and blue is used) in the learning processing step. The three-dimensional image may be accepted by being divided into a plurality of channels (for example, three channels of red, green, and blue) corresponding to different colors. Further, the hierarchical network may accept the three-dimensional image by dividing the image into a plurality of channels corresponding to different kinds of atoms in the learning processing step. The hierarchical network may be a convolutional neural network.

Figure 32A:
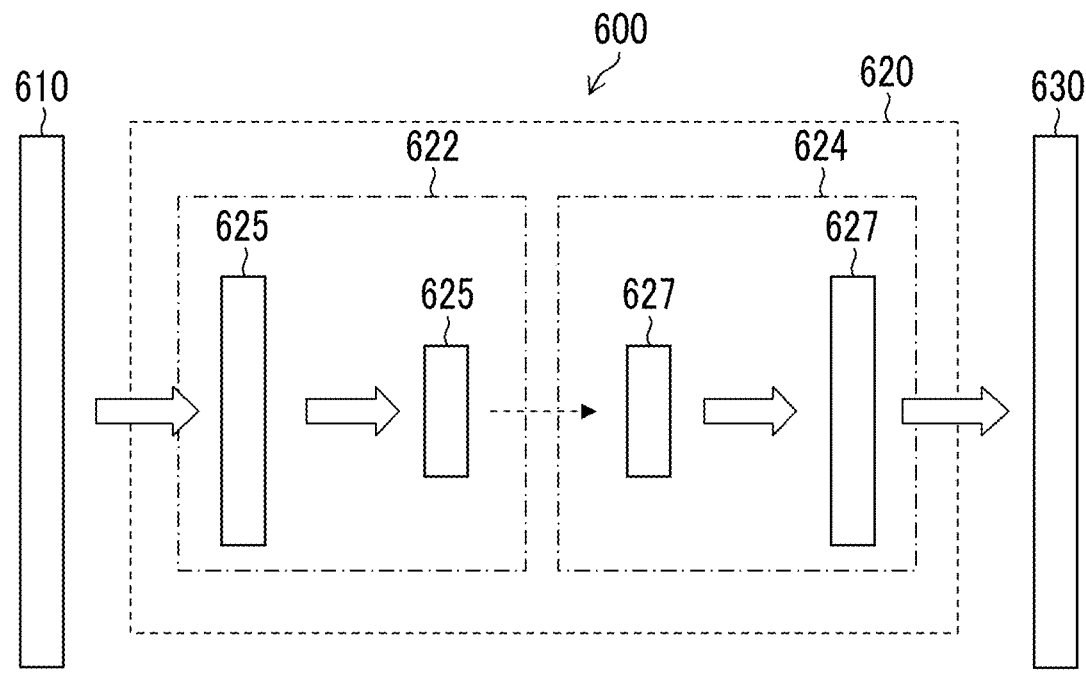
FIGS. 32A and 32B are views showing a configuration example of a hierarchical network.
Figure 32B:
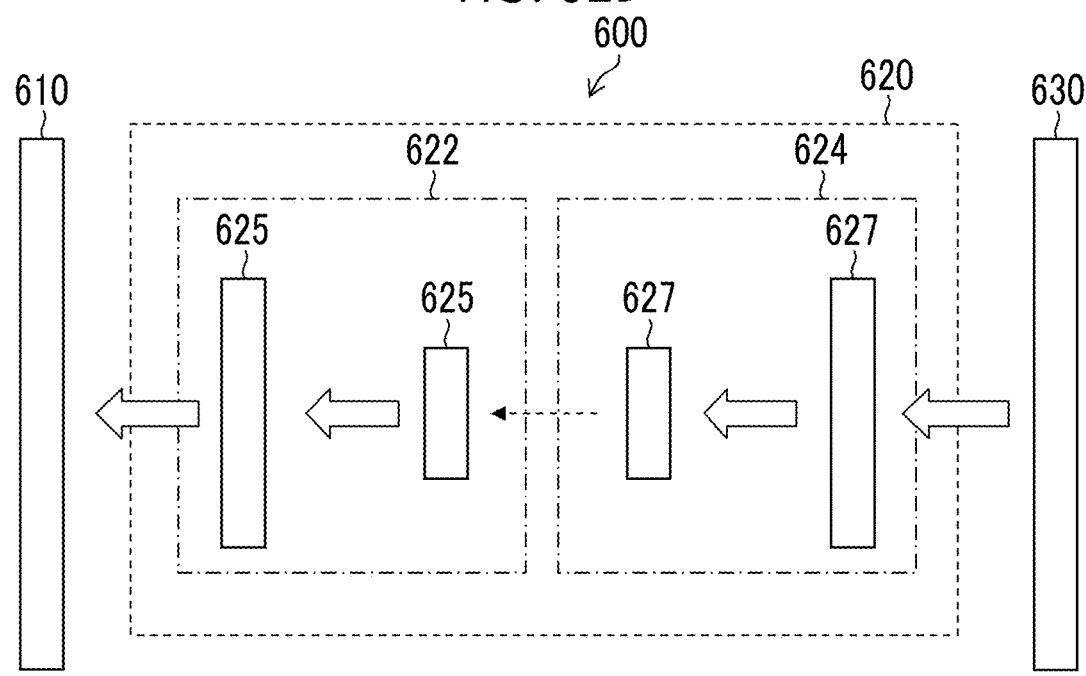

FIGS. 32A and 32B are views showing an example of a "generator that calculates a feature quantity from a three-dimensional structure" formed by using a hierarchical network. In FIG. 32A, a hierarchical network 600 is a convolutional neural network including an input layer 610, an interlayer 620, and an output layer 630. The interlayer 620 comprises a first interlayer 622 and a second interlayer 624. The first interlayer 622 includes a convolution layer that performs a convolution operation and a pooling layer that performs a pooling process (these two layers are collectively referred to as a layer 625 in FIGS. 32A and 32B), and lower-order feature extraction is performed in the layer close to an input side and higher-order feature extraction is performed as the layer approaches an output side. The information (the values of weight parameters of layers and the like) is updated from the input layer 610 toward the output layer 630 during the learning.

The second interlayer 624 includes a deconvolution layer that performs a deconvolution operation using a three-dimensional filter and a reverse pooling layer that performs a reverse pooling process (the two layers are collectively referred to as a layer 627 in FIG. 32A). The feature map is downscaled by the convolution operation and the pooling process in the first interlayer 622, and the feature map is upscaled by the deconvolution operation and the reverse pooling process in the second interlayer 624. The degree of downscaling and upscaling can be adjusted by changing the size of the three-dimensional filter, and as a result, three-dimensional information (the feature quantity obtained by quantifying the degree of accumulation of probes in the three-dimensional space in the periphery of the target structure) with the same size as that of the input three-dimensional image can be obtained. Further, the number and the combination of layers (the convolution layer, the pooling layer, the deconvolution layer, and the reverse pooling layer) in the first interlayer 622 and the second interlayer 624 are not particularly limited (the arrows indicated by dotted lines in FIGS. 32A and 32B indicate that the layers are not provided).

In a case where the hierarchical network 600 with the above-described configuration is used, it is preferable that a process (error back propagation) of comparing the result output by the output layer 630 with the correct answer of recognition (the feature quantity showing the degree of accumulation of probes) for an image set to calculate the loss (error) and updating the weight parameter in the interlayer 620 from the layer on the output side toward the layer on the input side such that the loss decreases is performed in the learning process. Further, the interlayer 620 may include a layer that performs batch normalization in addition to the convolution layer and the pooling layer (and the deconvolution layer and the reverse pooling layer). The batch normalization process is a process of normalizing the distribution of data in a unit of mini-batch in a case of performing learning, and plays a role of quickly proceeding learning, reducing dependence on initial values, suppressing over-fitting, and the like.

In a case where the learning of the above-described hierarchical network 600 is completed, the feature quantity (any feature quantity, the first to third feature quantities) according to the present invention can be calculated by inputting the three-dimensional image (information related to the three-dimensional structure) of the compound. In this case, in a case where the three-dimensional structure information serving as actual data is input to the input layer 610 instead of the three-dimensional structure information serving as learning data, information related to the weight parameter of each layer is updated from the input layer 610 toward the output layer 630 (in the direction of the arrow in FIG. 32A), and the feature quantity is output from the output layer 630.

Figure 34:
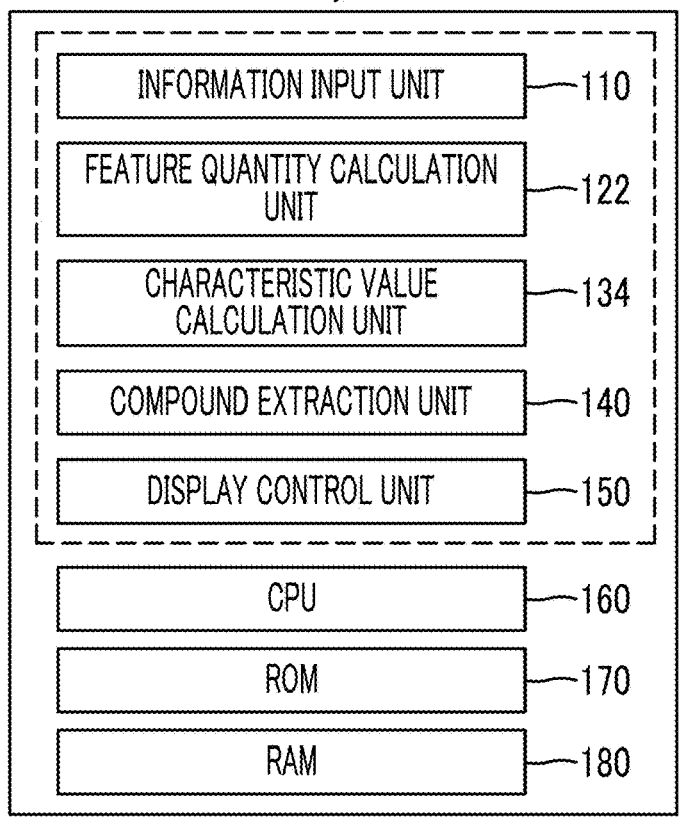
FIG. 34 is a diagram showing another example of a configuration of a processing unit.

Further, in the above-described hierarchical network 600, the three-dimensional structure of a compound can be created based on the feature quantity by reversing the input and the output (by inputting the feature quantity to the output layer 630 and outputting the three-dimensional image from the input layer 610). In this case, in a case where the feature quantity is input to the output layer 630, the information is updated from the output layer 630 toward the input layer 610 (in the direction of the arrow in FIG. 34B), and the three-dimensional image showing the three-dimensional structure of the compound is output from the input layer 610.

<Screening Using Combination with Other Feature Quantities>

<Combined Use with Physical Property Value and/or Toxicity Value>

FIG. 33 is a flowchart showing a screening process based on the feature quantity according to the present invention, the physical property value indicating the physical properties, and/or the toxicity value indicating the toxicity. The process can be performed by the same device as the screening device 10 (the feature quantity calculating device and the screening device) according to the first embodiment and the pharmaceutical candidate compound search device 30 (the feature quantity calculating device, the screening device, and the compound creating device) according to the third embodiment. In these devices, the feature quantity may be calculated using the generator described above. For example, in the screening device 10, screening can be performed using the processing unit 103 having the configuration shown in FIG. 34 in place of the processing unit 100.

The information input unit 110 inputs information (for example, the structural formula, the three-dimensional image, and the like) related to a three-dimensional structures of a plurality of compounds (Step S310: the input step), and the feature quantity calculation unit 122 (the feature quantity calculation unit and the generator) calculates the feature quantity for each of the plurality of compounds based on the input information (Step S312: the feature quantity calculating step). In the processing unit 103 shown in FIG. 34, the feature quantity calculation unit 122 comprises a generator such as the hierarchical network 600 described above, and the feature quantity (any feature quantity, the first to third feature quantities) can be calculated by the feature quantity calculating method according to any one of the first to fourth aspects. Further, a characteristic value calculation unit 134 (characteristic value calculation unit) calculates a physical property value indicating physical properties and/or a toxicity value indicating toxicity for each of the plurality of compounds based on the input information (Step S314: the characteristic value calculating step). The characteristic value calculation unit 134 can calculate, for example, simple physical properties (such as the molecular weight, log P, the polar surface area, and the polarizability) and complex physical properties (such as the solubility and the membrane permeability) as physical property values. These physical properties can be calculated by a known technique (generally commercially available software). Predicted values such as C log P may be used for the physical property values obtained in experiments of log P and the like. Further, the characteristic value calculation unit 134 can calculate "the number of rotatable bonds; RBN)" as a physical property value. The "number of rotatable bonds" can be defined as the "number of single bonds that are not bonded to a heavy element at the terminal without being contained in a ring" as described in, for example, "http://www.talete.mi.it/help/dproperties_help/index.html?constitutional_descriptors.htm".

In addition, the characteristic value calculation unit 134 can calculate, for example, log BCF (fish bioconcentration of the compound), Ames (mutagenicity), skin sensitization, or the like as toxicity. The toxicities are described in, for example, "Bioconcentration Prediction under the Amended Chemical Substances Control Law of Japan, Sumitomo Chemical Co., Ltd., Environmental Health Science Laboratory, 2006" (https://www.sumitomo-chem.co.jp/rd/report/files/docs/20060106_vpv.pdf), "Mortelmans K & Zeiger E (2000): The Ames *Salmonella*/microsome mutagenicity assay. Mutat. Res. 455 (1-2), 29-60." http://www.oyc-bio.jp/pages/reagent/ames/index, and https://staff.aist.go.jp/yamane.t/RS/index.files/42RS-Kanazawa.pdf. Further, the toxicities can be calculated by known software "DEREK" (http://ls.ctc-g.co.jp/products/lhasa/derek_nexus.html) or "OECD QSAR ToolBox" (https://www.nite.go.jp/data/000084383.pdf).

The feature quantities, the physical property values, and/or the toxicity values of all the plurality of compounds are calculated (YES in Step S316), and the information input unit 110 inputs the target values of the feature quantities, the physical property values and/or the toxicity values (Step S318: the target value input step). The compound extraction unit 140 determines whether the similarity between the feature quantities (the similarity between the feature quantity of the reference compound and the feature quantity for each of the plurality of compounds described above) satisfies the target value and the physical property value and/or the toxicity value satisfies the target value (Steps S320 and S322: the extracting step) and extracts a compound in which the similarity between the feature quantities satisfies the target value and the physical property value and/or the toxicity value satisfies the target value from the plurality of compounds (Step S324: extracting step). The compound extraction unit 140 completes the search in a case where the determination and extraction of all the plurality of compounds are completed (Step S326). By performing such a process, a compound having improved physical properties and/or improved toxicity can be extracted while the binding force (corresponding to the feature quantity) is maintained.

<Example of Screening Using Combination with Physical Property Value>

An example of screening based on the feature quantity according to the present invention and the physical property value indicating the physical property will be described. Here, a case of extracting "a compound in which the similarity of the feature quantity according to the present invention is less than or equal to the reference value and the physical property value satisfies the target value" from a plurality of compounds (library compounds) with respect to the original compound will be described. As described above, the screening device 10 including the processing unit 103 with the configuration shown in FIG. 34 can perform such a screening process. The screening device 10 may perform the process according to the procedure shown in the flowchart of FIG. 33 or may perform the process according to the procedure obtained by changing the procedure of FIG. 33 within the range of the tenth aspect of the present invention as described below (for example, the order of the process may be replaced or the extracting step may be performed for a plurality of compounds at once instead of being repeatedly performed for each compound).

Figure 35A:
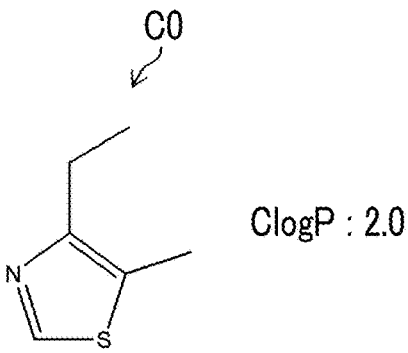
FIGS. 35A and 35B are diagrams showing a state of screening in a case where the feature quantity according to the present invention and a physical property value are used in combination.
Figure 35B:
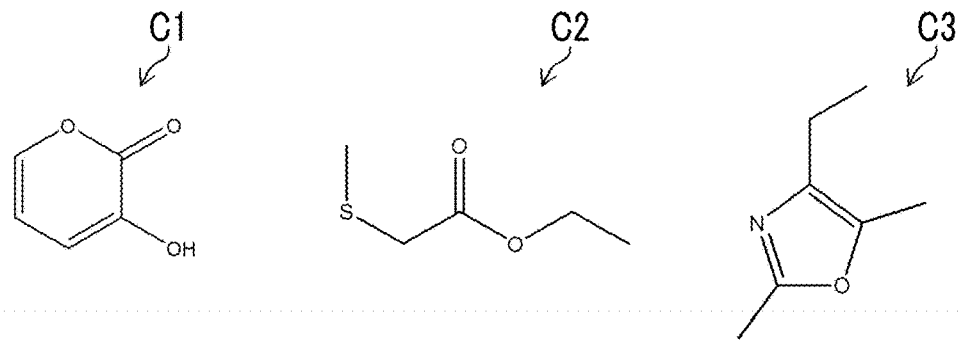
Figure 36:
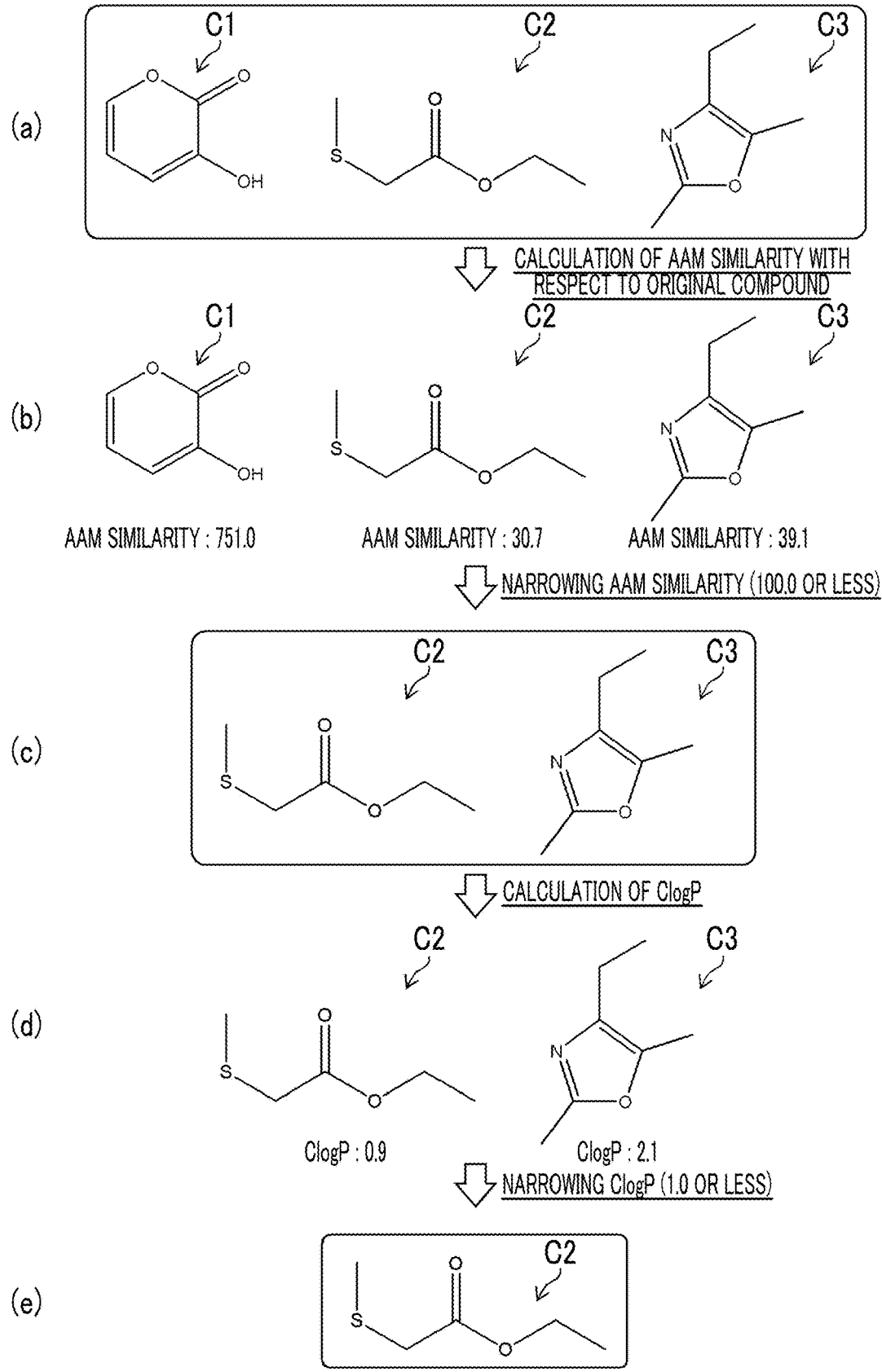
FIG. 36 is another diagram showing a state of screening in a case where the feature quantity according to the present invention and a physical property value are used in combination.

The information input unit 110 inputs information (the structural formulae, the three-dimensional images, and the like) related to the three-dimensional structures of the original compound C0 shown in FIG. 35A and the plurality of compounds C1 to C3 (library compounds) shown in FIG. 35B (input step), and the feature quantity calculation unit 122 (the feature quantity calculation unit and the generator) calculates the feature quantities according to the present invention for these compounds based on the input information (feature quantity calculating step). In the present example, the feature quantity calculation unit 122 uses a charge-neutral amino acid as a probe and calculates the feature quantity (second feature quantity) using the feature quantity calculating method according to the second aspect. Further, the compound extraction unit 140 calculates the similarity between the feature quantities (the similarity between the feature quantity of the original compound and the feature quantity for each of the library compounds) ((a) and (b) of FIG. 36; the extracting step). In the case of the present example, the similarity between the feature quantities between the compounds C0 and the compounds C1 to C3 is as shown in (b) of FIG. 36. Further, the "AAM similarity" in FIG. 36 indicates the similarity (similarity distance) of the feature quantity according to the present invention between the original compound C0 and the library compounds C1 to C3.

The compound extraction unit 140 determines whether the similarity between the feature quantities satisfies the target value for each of the library compounds (extracting step). Here, in a case where the threshold for the similarity (similarity distance) is set to 100.0, the determination is affirmed for compounds C2 and C3 from among the compounds C1 to C3. Further, the characteristic value calculation unit 134 (characteristic value calculation unit) calculates C log P (an example of the physical property value) for the compounds C2 and C3 ((c) and (d) of FIG. 36; the characteristic value calculating step). The calculation results are as shown in (d) of FIG. 36. The compound extraction unit 140 determines whether C log P for the compounds C2 and C3 satisfies the target value (here, the threshold is set to 1.0 or less) (extracting step) and extracts the compound C2 that satisfies the target value. ((e) in FIG. 36).

Figure 37:
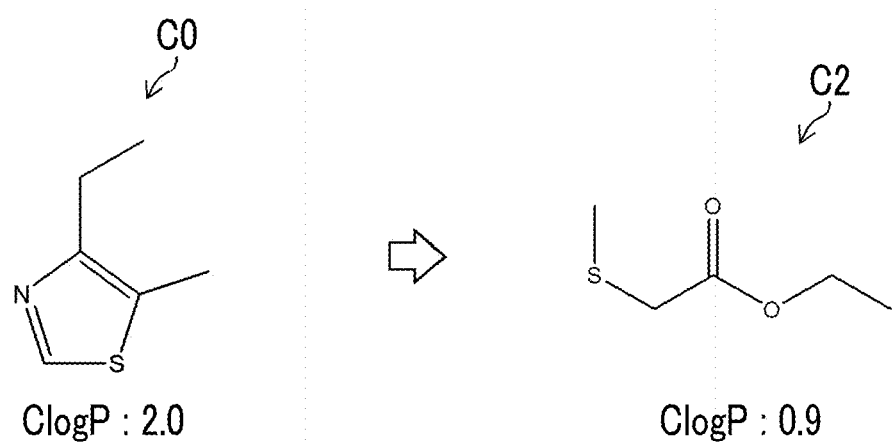
FIG. 37 is still another diagram showing a state of screening in a case where the feature quantity according to the present invention and a physical property value are used in combination.

In this manner, in the search for compounds C1 to C3 in the library, the skeleton of the compound C0 can be modified to the compound C2 having a feature quantity that is similar to that of the original compound C0 (the similarity is 100.0 or less) and having a low C log P (1.0 or less) (see FIG. 37). Further, the low C log P indicates that the compound has high hydrophilicity and excellent oral absorptivity.

<Combined Use with Structural Feature Quantity>

Similar to the case of the combined use with the physical property value and/or the toxicity value described above, as described below with reference to the flowchart of FIG. 38, the screening can be performed by combining the feature quantity according to the present invention with the feature quantity (structural feature quantity) indicating the structure of a compound. In this process, for example, the screening can be performed using the processing unit 104 shown in FIG. 39 in place of the processing unit 100 in the screening device 10. Further, in regard to the flowchart of FIG. 38, the same process as in FIG. 33 is denoted by the same step number, and thus the detailed description thereof will not be repeated.

The feature quantity calculation unit 122 calculates the feature quantity of the input compound using the feature quantity calculating method according to any one of the first to fourth aspects (Step S312: the first feature quantity calculating step), and the structural feature quantity calculation unit 136 (the structural feature quantity calculation unit) calculates the structural feature quantity indicating the structure of a compound based on the input information for each of the plurality of compounds (Step S315: the second feature quantity calculating step). The structural feature quantity calculation unit 136 can calculate, for example, a Fingerprint descriptor (a descriptor expressing the presence or absence of a functional group or a partial structure by 0 and 1) as the structural feature quantity. The information input unit 110 inputs the target value of the feature quantity and the threshold for the structural feature quantity (Step S319: the target value input step), and the compound extraction unit 140 extracts a compound in which the similarity of the feature quantity (the similarity between the feature quantity of the reference compound and the feature quantity for each of the plurality of compounds) satisfies the target value and the similarity of the structural feature quantity (the similarity between the structural feature quantity of the reference compound and the structural feature quantity for each of the plurality of compounds) is less than or equal to the threshold (YES in Step S321 and Step S323) (Step S324: the extracting step). As the similarity of the structural feature quantity, the Tanimoto coefficient for the Fingerprint descriptor can be used. The Tanimoto coefficient is calculated as a real number of 0 to 1 in a case where the Fingerprint descriptors of two compounds intended to be compared are provided and is defined such that the similarity increases as the coefficient is closer to 1. By performing such a process, compounds having different skeletons can be extracted while the binding force (corresponding to the feature quantity) is maintained.

<Example of Screening Using Combination with Structural Feature Quantity>

An example of screening based on the feature quantity according to the present invention and the structural feature quantity will be described. Here, a case of extracting a "compound in which the similarity of the feature quantity according to the present invention is less than or equal to the reference value and the similarity of the structural feature quantity with the original compound satisfies the target value" from a plurality of compounds C4 to C6 (library compounds) with respect to the original compound C0 shown in FIG. 40A will be described. As described above, the screening device 10 including the processing unit 104 with the configuration shown in FIG. 39 can perform the screening process. The screening device 10 may perform the process according to the procedure shown in the flowchart of FIG. 38. FIG. 38 or may perform the process according to the procedure obtained by changing the procedure of FIG. 38 within the range of the eleventh aspect of the present invention as described below (for example, the order of the process may be replaced or the extracting step may be performed for a plurality of compounds at once instead of being repeatedly performed for each compound).

Figure 41:
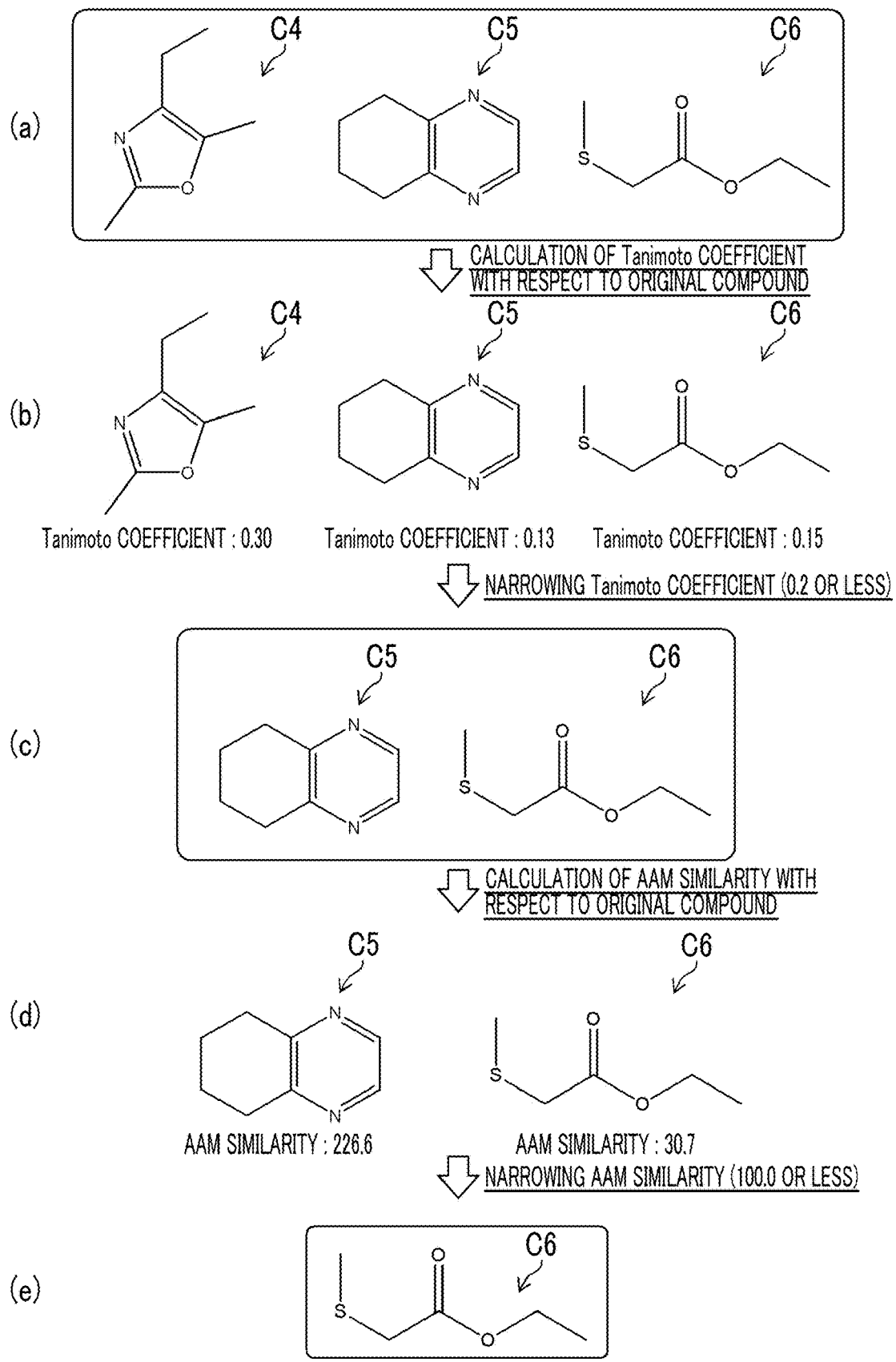
FIG. 41 is another diagram showing a state of screening in a case where the feature quantity according to the present invention and a structural feature quantity are used in combination.

The structural feature quantity calculation unit 136 (structural feature quantity calculation unit) calculates the structural feature quantity indicating the structure of the compound based on the input information for each of the compounds C4 to C6 (second feature quantity calculating step). In the present example, the structural feature quantity calculation unit 136 calculates the Fingerprint descriptor as the structural feature quantity. Further, the compound extraction unit 140 calculates the Tanimoto coefficient indicating the similarity between the structural feature quantities of the original compound C0 and the compounds C4 to C6 (library compounds) ((a) and (b) in FIG. 41; the extracting step) and extracts a compound in which the Tanimoto coefficient is 0.2 (threshold) or less (extracting step). In the present example, the compounds C5 and C6 are extracted as shown in (c) of FIG. 41.

The feature quantity calculation unit 122 calculates the feature quantity according to the present invention for the compounds C5 and C6 extracted by the Tanimoto coefficient (feature quantity calculating step). In the present example, the feature quantity calculation unit 122 uses a charge-neutral amino acid as a probe and calculates the feature quantity (second feature quantity) using the feature quantity calculating method according to the second aspect. The compound extraction unit 140 calculates the similarity between the feature quantities of the original compound C0 and the compounds C5 and C6 ((c) and (d) of FIG. 41) and extracts the compound C6 in which the similarity (similarity distance) satisfies the target value (threshold: 100.0 or less) ((e) in FIG. 41). Further, the "AAM similarity" in FIG. 41 indicates the similarity (similarity distance) between the feature quantities according to the present invention for the original compound C0 and the library compounds C4 to C6.

Figures 42, 43A, 43B:
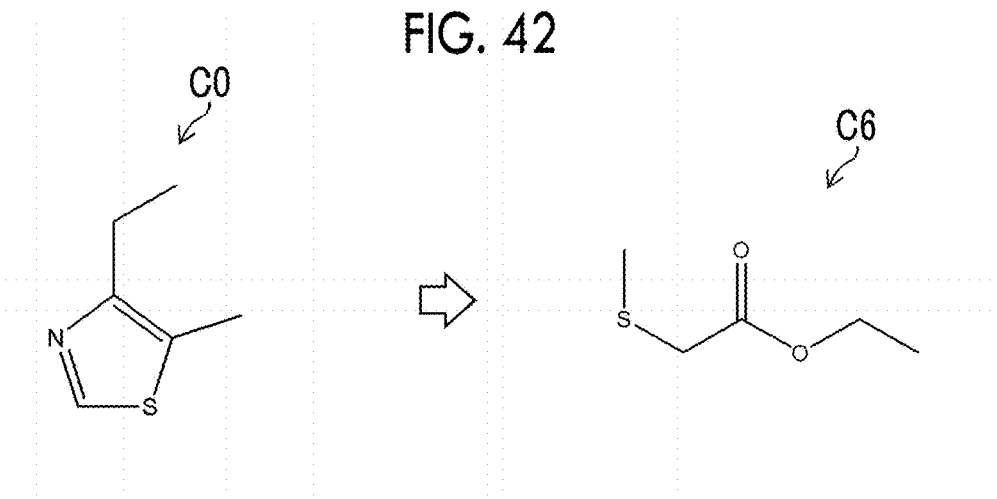
FIG. 42 is still another diagram showing a state of screening in a case where the feature quantity according to the present invention and a structural feature quantity are used in combination.
FIGS. 43A and 43B are diagrams showing an output example in a case where the feature quantity according to the present invention and another feature quantity are used in combination.

In this manner, in the search for library compounds C4 to C6, the skeleton of the compound C0 can be modified to the compound C6 having a feature quantity that is similar to that of the original compound C0 (the similarity is 100.0 or less) and having a different structure (with a Tanimoto coefficient of 0.2 or less) (see FIG. 42).

<Output Example in Case of Combined Use with Another Feature Quantity>

FIGS. 43A and 43B are diagrams showing an output example in a case where the feature quantity according to the present invention and another feature quantity (the physical property value, the toxicity value, or the like) are used. FIG. 43A is a diagram showing the structures of two compounds (compounds A and B) for cases 1 to 3, and FIG. 43B is a diagram showing the similarity distance of the feature quantity and C log P (predicted value of log P: an example of the physical property value) for each case. The "similarity distance (AAM descriptor)" in the figure is an index indicating the similarity of the feature quantity (converted into an invariant with respect to rotation and translation) according to the present invention in a case where 20 kinds of amino acids are used as probes, and the fact that this value is 100 or less can be used as a reference for "whether or not the feature quantities are similar". That is, in the cases 1 to 3 shown in FIGS. 43A and 43B, it can be said that "the feature quantities of the compounds A and B are similar (therefore, the binding forces are similar)". Further, in regard to C log P shown in FIG. 43B, it can be said that "a difference in physical properties is large in a case where the value is different by 1" (therefore, the compounds of the cases 1 to 3 have a large difference in physical properties). As described above, it can be seen that a compound having improved physical properties and/or improved toxicity while maintaining the binding force can be extracted using a combination of the feature quantity and another feature quantity.

Figures 44A, 44B:
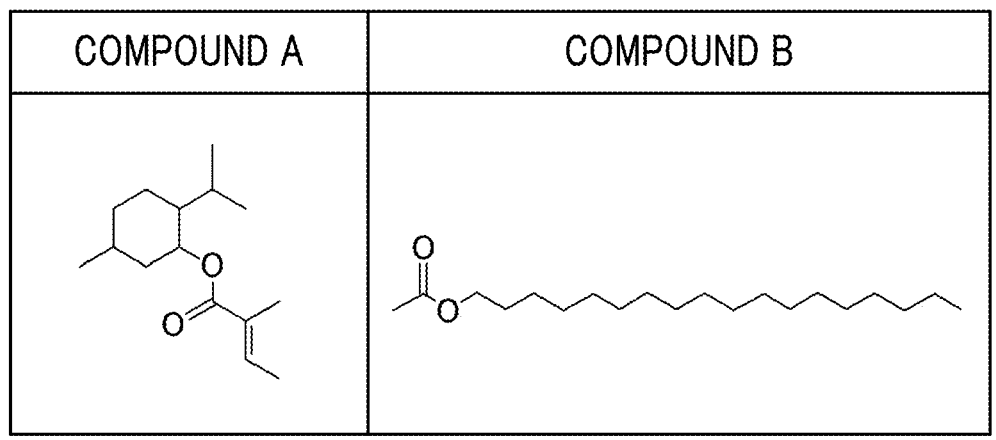
FIGS. 44A and 44B are other diagrams showing an output example in a case where the feature quantity according to the present invention and another feature quantity are used in combination.

Further, FIGS. 44A and 44B show an example of physical property values for a compound having a large similarity distance. FIG. 44A shows the structure of the compound, and FIG. 44B shows the similarity distance of the feature quantity and C log P.

Screening of Compound with Improved Binding Force (Example 1)

Figure 38:
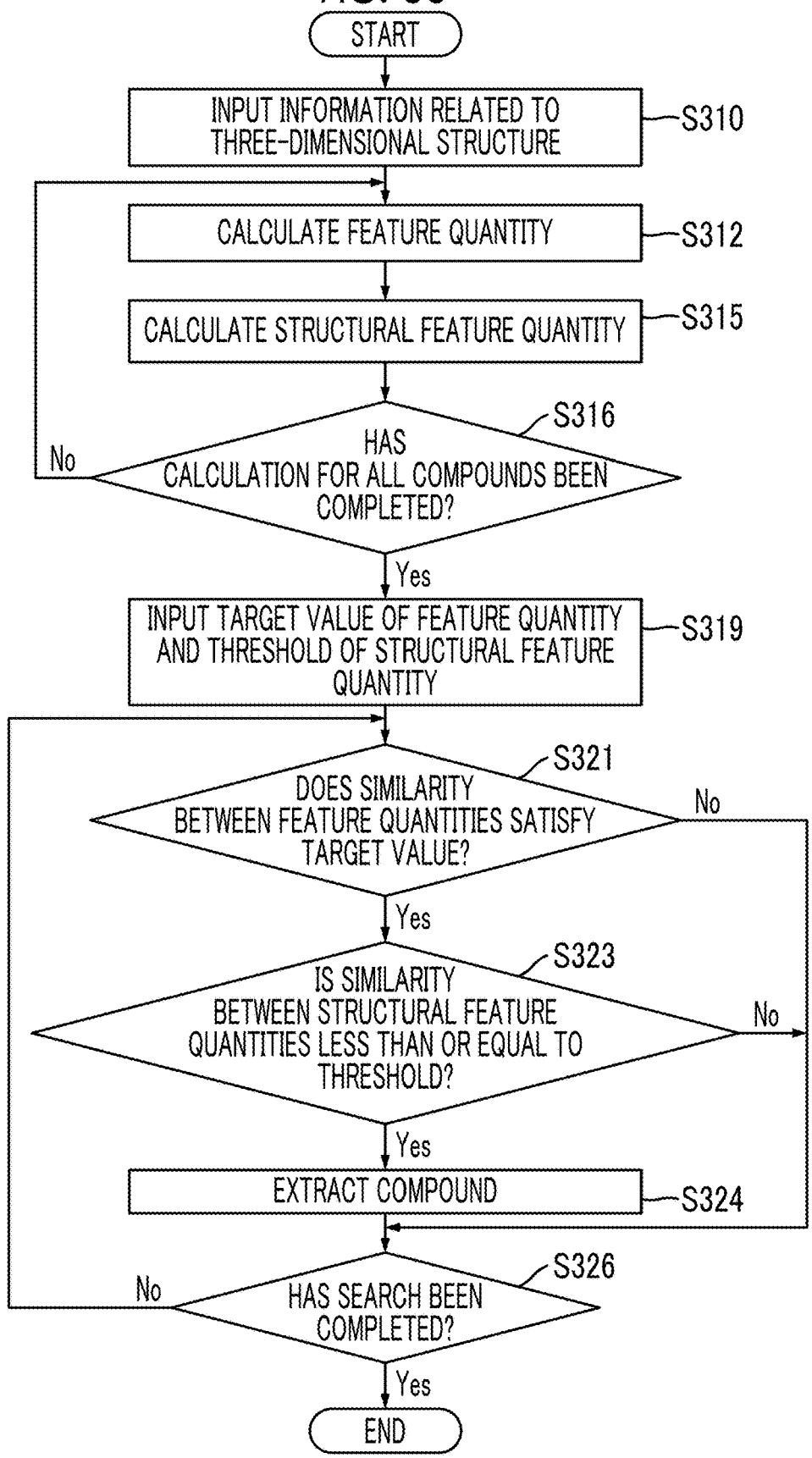
FIG. 38 is a flowchart showing a screening process in a case where the feature quantity according to the present invention and another feature quantity are used in combination.
Figure 45:
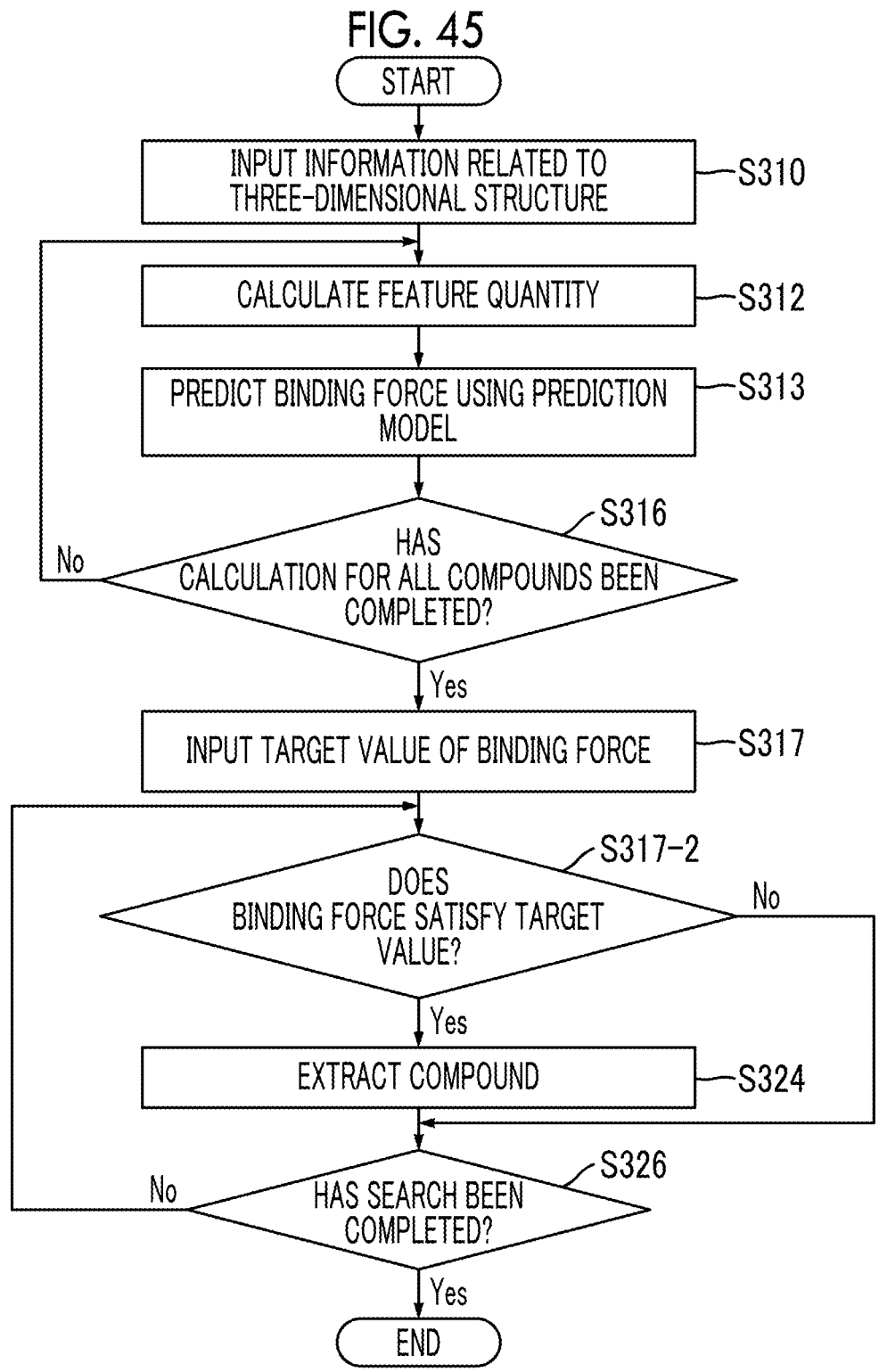
FIG. 45 is another flowchart showing a screening process in a case where the feature quantity according to the present invention and a prediction model are used.
Figure 46:
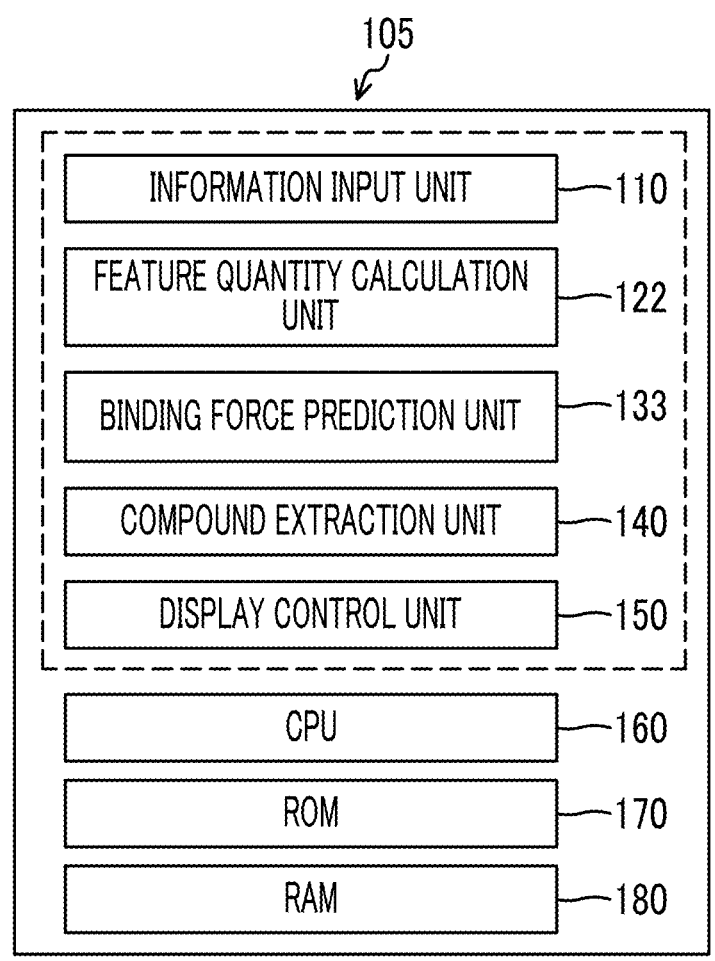
FIG. 46 is a diagram showing still another example of a configuration of a processing unit.

In the aspect (flowchart) described on FIGS. 33 and 38, a compound whose binding force (corresponding to the feature quantity) to the reference compound is maintained and whose physical property value and the like satisfy the target value is extracted. Meanwhile, according to the process shown in the flowchart of FIG. 45, screening of a compound having an improved binding force (a compound having a higher binding force than that of the reference compound) can be performed. Such a process can be performed by, for example, the screening device 10 (see FIG. 1) comprising the processing unit 105 shown in FIG. 46 in place of the processing unit 100. Further, in regard to the flowchart of FIG. 45, the same process as in FIGS. 33 and 38 is denoted by the same step number, and thus the detailed description thereof will not be repeated.

The binding force prediction unit 133 predicts the binding force of a compound using a "prediction model that outputs a binding force with another compound based on a feature quantity" (see an additional note 19 described later) (Step S313: the predicting step). The prediction model according to the additional note 19 can be generated by the "prediction model generating method" described in an additional note 18. In a case where the calculation of the feature quantities and the prediction of the binding forces for all the compounds are completed (YES in Step S316), the information input unit 110 inputs the target value of the binding force by the user's operation or the like via the operation unit 400 (see FIG. 1) (Step S317: the extracting step). The compound extraction unit 140 extracts a compound whose binding force satisfies the target value from the plurality of compounds (in a case of YES in Step S317-2, the compound is extracted in Step S324: the extracting step). By performing such a process, screening of a compound having an improved binding force can be performed.

Screening of Compound with Improved Binding Force (Example 2)

Figure 39:
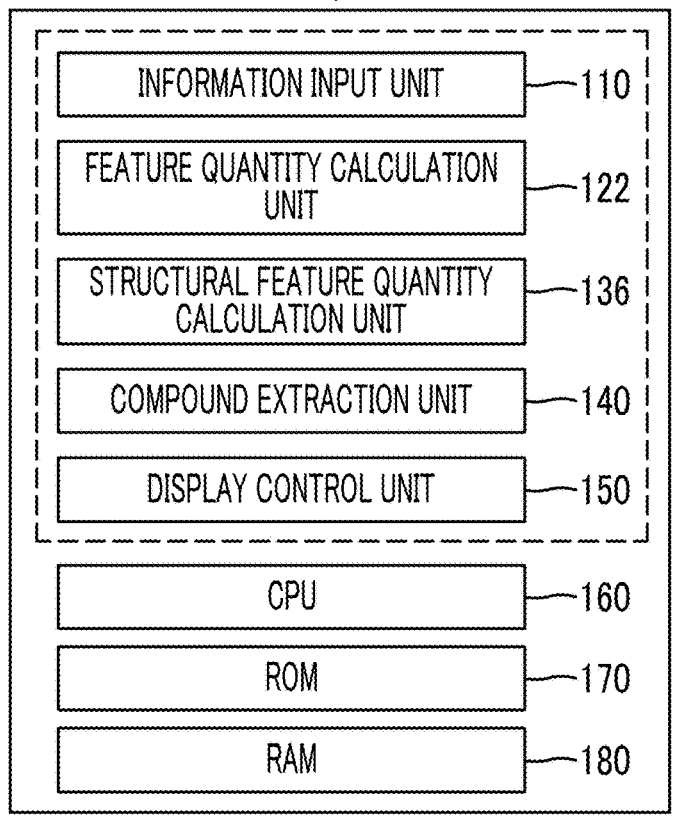
FIG. 39 is a diagram showing still another example of a configuration of a processing unit.
Figure 40A:
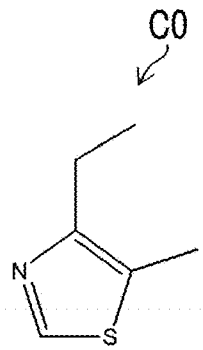
FIGS. 40A and 40B are diagrams showing a state of screening in a case where the feature quantity according to the present invention and a structural feature quantity are used in combination.
Figure 40B:
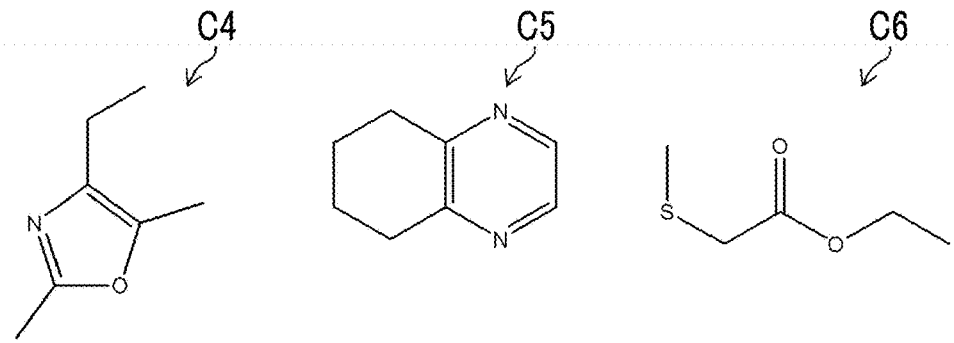
Figure 47:
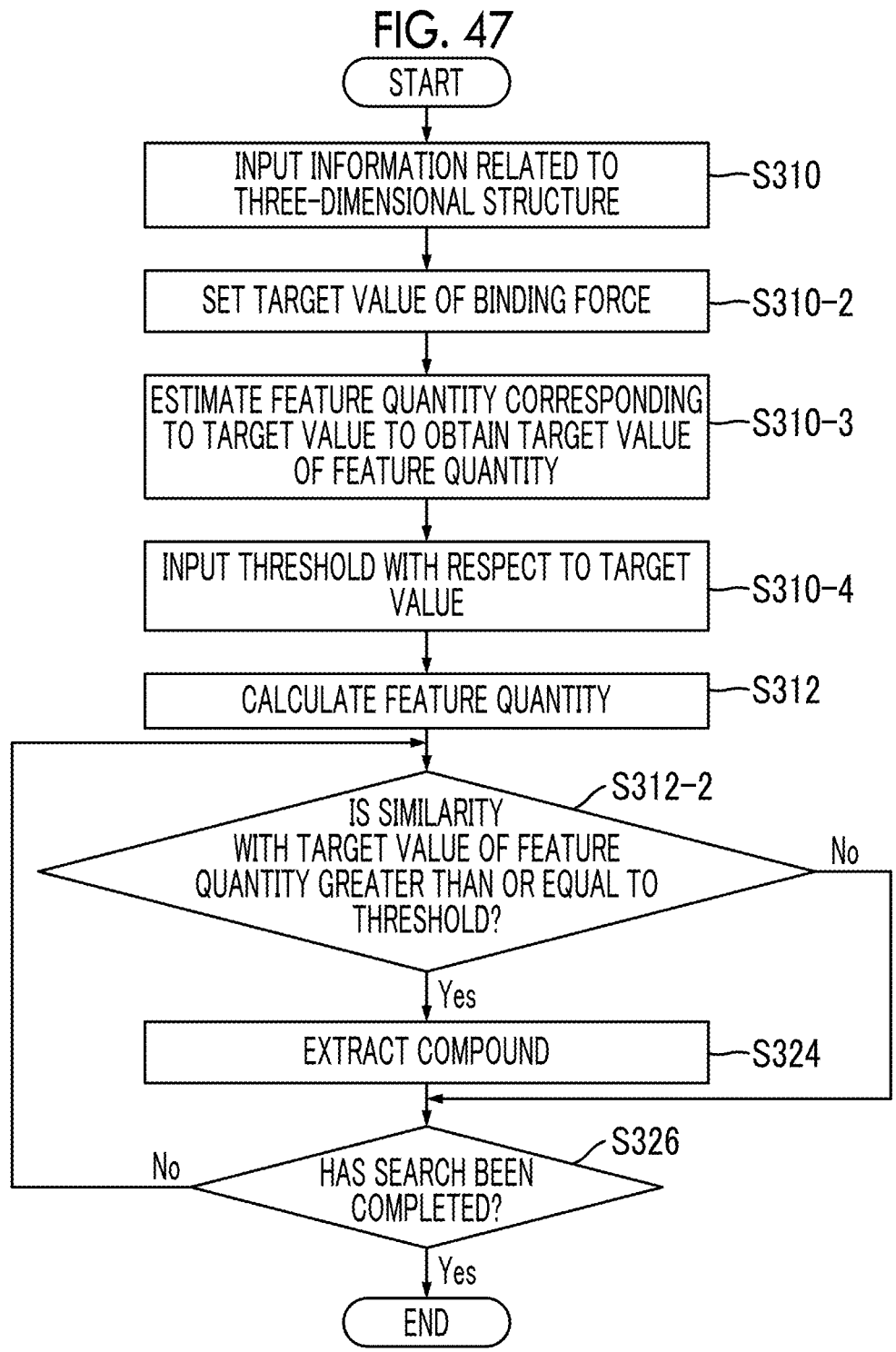
FIG. 47 is still another flowchart showing a screening process in a case where the feature quantity according to the present invention and a prediction model are used.

FIG. 47 is a flowchart showing another example of screening of a compound having an improved binding force. These processes can be performed by the screening device 10 comprising the same processing unit 105 as in FIG. 46. Further, in FIG. 47, the same process as in the flowcharts in FIGS. 33, 35, and 39 is denoted by the same step number, and detailed description thereof will not be provided.

The binding force prediction unit 133 sets a target value of the binding force based on the user's operation or the like (Step S310-2: the setting step). Here, the binding force prediction unit 133 can set a target value greater than the binding force of the reference compound. Further, the binding force prediction unit 133 estimates the feature quantity corresponding to the target value of the binding force using the above-described prediction model and sets the estimated feature quantity as the target value of the feature quantity (Step S310-3: the estimating step). The information input unit 110 inputs the target value of the feature quantity based on the user's operation or the like (Step S310-4). The feature quantity calculation unit 122 calculates the feature quantity using the feature quantity calculating method according to any one of the first to fourth aspects (Step S312: the feature quantity calculating step), and the compound extraction unit 140 extracts a compound having a feature quantity whose similarity with the feature quantity (that is, the target value of the feature quantity) estimated in Step S310-3 is equal to or greater than the threshold (Step S324: the extracting step). By performing such a process, a compound having a feature quantity corresponding to the target value of the binding force can be extracted, and screening of a compound having an improved binding force can be performed.

As described above, according to the feature quantity calculating method, the feature quantity calculating program, and the feature quantity calculating device of the present invention, it is possible to calculate a feature quantity that accurately shows chemical properties of a target structure. Further, according to the screening method and the screening program of the present invention, screening of a pharmaceutical candidate compound can be efficiently performed using the feature quantity. Further, according to the compound creating method of the present invention, the three-dimensional structure of the pharmaceutical candidate compound can be efficiently created using the feature quantity.

(Additional Note)

In addition to the aspects described above, the contents described below are also included in the scope of the present invention. Further, the method, the device, the program, and the like described below can be realized by the same configurations as those of the first to third embodiments.

(Additional Note 1)

The compound creating method according to an additional note 1 includes an input step of inputting information related to the three-dimensional structures of compounds, a first target value for the feature quantity according to any one of the first to fourth aspects, a second target value for a physical property characteristic value indicating the physical property, and/or a third target value for a toxicity characteristic value indicating the toxicity, a candidate structure acquiring step of changing the three-dimensional structure to obtain a candidate structure, a feature quantity calculating step of calculating the feature quantity for the candidate structure using the feature quantity calculating method according to any one of the first to fourth aspects, a characteristic value calculating step of calculating the physical property characteristic value and/or the toxicity characteristic value for the candidate structure, a candidate structure adopting step of adopting or rejecting the candidate structure, which is a candidate structure adopting step of adopting the candidate structure in a case where the calculated feature quantity, the calculated physical property characteristic value, and/or the calculated toxicity characteristic value satisfies the first target value or the third target value and rejecting the candidate structure in a case where the calculated feature quantity, the calculated physical property characteristic value, and/or the calculated toxicity characteristic value does not satisfy the first target value or the third target value, and a control step of repeatedly performing the processes in the candidate structure acquiring step, the feature quantity calculating step, the characteristic value calculating step, and the candidate structure adopting step until the calculated feature quantity, the calculated physical property characteristic value, and/or the calculated toxicity characteristic value satisfies the first target value or the third target value.

FIG. 48 is a flowchart showing the processes of the compound creating method according to the additional note 1. As described above for the tenth aspect, the screening of a compound can be performed using the feature quantity according to the present invention and the physical property value and/or the toxicity value, and a compound in which the feature quantity according to the present invention satisfies the target value (first target value) and the physical property value and/or the toxicity value satisfies the target value (the second and third target values) can be created by performing the process shown in FIG. 48 in the same manner as in the case of the screening. Further, as the physical property value and/or the toxicity value, the same indices as those described in the section of "Screening using combination with other feature quantities" can be used. Further, the processes shown in FIG. 48 can be performed by the compound creating device 20 (the feature quantity calculating device and the compound creating device; see FIGS. 20 and 21) comprising the processing unit 101, the pharmaceutical candidate compound search device 30 (the feature quantity calculating device, the screening device, and the compound creating device; see FIG. 28) comprising the processing unit 102, or a device or system having a configuration similar to these (the same applies to the aspects shown in the additional notes 2 to 7).

(Additional Note 2)

The compound creating method according to an additional note 2 includes an input step of inputting information related to the three-dimensional structures of compounds, a first target value for the feature quantity according to any one of the first to fourth aspects, a second target value for a physical property characteristic value indicating the physical property, and/or a third target value for a toxicity characteristic value indicating the toxicity, a candidate structure acquiring step of changing the three-dimensional structure to obtain a candidate structure, a feature quantity calculating step of calculating the feature quantity for the candidate structure using the feature quantity calculating method according to any one of the first to fourth aspects, a candidate structure adopting step of adopting the candidate structure, which is a candidate structure adopting step of adopting the candidate structure in a case where the calculated feature quantity is close to the first target value and rejecting the candidate structure in a case where the calculated feature quantity is not close to the first target value, a control step of repeatedly performing the processes in the candidate structure acquiring step, the feature quantity calculating step, and the candidate structure adopting step until the feature quantity satisfies the first target value, a characteristic value calculating step of calculating the physical property characteristic value and/or the toxicity characteristic value for the candidate structure in which the feature quantity satisfies the first target value, and an extracting step of extracting a compound in which the physical property characteristic value and/or the toxicity characteristic value satisfies the second target value and/or the third target value from compounds corresponding to candidate structures in which the physical property characteristic values and/or the toxicity characteristic values are calculated.

Figure 49:
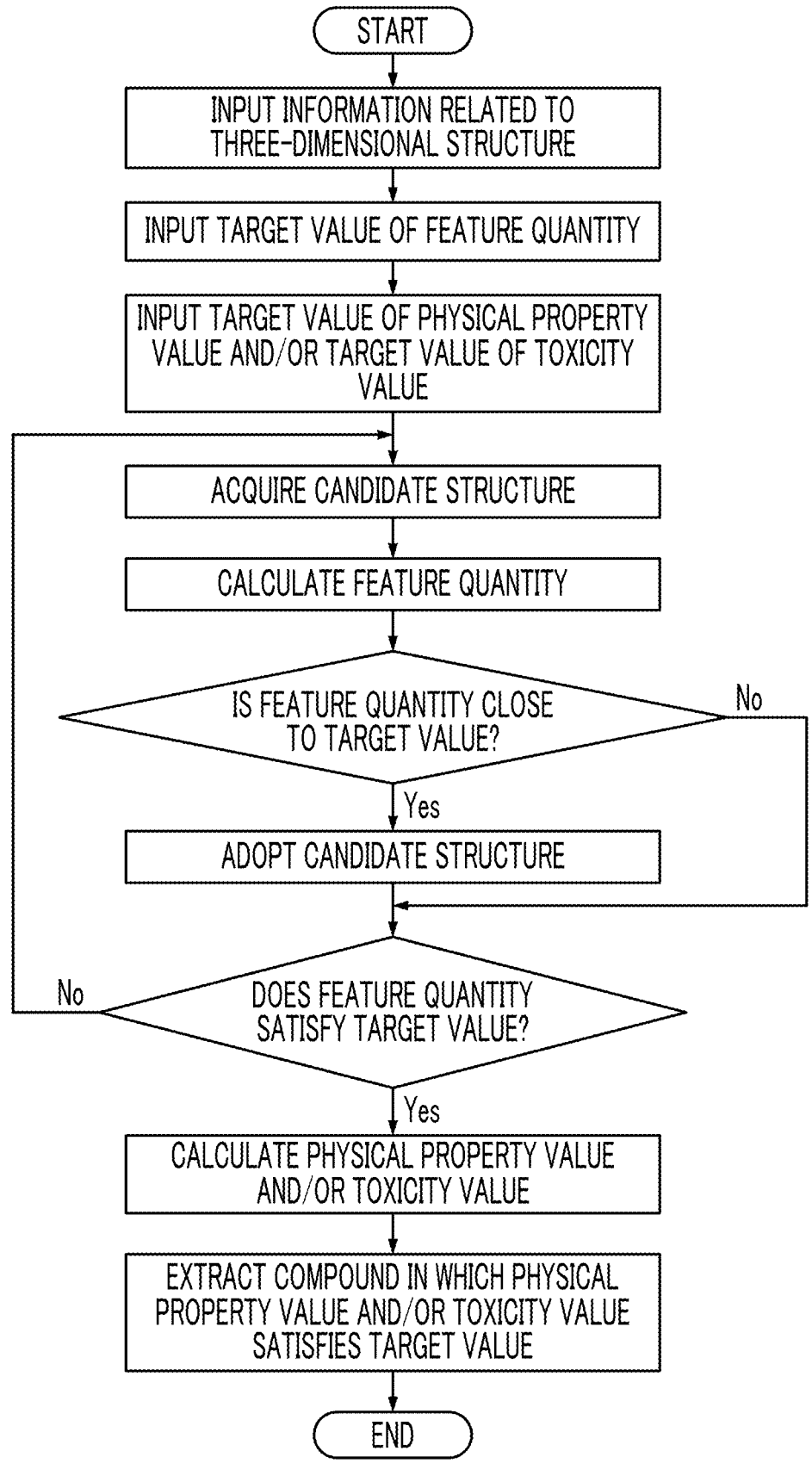
FIG. 49 is another flowchart showing a process of creating a compound in a case where the feature quantity according to the present invention and another feature quantity are used in combination.

FIG. 49 is a flowchart showing the processes of the compound creating method according to the additional note 2. By performing the processes shown in FIG. 49, a compound in which the feature quantity according to the present invention satisfies the target value (the first target value) and the physical property value and/or the toxicity value satisfies the target value (the second and third target values) in the same manner as in the additional note 1 can be created.

(Additional Note 3)

The compound creating method according to an additional note 3 includes an input step of inputting information related to the three-dimensional structures of compounds, a first target value for the feature quantity according to any one of the first to fourth aspects, a second target value for a physical property characteristic value indicating the physical property, and/or a third target value for a toxicity characteristic value indicating the toxicity, a candidate structure acquiring step of changing the three-dimensional structure to obtain a candidate structure, a characteristic value calculating step of calculating the physical property characteristic value and/or the toxicity characteristic value for the candidate structure, a candidate structure adopting step of adopting or rejecting the candidate structure, which is a candidate structure adopting step of adopting the candidate structure in a case where the calculated physical property characteristic value and/or the toxicity characteristic value is close to the second target value and/or the third target value and rejecting the candidate structure in a case where the calculated physical property characteristic value and/or the toxicity characteristic value is not close to the second target value and/or the third target value, a control step of repeatedly performing the processes in the candidate structure acquiring step, the characteristic value calculating step, and the candidate structure adopting step until the calculated physical property characteristic value and/or the toxicity characteristic value satisfies the second target value and/or the third target value, a feature quantity calculating step of calculating the feature quantity of the compound corresponding to the candidate structure in which the calculated physical property characteristic value and/or the toxicity characteristic value satisfies the second target value and/or the third target value using the feature quantity calculating method according to any one of the first to fourth aspects, and an extracting step of extracting a compound in which the feature quantity satisfies the first target value from compounds in which the feature quantities are calculated.

Figure 50:
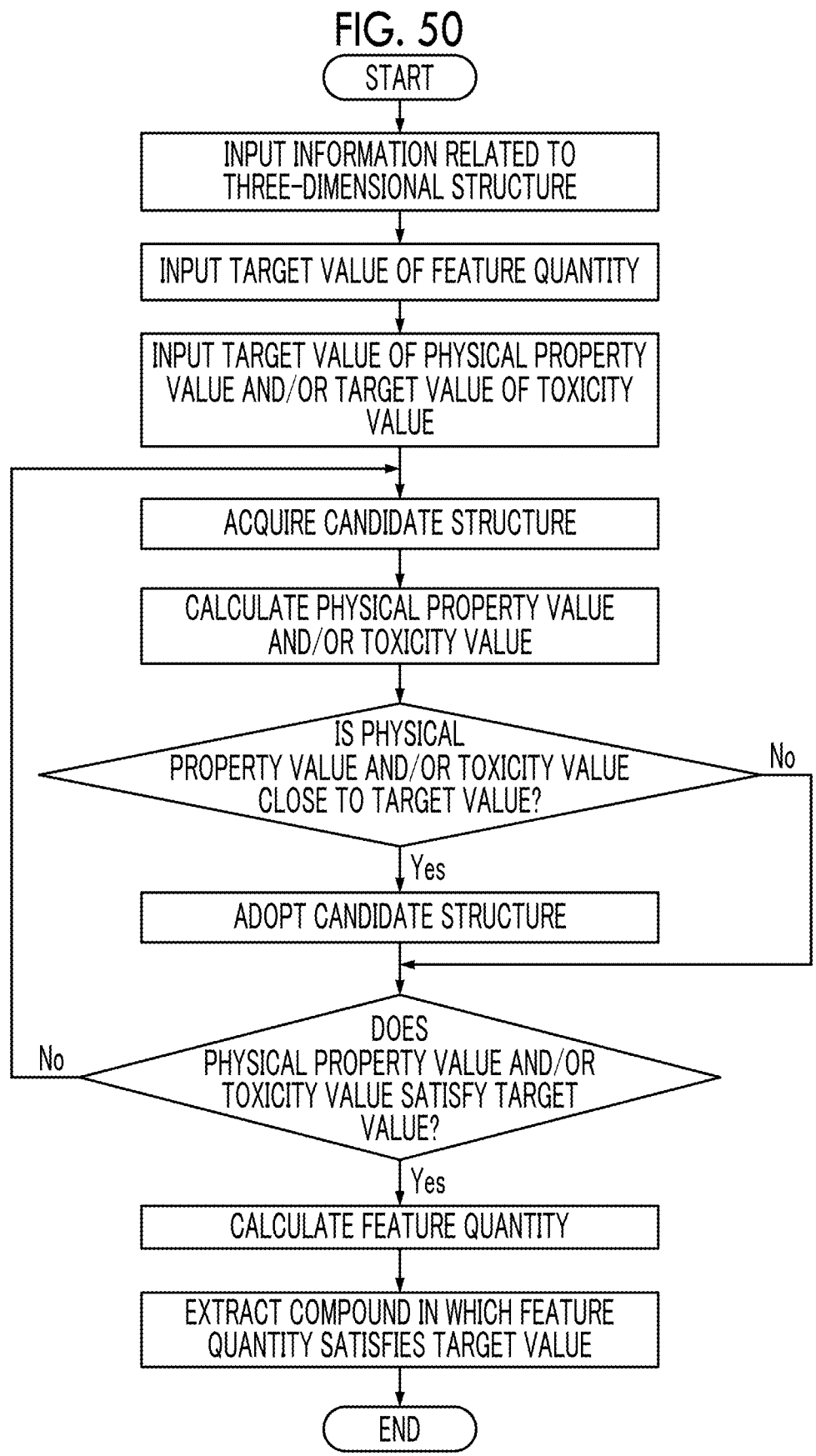
FIG. 50 is still another flowchart showing a process of creating a compound in a case where the feature quantity according to the present invention and another feature quantity are used in combination.

FIG. 50 is a flowchart showing the processes of the compound creating method according to the additional note 3. By performing the processes shown in FIG. 50, a compound in which the feature quantity according to the present invention satisfies the target value (the first target value) and the physical property value and/or the toxicity value satisfies the target value (the second and third target values) in the same manner as in the additional notes 1 and 2 can be created.

(Additional Note 4)

The compound creating method according to an additional note 4 includes an input step of inputting a first target value for the feature quantity according to any one of the first to fourth aspects, a second target value for the physical property characteristic value indicating the physical property, and/or a third target value for the toxicity characteristic value indicating the toxicity for compounds, a creating step of creating a plurality of compounds based on the first target value using the compound creating method according to any one of the fifteenth to seventeenth aspects, a characteristic value calculating step of calculating the physical property characteristic value and/or the toxicity characteristic value of the plurality of compounds, and an extracting step of extracting a compound in which the physical property characteristic value and/or the toxicity characteristic value satisfies the second target value and/or the third target value from the plurality of compounds.

Figure 51:
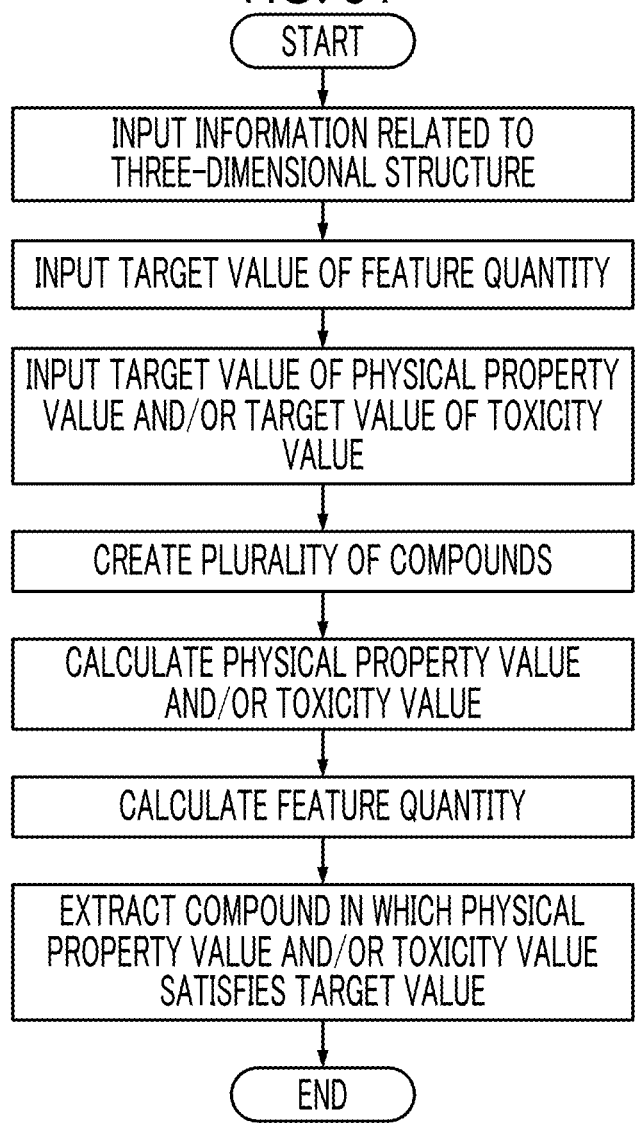
FIG. 51 is even still another flowchart showing a process of creating a compound in a case where the feature quantity according to the present invention and another feature quantity are used in combination.

FIG. 51 is a flowchart showing the processes of the compound creating method according to the additional note 4. In the additional note 4, the compound creating method according to any one of the fifteenth to seventeenth aspects is used in the creation of a compound, which is different from the additional notes 1 to 3 in which a compound is created by modifying the candidate structure. By performing the processes shown in FIG. 51, a compound in which the feature quantity according to the present invention satisfies the target value (the first target value) and the physical property value and/or the toxicity value satisfies the target value (the second and third target values) in the same manner as in the additional notes 1 to 3 can be created.

(Additional Note 5)

The compound creating method according to an additional note 5 further includes a first selecting step of selecting any one of the feature quantity calculating methods according to the first to fourth aspects based on the input information in the compound creating method according to any one of the additional notes 1 to 3, and the feature quantity is calculated by the selected feature quantity calculating method in the feature quantity calculating step. The compound creating device 20 comprising the processing unit 101, the pharmaceutical candidate compound search device 30 comprising the processing unit 102, or the device or system having the same configuration as the configurations of these can select a feature quantity calculating method according to the user's operation.

(Additional Note 6)

The compound creating method according to an additional note 6 further includes a second selecting step of selecting a method of calculating a physical property characteristic value and/or a method of calculating a toxicity characteristic value in the compound creating method according to any one of the additional notes 1 to 5, and the physical property characteristic value and/or the toxicity characteristic value is calculated by the selected calculation method in the characteristic value calculating step. The compound creating device 20 comprising the processing unit 101, the pharmaceutical candidate compound search device 30 comprising the processing unit 102, or the device or system having the same configuration as the configurations of these can select a method of calculating a physical property characteristic value and/or a method of calculating a toxicity characteristic value according to the user's instruction.

(Additional Note 7)

In the compound creating method according to an additional note 7, the physical property characteristic value is one or more of the molecular weight, C log P, the polar surface area, the polarizability, and the number of rotatable bonds (RBN) in the compound creating method according to any one of the additional notes 1 to 6. The definition of RBN is as described above in the section of "combined use with physical property value and/or toxicity value".

(Additional Note 8)

The compound creating method according to an additional note 8 includes an input step of inputting information related to the three-dimensional structures of compounds, a first target value for the feature quantity according to any one of the first to fourth aspects, and a second target value for a structural feature quantity indicating the three-dimensional structure, a candidate structure acquiring step of changing the three-dimensional structure to obtain a candidate structure, a first feature quantity calculating step of calculating the feature quantity for the candidate structure using the feature quantity calculating method according to any one of the first to fourth aspects, a second feature quantity calculating step of calculating the structural feature quantity for the candidate structure, a candidate structure adopting step of adopting or rejecting the candidate structure, which is a candidate structure adopting step of adopting the candidate structure in a case where the calculated feature quantity and the calculated structural feature quantity satisfy the first target value and the second target value and rejecting the candidate structure in a case where the calculated feature quantity and the calculated structural feature quantity do not satisfy the first target value and the second target value, and a control step of repeatedly performing the processes in the candidate structure acquiring step, the first feature quantity calculating step, the second feature quantity calculating step, and the candidate structure adopting step until the feature quantity and the structural feature quantity satisfy the first target value and the second target value.

Figure 52:
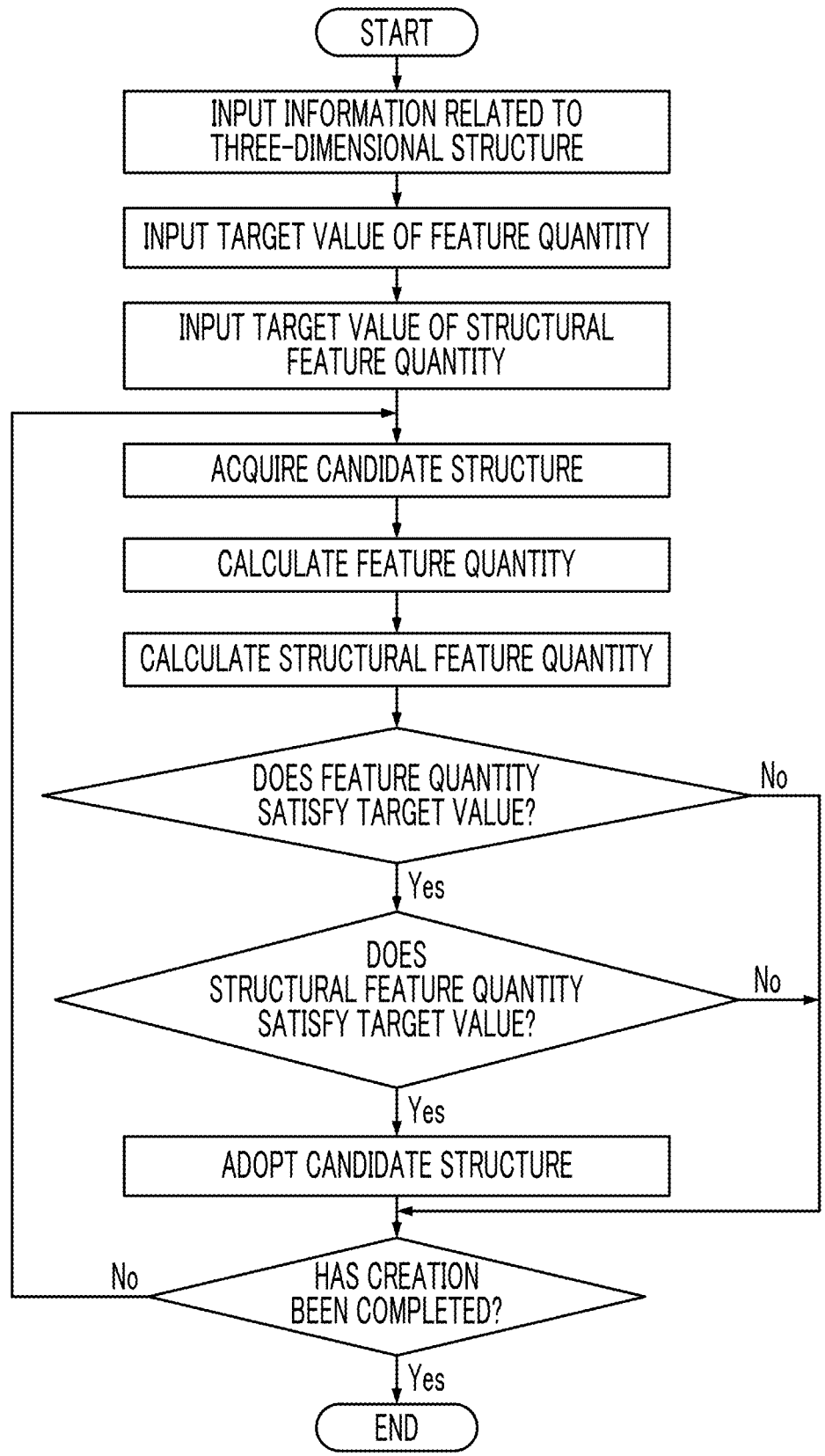
FIG. 52 is a flowchart showing a process of creating a compound in a case where the feature quantity according to the present invention and a structural feature quantity are used in combination.

FIG. 52 is a flowchart showing the process of the compound creating method according to the additional note 8. As described above for the eleventh aspect, the screening can be performed using the feature quantity according to the present invention and the feature quantity (structural feature quantity) indicating the structure of a compound, and a compound can be created using the feature quantity according to the present invention and the feature quantity (structural feature quantity) indicating the structure of the compound in the same manner as in the case of the screening. According to the processes shown in FIG. 52, a compound having a different skeleton can be created while the binding force (corresponding to the feature quantity) is maintained. Further, the processes shown in FIG. 52 can be performed by the compound creating device 20 (the feature quantity calculating device and the compound creating device; see FIGS. 20 and 21) comprising the processing unit 101, the pharmaceutical candidate compound search device 30 (the feature quantity calculating device, the screening device, and the compound creating device; see FIG. 28) comprising the processing unit 102, or a device or system having a configuration similar to these (the same applies to the aspects shown in the additional notes 9 to 14).

(Additional Note 9)

The compound creating method according to an additional note 9 includes an input step of inputting information related to the three-dimensional structures of compounds, a first target value for the feature quantity according to any one of the first to fourth aspects, and a second target value for a structural feature quantity indicating the three-dimensional structure, a candidate structure acquiring step of changing the three-dimensional structure to obtain a candidate structure, a first feature quantity calculating step of calculating the feature quantity for the candidate structure using the feature quantity calculating method according to any one of the first to fourth aspects, a candidate structure adopting step of adopting or rejecting the candidate structure, which is a candidate structure adopting step of adopting the candidate structure in a case where the calculated feature quantity satisfies the first target value and rejecting the candidate structure in a case where the calculated feature quantity does not satisfy the first target value, a control step of repeatedly performing the processes in the candidate structure acquiring step, the first feature quantity calculating step, and the candidate structure adopting step until the feature quantity satisfies the first target value, a structural feature quantity calculating step of calculating the structural feature quantity of the candidate structure in which the feature quantity satisfies the first target value, and an extracting step of extracting a compound having a structural feature quantity in which the similarity with the second target value is less than or equal to the threshold from compounds corresponding to candidate structures in which the structural feature quantities are calculated.

Figure 53:
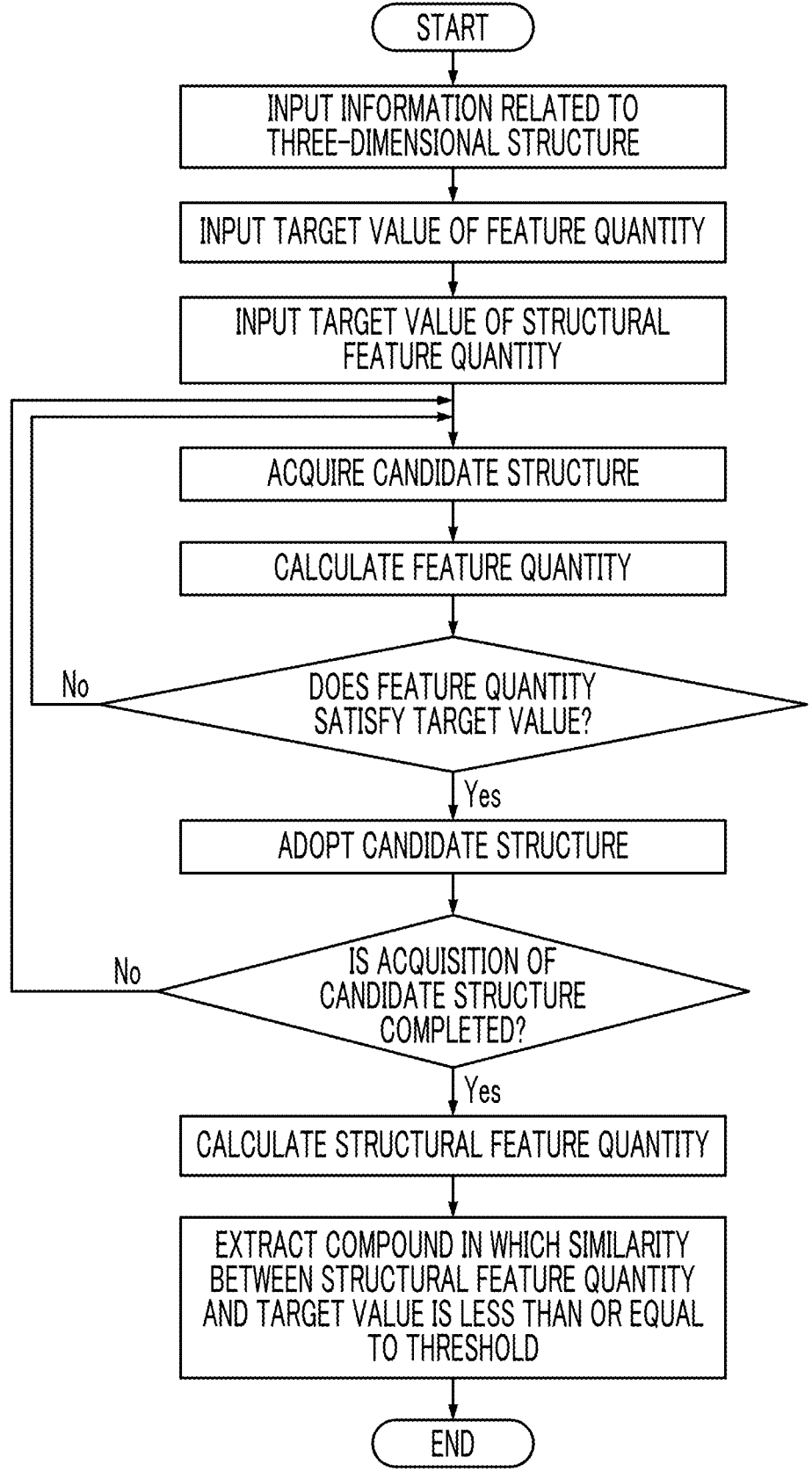
FIG. 53 is another flowchart showing a process of creating a compound in a case where the feature quantity according to the present invention and a structural feature quantity are used in combination.

FIG. 53 is a flowchart showing the processes of the compound creating method according to the additional note 9. By performing the processes shown in FIG. 53, a compound having a different skeleton can be created while the binding force (corresponding to the feature quantity) is maintained in the same manner as in the additional note 8.

(Additional Note 10)

The compound creating method according to an additional note 10 includes an input step of inputting information related to the three-dimensional structures of compounds, a first target value for the feature quantity according to any one of the first to fourth aspects, and a second target value for a structural feature quantity indicating the three-dimensional structure, a candidate structure acquiring step of changing the three-dimensional structure to obtain a candidate structure, a second feature quantity calculating step of calculating the structural feature quantity for the candidate structure, a candidate structure adopting step of adopting or rejecting the candidate structure, which is a candidate structure adopting step of adopting the candidate structure in a case where the calculated structural feature quantity satisfies the second target value and rejecting the candidate structure in a case where the calculated structural feature quantity does not satisfy the second target value, a control step of repeatedly performing the processes in the candidate structure acquiring step, the second feature quantity calculating step, and the candidate structure adopting step until the structural feature quantity satisfies the second target value, a first feature quantity calculating step of calculating the feature quantity for the candidate structure in which the structural feature quantity satisfies the second target value, and an extracting step of extracting a compound having a structural feature quantity in which the similarity with the first target value is less than or equal to the threshold from compounds corresponding to candidate structures in which the feature quantities are calculated.

Figure 54:
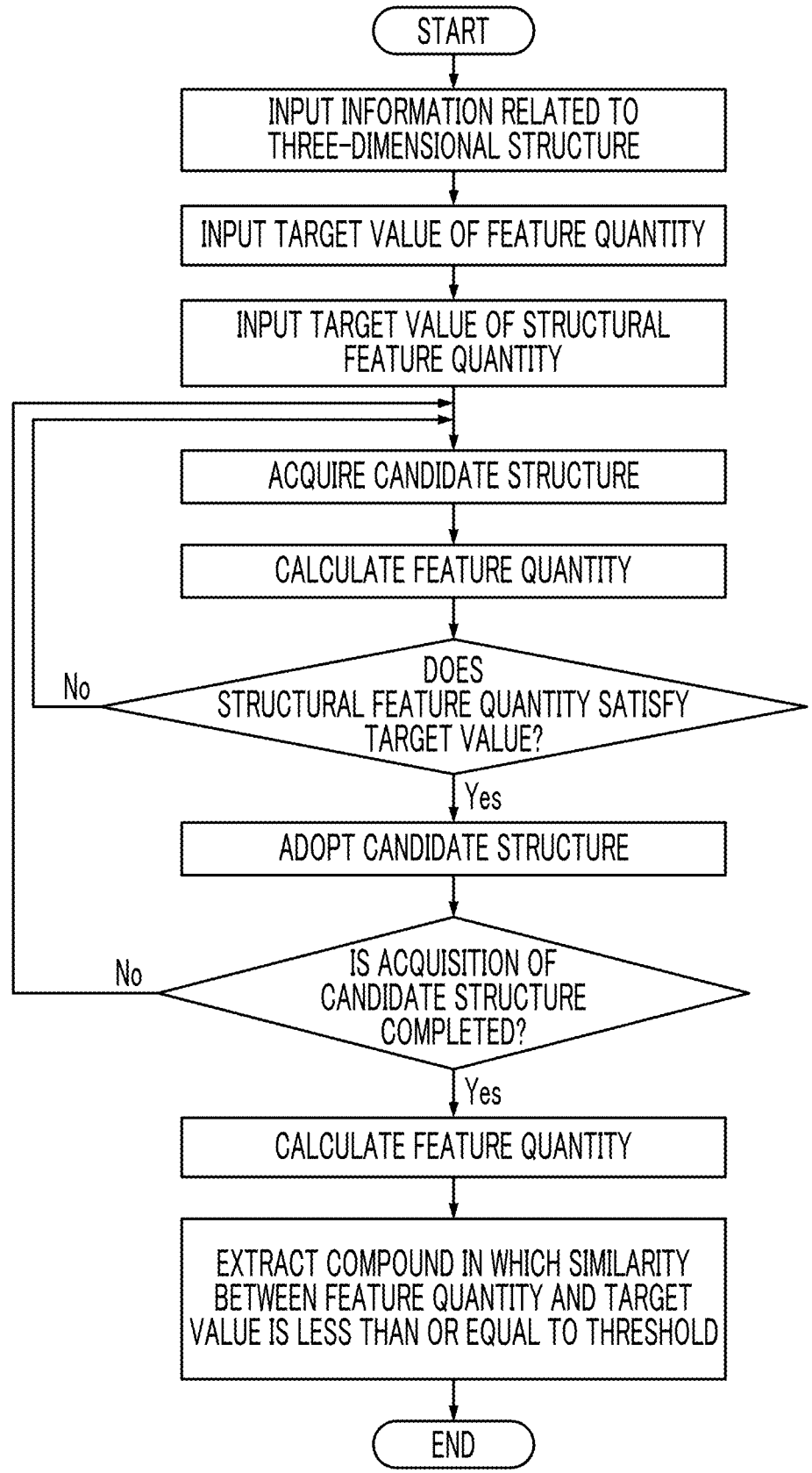
FIG. 54 is still another flowchart showing a process of creating a compound in a case where the feature quantity according to the present invention and a structural feature quantity are used in combination.

FIG. 54 is a flowchart showing the processes of the compound creating method according to the additional note 10. By performing the processes shown in FIG. 54, a compound having a different skeleton can be created while the binding force (corresponding to the feature quantity) is maintained in the same manner as in the additional notes 8 and 9.

(Additional Note 11)

The compound creating method according to an additional note 11 includes an input step of inputting information related to three-dimensional structures of compounds, a first target value for the feature quantity according to any one of the first to fourth aspects, and a second target value for a structural feature quantity indicating the three-dimensional structure, a generating step of generating a plurality of candidate structures in which the feature quantities satisfy the first target value using the compound creating method according to any one of the fifteenth to seventeenth aspects, a calculating step of calculating the structural feature quantities for the plurality of candidate structures, and an extracting step of extracting a compound in which the structural feature quantity is less than or equal to the threshold from the plurality of candidate structures.

Figure 55:
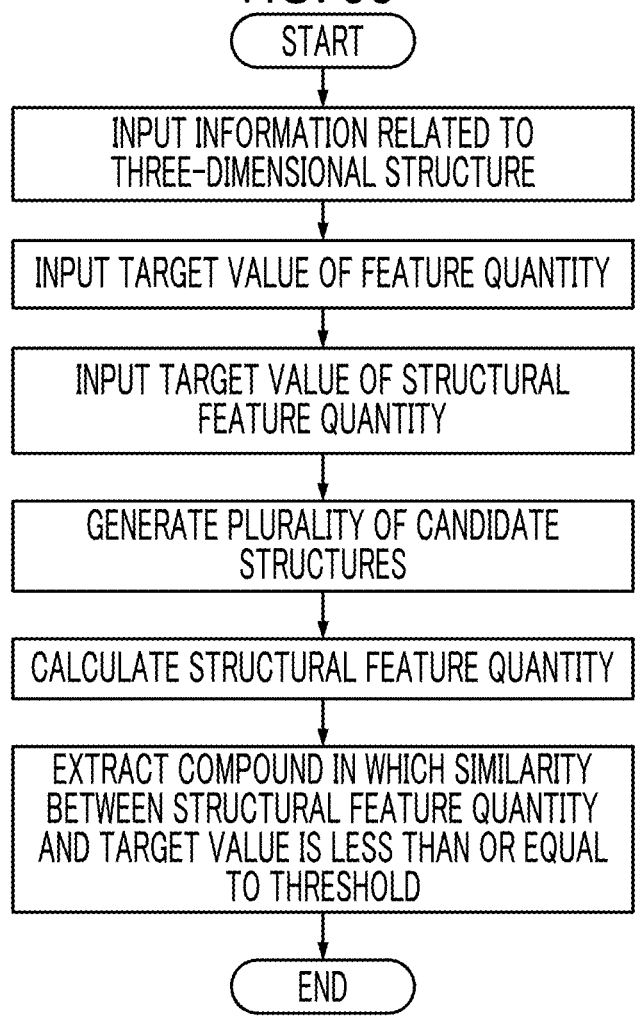
FIG. 55 is even still another flowchart showing a process of creating a compound in a case where the feature quantity according to the present invention and a structural feature quantity are used in combination.

FIG. 55 is a flowchart showing the processes of the compound creating method according to the additional note 11. The compound creating method according to any one of the fifteenth to seventeenth aspects is used in the creation of a compound, which is different from the additional notes 8 to 10 in which a compound is created by modifying the candidate structure. Even by performing the processes shown in FIG. 55, a compound having a different skeleton can be created while the binding force (corresponding to the feature quantity) is maintained in the same manner as in the additional notes 8 to 10.

(Additional Note 12)

The compound creating method according to an additional note 12 further includes a first selecting step of selecting any one of the feature quantity calculating methods according to the first to fourth aspects based on the information in the compound creating method according to any one of the additional notes 8 to 10, and the feature quantity is calculated by the selected feature quantity calculating method in the first feature quantity calculating step. The feature quantity calculating method can be selected based on the user's instruction.

(Additional Note 13)

In the compound creating method according to an additional note 13, the structural feature quantity is a Fingerprint (Fingerprint descriptor) for a compound in the compound creating method according to any one of the additional notes 8 to 12. The Fingerprint descriptor is a descriptor in which the presence or absence of a specific functional group or a partial structure is expressed by 0 and 1.

(Additional Note 14)

In the compound creating method according to an additional note 14, the Tanimoto coefficient is used as an index showing the similarity between the structural feature quantities in the compound creating method according to the additional note 12 or 13. The Tanimoto coefficient is calculated as a real number of 0 to 1 in a case where the Fingerprint descriptors of two compounds intended to be compared are provided and is defined such that the similarity increases as the coefficient is closer to 1.

(Additional Note 15)

The compound creating method according to an additional note 15 includes an input step of inputting information related to three-dimensional structures of compounds and a target value of a binding force, a candidate structure acquiring step of changing the three-dimensional structure to obtain a candidate structure, a feature quantity calculating step of calculating the feature quantity for the candidate structure using the feature quantity calculating method according to any one of the first to fourth aspects, an estimating step of estimating the binding force of the candidate structure corresponding to the calculated feature quantity using a prediction model that outputs the binding force based on the feature quantity according to any one of the first to fourth aspects, a candidate structure adopting step of adopting or rejecting the candidate structure, which is a candidate structure adopting step of adopting the candidate structure in a case where the estimated binding force satisfies the target value and rejecting the candidate structure in a case where the estimated binding force does not satisfy the target value, and a control step of repeatedly performing the processes in the candidate structure acquiring step, the feature quantity calculating step, and the candidate structure adopting step until the binding force satisfies the target value.

Figure 56:
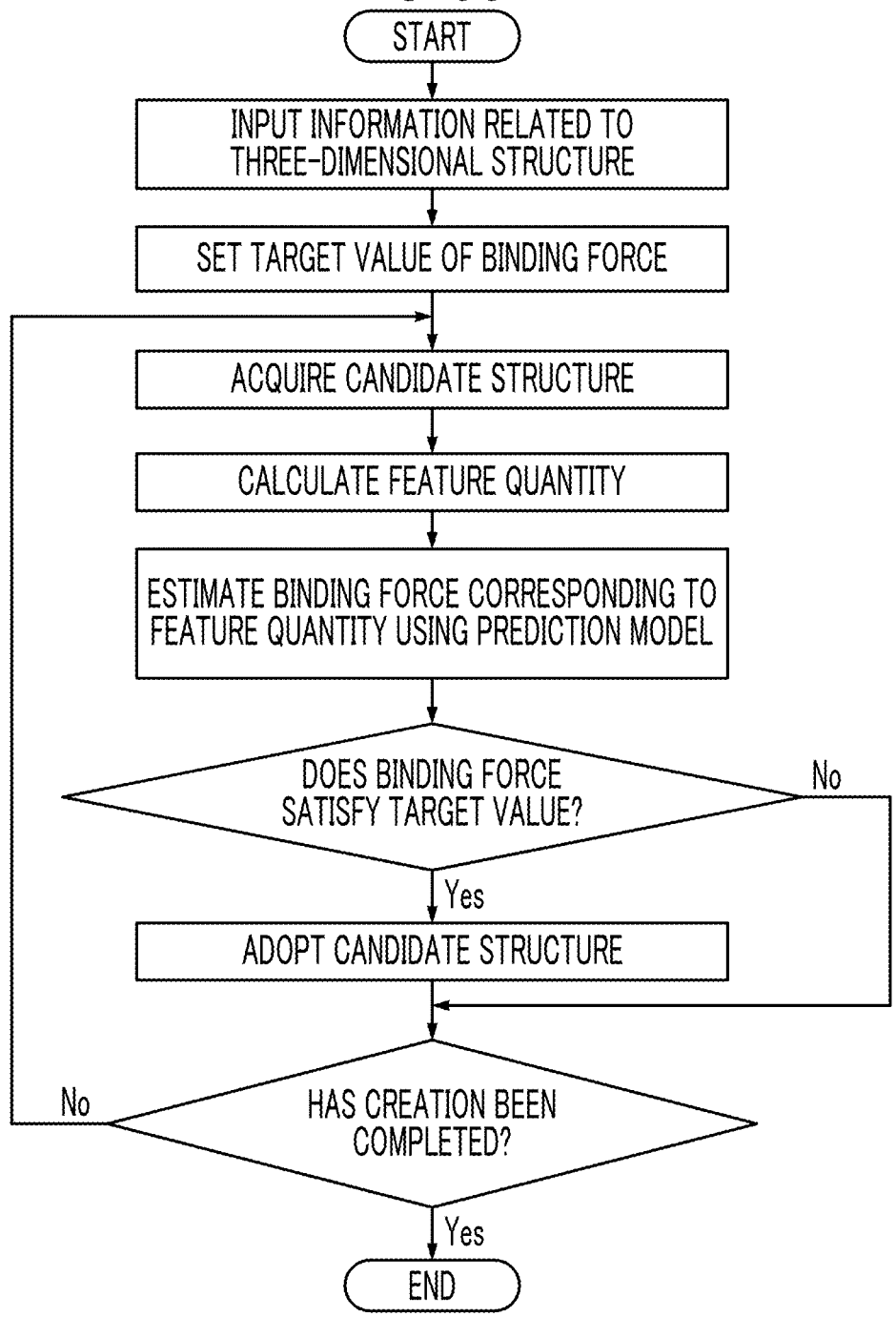
FIG. 56 is a flowchart showing a process of creating a compound in a case where the feature quantity according to the present invention and a prediction model are used.

FIG. 56 is a flowchart showing the processes of the compound creating method according to the additional note 15. According to the processes shown in FIG. 56, the "creation of a compound having an improved binding force" can be performed using a prediction model in the same manner as in the "screening using a prediction model" described above in the section of the "screening of a compound having an improved binding force (examples 1 and 2)". The compound creating method according to the additional note 15 can be performed by the compound creating device 20, the pharmaceutical candidate compound search device 30, and the like.

(Additional Note 16)

The compound creating method according to an additional note 16 includes an input step of inputting a target value of a binding force for a compound, an estimating step of estimating the feature quantity satisfying the target value using a prediction model that outputs the binding force based on the feature quantity according to any one of the first to fourth aspects, a candidate structure acquiring step of changing the three-dimensional structure to obtain a candidate structure, a first feature quantity calculating step of calculating the feature quantity for the candidate structure using the feature quantity calculating method according to any one of the first to fourth aspects, a candidate structure adopting step of adopting or rejecting the candidate structure, which is a candidate structure adopting step of adopting the candidate structure in a case where the calculated feature quantity satisfies the estimated feature quantity and rejecting the candidate structure in a case where the calculated feature quantity does not satisfy the estimated feature quantity, and a control step of repeatedly performing the processes in the candidate structure acquiring step, the first feature quantity calculating step, and the candidate structure adopting step until the calculated feature quantity satisfies the estimated feature quantity.

Figure 57:
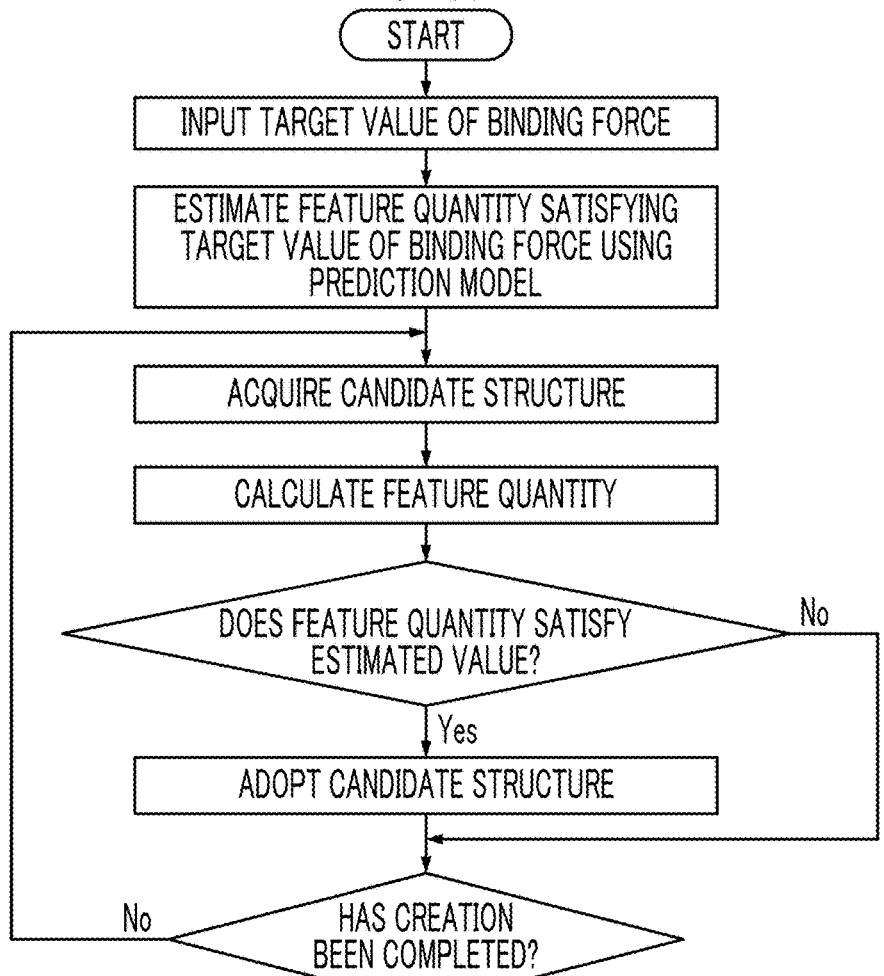
FIG. 57 is another flowchart showing a process of creating a compound in a case where the feature quantity according to the present invention and a prediction model are used.

FIG. 57 is a flowchart showing the processes of the compound creating method according to the additional note 16. By performing the processes shown in FIG. 57, the "creation of a compound having an improved binding force" can be performed using a prediction model in the same manner as in the additional note 15.

(Additional Note 17)

The compound creating method according to an additional note 17 includes an input step of inputting a target value of a binding force for compounds, an estimating step of estimating the feature quantity satisfying the target value using a prediction model that outputs the binding force based on the feature quantity according to any one of the first to fourth aspects, and a generating step of generating the three-dimensional structure of the compound corresponding to the target value based on the estimated feature quantity using the compound creating method according to any one of the fifteenth to seventeenth aspects.

Figure 58:
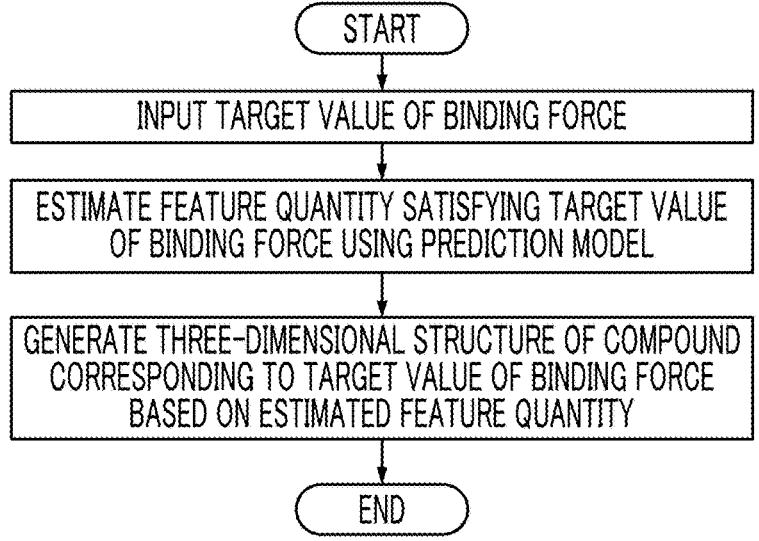
FIG. 58 is still another flowchart showing a process of creating a compound in a case where the feature quantity according to the present invention and a prediction model are used.

FIG. 58 is a flowchart showing the processes of the compound creating method according to the additional note 17. By performing the processes shown in FIG. 58, the "creation of a compound having an improved binding force" can be performed using a prediction model in the same manner as in the additional notes 15 and 16.

(Additional Note 18)

The prediction model generating method according to an additional note 18 includes an input step for inputting information related to three-dimensional structures for each of a plurality of compounds, a feature quantity calculating step of calculating the feature quantity for each of the plurality of compounds using the feature quantity calculating method according to any one of the first to fourth aspects, and a step of generating a prediction model for the binding force of the compound through machine learning using the feature quantity as an explanatory variable and the binding force corresponding to the feature quantity as teacher data.

(Additional Note 19)

The prediction model according to an additional note 19 is a prediction model that causes a computer to output a binding force based on the feature quantity of a compound, and the prediction model comprises a neural network formed through machine learning using the feature quantity as an explanatory variable and the binding force as teacher data, performs an operation based on the learned weighting coefficient with respect to the input feature quantity, and outputs the binding force. The screening described in the section of the "screening of a compound having an improved binding force (examples 1 and 2)" and the creation of a compound described in the additional notes 15 to 17 can be performed using the prediction model generating method according to the additional note 18 and the prediction model according to the additional note 19. Similar to the description above for FIG. 32B, the feature quantity (for example, the feature quantity according to any one of the first to fourth aspects; depending on the learning method) of a compound is output from the input layer by applying the binding force to the layer on the output side with respect to the neural network of the prediction model according to the additional note 19 and updating the information toward the input layer from the output layer. In this manner, for example, the feature quantity can be estimated from the target value of the binding force in the additional notes 16 and 17.

<Applications of Prediction Model to Toxicity Prediction>

The above-described method of generating a prediction model and the generated prediction model can be applied to toxicity prediction. Here, examples of the "toxicity" include hERG inhibition (hERG: Human Ether-a-go-go Related Gene) and CYP inhibition (CYP: Cytochrome P450). Since hERG and CYP are biopolymers, hERG inhibition and CYP inhibition can be predicted using the feature quantities targeting biopolymers. Specifically, avoidance of toxicity due to hERG inhibition can be realized by "decreasing" the binding force to hERG (further decreasing the binding force than the binding force of the reference compound, further decreasing the binding force than the binding force than the target value, or the like). The same applies to the avoidance of toxicity due to CYP inhibition. The prediction of such toxicity can be performed in the screening or creation of a compound with low toxicity.

(Additional Note 20)

The compound creating program according to an additional note 20 causes a computer to execute the compound creating method according to any one of the fifteenth to seventeenth aspects and the additional notes 1 to 17. Further, a non-transitory recording medium on which a computer-readable code of the compound creating program according to the additional note 20 is recorded can also be exemplified as an aspect of the present invention.

(Additional Note 21)

The feature quantity calculating method according to an additional note 21 includes a target structure designating step of designating a target structure formed of a plurality of unit structures having chemical properties, a three-dimensional structure generating step of generating a three-dimensional structure using the plurality of unit structures for the target structure, and a feature quantity calculating step of calculating a feature quantity obtained by quantifying, in a three-dimensional space, the degree of accumulation of one or more kinds of probes in the periphery of the three-dimensional structure, and the probe is a structure in which a plurality of points having a real electric charge and generating a van der Waals force are disposed to be separated from each other. Further, in additional notes 22 to 40 described below, the feature quantity calculating method according to the additional note 21 may be used, or the feature quantity calculating method according to the first to fourth aspects described above may be used.

(Additional Note 22)

The screening method according to an additional note 22 is a screening method using the feature quantity calculating method according to the additional note 21, and the structural formula of the binding compound and the structural formulae of a plurality of search target compounds are designated as the target structures in the target structure designating step, a method of generating a three-dimensional structure of the binding compound from the structural formula of the binding compound and a method of generating three-dimensional structures of the plurality of search target compounds from the structural formulae of the plurality of search target compounds are designated in the three-dimensional structure generating step, and a method of generating a structural formula of a probe and a three-dimensional structure of a probe from the structural formula of the probe and a method of calculating the feature quantity by quantifying the degree of accumulation of probes are designated in the feature quantity calculating step. The screening method according to the additional note 22 further includes a step of designating a method for calculating the similarity between the feature quantity of the binding compound and the feature quantities of the plurality of search target compounds, a step of designating the threshold of the similarity, and a step of extracting a compound from the plurality of compounds, in which the similarity between the feature quantity thereof and the feature quantity of the binding compound is greater than or equal to the threshold, based on the three-dimensional structure of the binding compound.

Figure 59:
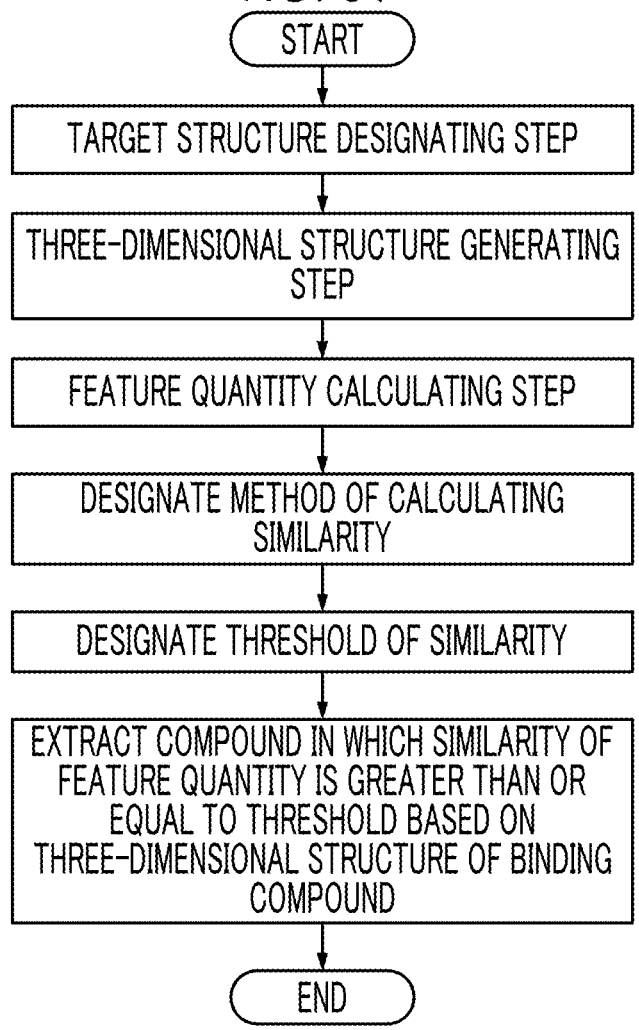
FIG. 59 is a flowchart showing a screening process according to the present invention.

FIG. 59 is a flowchart showing the processes of the screening method according to the additional note 22. Further, by performing these processes, for example, a compound having the same binding force as the binding force of one binding compound can be screened from the existing compound group (the plurality of search target compounds) based on the structural formula of the binding compound. The processes shown in FIG. 59 can be performed by the device according to the first and third embodiments (the screening device 10 and the pharmaceutical candidate compound search device 30 according to the third embodiment) or a device or system having the same configuration as those of these devices. These devices and systems can use a program that causes the devices or systems to execute the screening method and can refer to a non-transitory recording medium on which a computer-readable code of the program thereof is recorded during the execution. The same applies to the screening method according to the additional notes described below. Further, these devices and systems can designate a method of generating a three-dimensional structure according to the user's selection operation or the like (the same applies to the additional notes described below).

Further, the additional note 22 relates to the screening method using information related to a binding compound (a compound whose binding to a target biopolymer other than a protein has been confirmed), but screening using information related to a ligand (a compound whose binding to a target protein has been confirmed) can also be performed. Specifically, the screening using the information related to a ligand can be performed (a compound having the same binding force as the binding force of one ligand is screened from the existing compound group based on the structural formula of the ligand) by replacing the "structural formula of the binding compound", the "three-dimensional structure of the binding compound", and the "feature quantity of (for) the binding compound" with the "structural formula of the ligand", the "three-dimensional structure of the ligand", and the "feature quantity of (for) the ligand" in the additional note 22. Similarly, other screening methods and compound creating methods in each of the following "additional notes" can be performed using information related to ligands as well as information related to binding compounds.

(Additional Note 23)

The compound creating method according to an additional note 23 is a compound creating method using the feature quantity calculating method according to the additional note 21, and the structural formula of the binding compound is designated as the target structure in the target structure designating step, a method of generating a three-dimensional structure of the binding compound from the structural formula of the binding compound and a method of generating a three-dimensional structure of a compound to be created are designated in the three-dimensional structure generating step, and a method of generating a structural formula of a probe and a three-dimensional structure of a probe from the structural formula of the probe and a method of calculating the feature quantity of the binding compound by quantifying the degree of accumulation of probes are designated in the feature quantity calculating step. The compound creating method according to the additional note 23 further includes a step of designating a method of calculating the similarity between the feature quantity of the binding compound and the feature quantities of another compound, a step of designating the threshold of the similarity, a step of designating conditions for generating a three-dimensional structure of a compound based on the feature quantity, and a step of generating a three-dimensional structure of a compound having a feature quantity, in which the similarity between the feature quantity thereof and the feature quantity of the binding compound is greater than or equal to the threshold, under the conditions according to the generating method.

Figure 60:
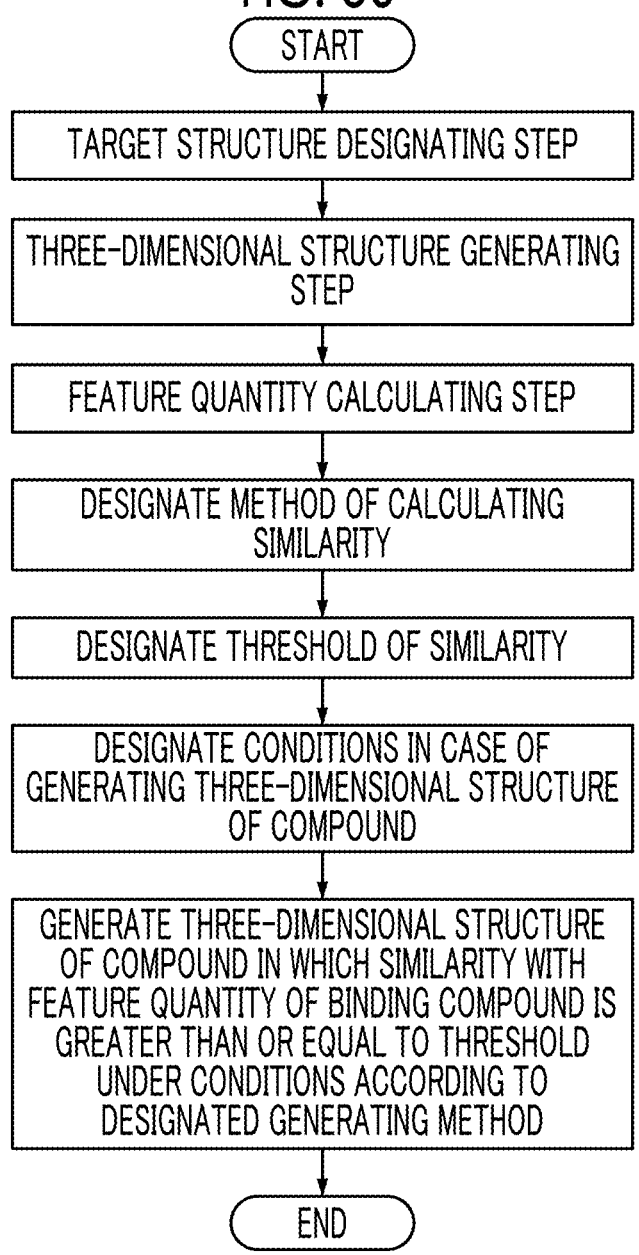
FIG. 60 is a flowchart showing a process of creating a compound according to the present invention.

FIG. 60 is a flowchart showing the processes of the compound creating method according to the additional note 23. Further, by performing these processes, for example, a compound having the same binding force as the binding force of one binding compound can be newly created by solving an inverse problem based on the structural formula of the binding compound. The processes shown in FIG. 60 can be performed by the device according to the second and third embodiments (the compound creating device 20 and the pharmaceutical candidate compound search device 30) or a device or system having the same configuration as those of these devices. These devices and systems can use a program that causes the devices or systems to execute the screening method and can refer to a non-transitory recording medium on which a computer-readable code of the program thereof is recorded during the execution. The same applies to the compound creating method according to the additional notes described below. Further, the "acquisition of the feature quantity (for example, the feature quantity according to any one of the first to fourth aspects) by providing the three-dimensional structure of a compound" can be referred to as a "forward problem", and the "acquisition of the three-dimensional structure having the provided feature quantity" can be referred to as an "inverse problem".
(Additional Note 24)

Figure 61:
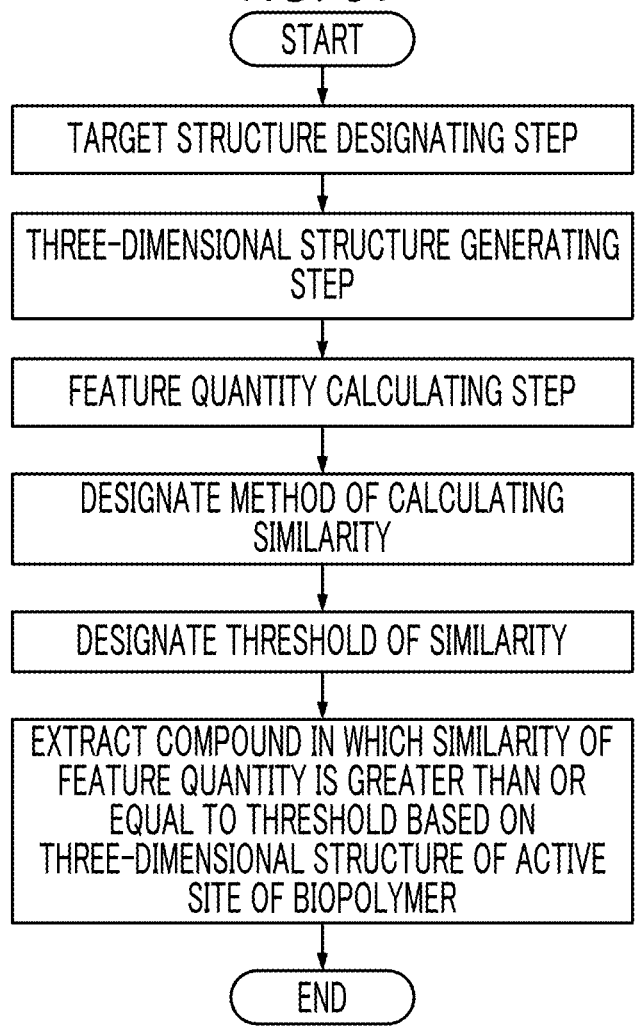
FIG. 61 is another flowchart showing a screening process according to the present invention.

The screening method according to an additional note 24 is a screening method using the feature quantity calculating method according to the additional note 21, and the three-dimensional structure of an active site of a biopolymer and the structural formulae of a plurality of search target compounds are designated in the target structure designating step, a method of generating a three-dimensional structure of a pocket structure that is bound to the active site and a method of generating three-dimensional structures of the plurality of search target compounds from the structural formulae of the plurality of search target compounds are designated in the three-dimensional structure generating step, and a method of generating a structural formula of a probe and a three-dimensional structure of a probe from the structural formula of the probe, a method of quantifying the degree of accumulation of probes with respect to the pocket structure, and a method of calculating the feature quantity based on the degree of accumulation are designated in the feature quantity calculating step. The screening method according to the additional note 24 further includes a step of designating a method of calculating the similarity between the feature quantity of the pocket structure and the feature quantities of the plurality of search target compounds, a step of designating a threshold of the similarity, and a step of extracting a compound from the plurality of search target compounds, in which the similarity of the feature quantity thereof and the feature quantity of the biopolymer is greater than or equal to the threshold, based on the three-dimensional structure of the active site of the biopolymer. FIG. 61 is a flowchart showing the processes of the screening method according to the additional note 24. Further, by performing these processes, for example, a compound that is compatible with the active site can be screened from the existing compound group (the plurality of search target compounds) based on the three-dimensional structure of the active site of the biopolymer.
(Additional Note 25)

Figure 62:
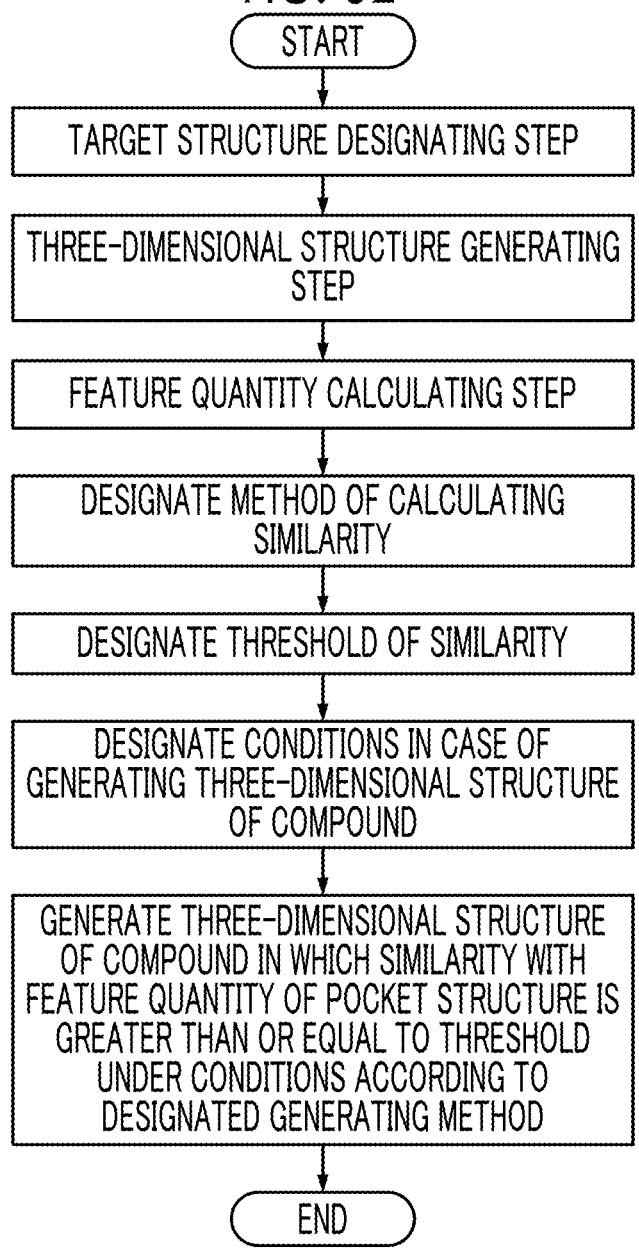
FIG. 62 is another flowchart showing a process of creating a compound according to the present invention.

The compound creating method according to an additional note 25 is a compound creating method using the feature quantity calculating method according to the additional note 21, and the structural formula of an active site of a biopolymer is designated as the target structure in the target structure designating step, a method of generating a three-dimensional structure of a pocket structure that is bound to the active site and a method of generating a three-dimensional structure of a compound to be created are designated in the three-dimensional structure generating step, and a method of generating a structural formula of a probe and a three-dimensional structure of a probe from the structural formula of the probe, a method of quantifying the degree of accumulation of probes with respect to the pocket structure, and a method of calculating the feature quantity of the pocket structure by quantifying the degree of accumulation of probes are designated in the feature quantity calculating step. The compound creating method according to the additional note 25 further includes a step of designating a method of calculating the similarity between the feature quantity of the pocket structure and the feature quantity of the compound, a step of designating a threshold of the similarity, a step of designating conditions in a case of generating the three-dimensional structure of the compound based on the feature quantity, and a step of generating a three-dimensional structure of a compound having a feature quantity, in which the similarity between the feature quantity thereof and the feature quantity of the pocket structure is greater than or equal to the threshold, under the conditions according to the generating method. FIG. 62 is a flowchart showing the processes of the compound creating method according to the additional note 25. Further, by performing these processes, for example, a compound that is compatible with the active site can be newly created by solving an inverse problem based on the three-dimensional structure of the active site of the biopolymer.
(Additional Note 26)

Figure 63:
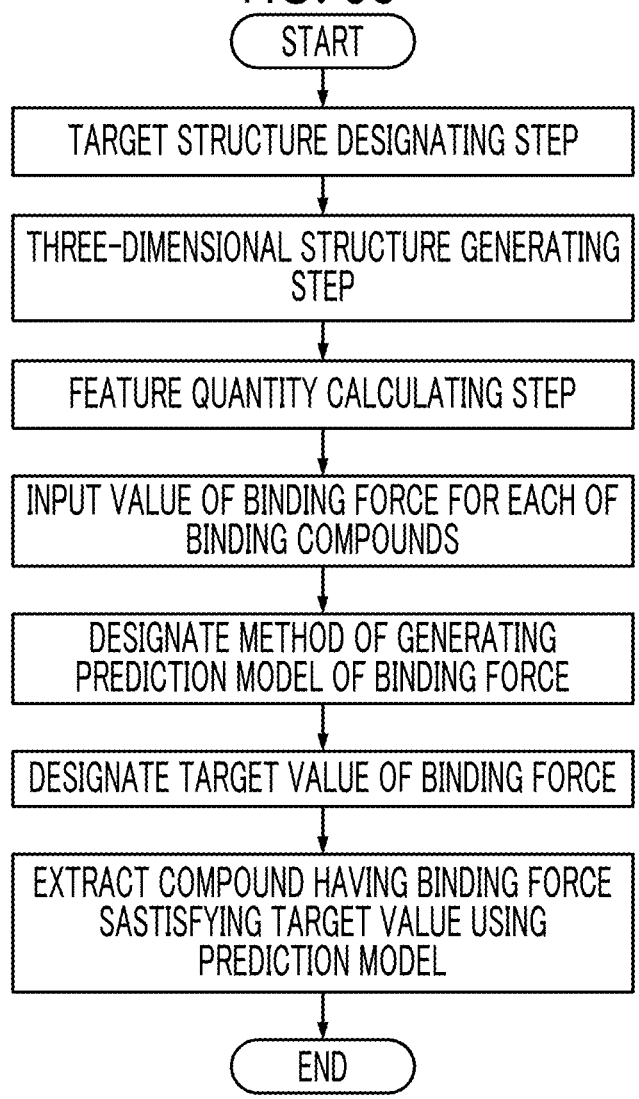
FIG. 63 is still another flowchart showing a screening process according to the present invention.

The screening method according to an additional note 26 is a screening method using the feature quantity calculating method according to the additional note 21, and the structural formulae of a plurality of binding compounds and the structural formulae of a plurality of search target compounds are designated in the target structure designating step, a method of generating three-dimensional structures of the plurality of binding compounds and a method of generating three-dimensional structures of the plurality of search target compounds are designated in the three-dimensional structure generating step, and a method of generating a structural formula of a probe and a three-dimensional structure of a probe from the structural formula of the probe, a method of quantifying the degree of accumulation of probes with respect to each of the plurality of binding compounds, and a method of calculating the feature quantity based on the degree of accumulation are designated in the feature quantity calculating step. The screening method according to the additional note 26 further includes a step of inputting the value of the binding force for each of the plurality of binding compounds, a step of designating a method of generating a prediction model of the binding force of the compound from a set of the structural formula and the value of the binding force for each of the plurality of binding compounds, a step of designating the target value of the binding force, and a step of extracting a compound having the binding force satisfying the target value from the plurality of search target compounds using the prediction model. FIG. 63 is a flowchart showing the processes of the screening method according to the additional note 26. Further, by performing these processes, for example, a compound having the target binding force can be screened from the existing compound group (the plurality of search target compounds) using the set of the structural formula and the value of the binding force for each of the plurality of compounds. Further, in the additional note 26, the prediction model generating method and the prediction model described in the additional notes 18 and 19 can be used.
(Additional Note 27)

Figure 64:
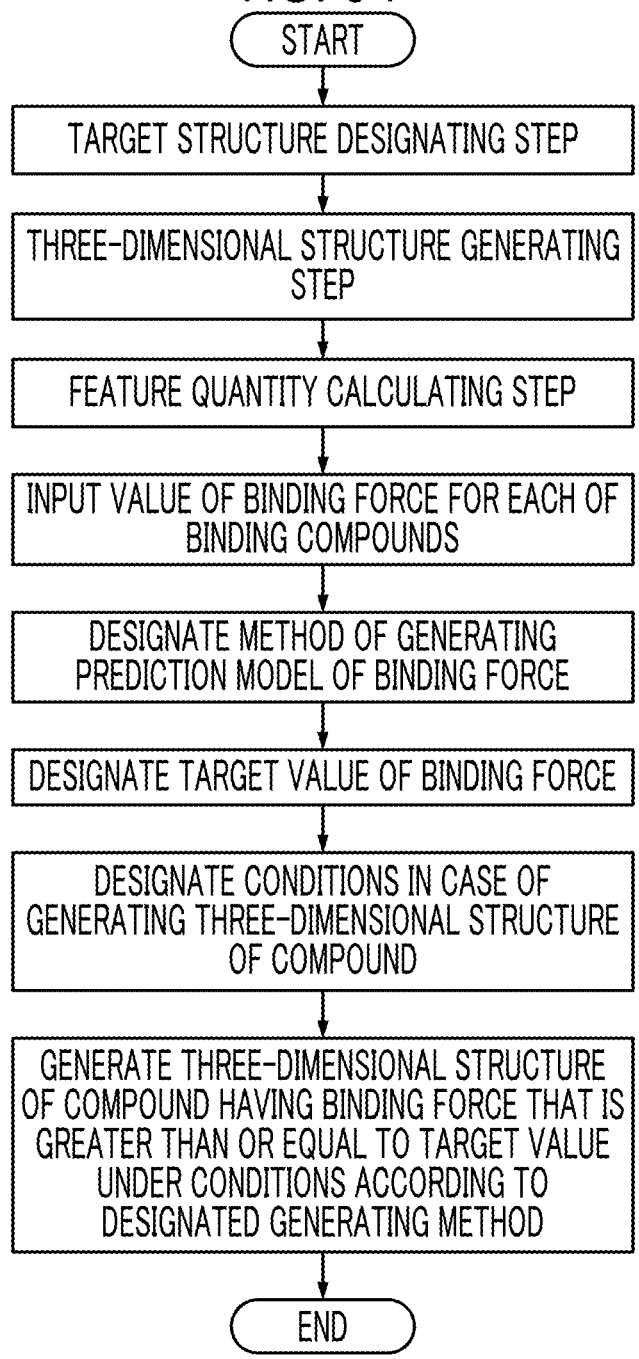
FIG. 64 is still another flowchart showing a process of creating a compound according to the present invention.

The compound creating method according to an additional note 27 is a compound creating method using the feature quantity calculating method according to the additional note 21, and the structural formulae of a plurality of binding compounds are designated in the target structure designating step, a method of generating three-dimensional structures of the plurality of binding compounds and a method of generating a three-dimensional structure of a compound to be created are designated in the three-dimensional structure generating step, and a method of generating a structural formula of a probe and a three-dimensional structure of a probe from the structural formula of the probe, a method of quantifying the degree of accumulation of probes, and a method of calculating the feature quantity based on the degree of accumulation are designated in the feature quantity calculating step. The compound creating method according to the additional note 27 further includes a step of designating the value of the binding force for each of the plurality of binding compounds, a step of designating a method of generating a prediction model of the binding force of the compound from a set of the structural formula and the value of the binding force for each of the plurality of binding compounds, a step of designating the target value of the binding force, a step of designating conditions in a case of generating a three-dimensional structure of a compound based on the feature quantity, and a step of generating a three-dimensional structure of a compound having a binding force greater than or equal to the target value under the conditions according to the generating method. FIG. 64 is a flowchart showing the processes of the compound creating method according to the additional note 27. Further, by performing these processes, for example, a compound having a target binding force can be newly created by solving an inverse problem using the set of the structural formulae and the value of the binding force for each of the plurality of compounds. Further, in the additional note 27, the prediction model generating method and the prediction model described in the additional notes 18 and 19 can be used.

(Additional Note 28)

The screening method according to an additional note 28 is a screening method using the feature quantity calculating method according to the additional note 21, and the structural formulae of a plurality of search target compounds are designated in the target structure designating step, a method of generating three-dimensional structures of the plurality of search target compounds from the structural formulae of the plurality of search target compounds are designated in the three-dimensional structure generating step, and a method of generating a structural formula of a probe and a three-dimensional structure of a probe from the structural formula of the probe and a method of calculating the feature quantity by quantifying the degree of accumulation of probes are designated in the feature quantity calculating step. The screening method according to the additional note 28 further includes a step of inputting information related to the three-dimensional structure of a binding compound, a step of designating a method of calculating the similarity between the feature quantity of the binding compound and the feature quantities of the plurality of search target compounds, a step of designating a threshold of the similarity, and a step of extracting a compound from the plurality of compounds, in which the similarity of the feature quantity thereof and the feature quantity of the binding compound is greater than or equal to the threshold, based on the three-dimensional structure of the binding compound. The screening method according to the additional note 28 is a method obtained by modifying the screening method according to the additional note 22, and the three-dimensional structure of the binding compound is input in place of the structural formula of the binding compound. Therefore, among the steps of the feature quantity calculating method according to additional note 21, the steps for generating the three-dimensional structure of the binding compound (the target structure designating step and the three-dimensional structure generating step) are not necessary. Even in the additional note 28, a compound having the same binding force as the binding force of one binding compound can be screened from the existing compound group (the plurality of search target compounds) based on the three-dimensional structure of the binding compound in the same manner as in the additional note 22.

(Additional Note 29)

The compound creating method according to an additional note 29 is a compound creating method using the feature quantity calculating method. The feature quantity calculating method used in the additional note 29 includes a three-dimensional structure generating step of generating a three-dimensional structure using a plurality of unit structures for a target structure, and a feature quantity calculating step of calculating the feature quantity obtained by quantifying, in a three-dimensional space, the degree of accumulation of one or more kinds of probes in the periphery of the three-dimensional structure, and the probe is a structure in which a plurality of points having a real electric charge and generating a van der Waals force are disposed to be separated from each other. The compound creating method according to the additional note 29 further includes a step of inputting information related to the three-dimensional structure of the binding compound, and a method of generating a three-dimensional structure of a compound to be created is designated in the three-dimensional structure generating step, and a method of generating a structural formula of a probe and a three-dimensional structure of a probe from the structural formula of the probe and a method of calculating the feature quantity of the binding compound by quantifying the degree of accumulation of probes are designated in the feature quantity calculating step. The compound creating method according to the additional note 29 further includes a step of designating a method of calculating the similarity between the feature quantity of the binding compound and the feature quantity of another compound, a step of designating the threshold of the similarity, a step of designating conditions in a case of generating a three-dimensional structure of a compound based on the feature quantity, and a step of generating a three-dimensional structure of a compound having a feature quantity, in which the similarity between the feature quantity thereof and the feature quantity of the binding compound is greater than equal to the threshold under the conditions according to the generating method. The compound creating method according to the additional note 29 is a method obtained by modifying the compound creating method according to the additional note 23, and the three-dimensional structure of the binding compound is input in place of the structural formula of the binding compound. Therefore, the steps for generating the three-dimensional structure of the binding compound (the target structure designating step and the three-dimensional structure generating step) are not necessary. Even in the additional note 29, a compound having the same binding force as the binding force of one binding compound can be newly created by solving an inverse problem based on the three-dimensional structure of the binding compound in the same manner as in the additional note 23.

(Additional Note 30)

The screening method according to an additional note 30 is a screening method using the feature quantity calculating method according to the additional note 21, including a step of inputting information related to the three-dimensional structure of a biopolymer and a step of specifying an active site of the biopolymer based on the information, and the structural formulae of a plurality of search target compounds are designated in the target structure designating step, a method of generating a three-dimensional structure of a pocket structure that is bound to the active site and a method of generating three-dimensional structures of the plurality of search target compounds from the structural formulae of the plurality of search target compounds are designated in the three-dimensional structure generating step, and a method of generating a structural formula of a probe and a three-dimensional structure of a probe from the structural formula of the probe, a method of quantifying the degree of accumulation of probes with respect to the pocket structure, and a method of calculating the feature quantity based on the degree of accumulation are designated in the feature quantity calculating step. The screening method according to the additional note 30 further includes a step of designating a method of calculating the similarity between the feature quantity of the pocket structure and the feature quantities of the plurality of search target compounds, a step of designating a threshold of the similarity, and a step of extracting a compound from the plurality of search target compounds, in which the similarity of the feature quantity thereof and the feature quantity of the biopolymer is greater than or equal to the threshold, based on the three-dimensional structure of the active site of the biopolymer. The screening method according to the additional note 30 is a method obtained by modifying the screening method according to the additional note 24, and the three-dimensional structure of the biopolymer is input in place of the three-dimensional structure of the active site of the biopolymer. Therefore, the screening method according to the additional note 30 includes the "step of specifying the active site of the biopolymer based on the information related to the three-dimensional structure of the biopolymer". Even in the additional note 30, a compound compatible with the active site can be screened from the existing compound group (the plurality of search target compounds) based on the three-dimensional structure of the biopolymer in the same manner as in the additional note 24.

(Additional Note 31)

The compound creating method according to an additional note 31 is a compound creating method using the feature quantity calculating method according to the additional note 21, including a step of inputting information related to the three-dimensional structure of a biopolymer, and a step of specifying an active site of the biopolymer based on the information, and the three-dimensional structure of the active site of the biopolymer is designated in the target structure designating step, a method of generating a three-dimensional structure of a pocket structure that is bound to the active site and a method of generating a three-dimensional structure of a compound to be created are designated in the three-dimensional structure generating step, and a method of generating a structural formula of a probe and a three-dimensional structure of a probe from the structural formula of the probe, a method of quantifying the degree of accumulation of probes with respect to the pocket structure, and a method of calculating the feature quantity of the pocket structure by quantifying the degree of accumulation of probes are designated in the feature quantity calculating step. The compound creating method according to the additional note 31 further includes a step of designating a method of calculating the similarity between the feature quantity of a pocket structure and the feature quantity of a compound, a step of designating the threshold of the similarity, a step of designating conditions in a case of generating a three-dimensional structure of the compound based on the feature quantity, and a step of generating a three-dimensional structure of the compound having a feature quantity, in which the similarity between the feature quantity thereof and the feature quantity of the pocket structure is greater than equal to the threshold under the conditions according to the generating method. The compound creating method according to the additional note 31 is a method obtained by modifying the compound creating method according to the additional note 25, and the three-dimensional structure of the biopolymer is input in place of the three-dimensional structure of the active site of the biopolymer. Therefore, the compound creating method according to the additional note 31 includes the "step of specifying the active site of the biopolymer based on the information related to the three-dimensional structure of the biopolymer". Even in the additional note 31, a compound compatible with the active site can be newly created by solving an inverse problem based on the three-dimensional structure of the biopolymer in the same manner as in the additional note 25.

(Additional Note 32)

The screening method according to an additional note 32 is a screening method using the feature quantity calculating method according to the additional note 21, including a step of inputting information related to the primary alignment of a biopolymer, a step of generating a three-dimensional structure of the biopolymer based on the information, and a step of specifying an active site of the biopolymer based on the three-dimensional structure, and the structural formulae of a plurality of search target compounds are designated in the target structure designating step, a method of generating a three-dimensional structure of a pocket structure that is bound to the active site and a method of generating three-dimensional structures of the plurality of search target compounds from the structural formulae of the plurality of search target compounds are designated in the three-dimensional structure generating step, and a method of generating a structural formula of a probe and a three-dimensional structure of a probe from the structural formula of the probe, a method of quantifying the degree of accumulation of probes with respect to the pocket structure, and a method of calculating the feature quantity based on the degree of accumulation are designated in the feature quantity calculating step. The screening method according to the additional note 32 further includes a step of designating a method of calculating the similarity between the feature quantity of the pocket structure and the feature quantities of the plurality of search target compounds, a step of designating a threshold of the similarity, and a step of extracting a compound from the plurality of search target compounds, in which the similarity of the feature quantity thereof and the feature quantity of the biopolymer is greater than or equal to the threshold, based on the three-dimensional structure of the active site of the biopolymer. The screening method according to the additional note 32 is a method obtained by modifying the screening method according to the additional note 24, and the primary alignment of the biopolymer is input in place of the three-dimensional structure of the active site of the biopolymer. Therefore, the screening method according to the additional note 32 includes the "step of generating a three-dimensional structure of the biopolymer based on information related to the primary alignment of the biopolymer" and the "step of specifying the active site of the biopolymer based on the three-dimensional structure of the biopolymer". Even in the additional note 32, a compound compatible with the active site can be screened from the existing compound group (the plurality of search target compounds) based on information related to the primary alignment of the biopolymer in the same manner as in the additional note 24.

(Additional Note 33)

In the compound creating method according to an additional note 33, a feature quantity calculating method including a three-dimensional structure generating step of generating a three-dimensional structure for a target structure and a feature quantity calculating step of calculating a feature quantity obtained by quantifying, in a three-dimensional space, the degree of accumulation of one or more kinds of probes in the periphery of the three-dimensional structure, in which the probe is a structure in which a plurality of points having a real electric charge and generating a van der Waals force are disposed to be separated from each other is used. Further, the compound creating method according to the additional note 33 further includes a step of inputting information related to the primary alignment of a biopolymer, a step of generating a three-dimensional structure of the biopolymer based on the information, and a step of specifying an active site of the biopolymer based on the three-dimensional structure, and a method of generating a three-dimensional structure of a pocket structure that is bound to the active site and a method of generating a three-dimensional structure of a compound to be created are designated in the three-dimensional structure generating step, and a method of generating a structural formula of a probe and a three-dimensional structure of a probe from the structural formula of the probe, a method of quantifying the degree of accumulation of probes with respect to the pocket structure, and a method of calculating the feature quantity of the pocket structure by quantifying the degree of accumulation of probes are designated in the feature quantity calculating step. The compound creating method according to the additional note 33 further includes a step of designating a method of calculating the similarity between the feature quantity of a pocket structure and the feature quantity of a compound, a step of designating the threshold of the similarity, a step of designating conditions in a case of generating a three-dimensional structure of the compound based on the feature quantity, and a step of generating a three-dimensional structure of the compound having a feature quantity, in which the similarity between the feature quantity thereof and the feature quantity of the pocket structure is greater than equal to the threshold under the conditions according to the generating method.

The compound creating method according to the additional note 33 is a method obtained by modifying the compound creating method according to the additional note 25, and the primary alignment of the biopolymer is input in place of the three-dimensional structure of the active site of the biopolymer. Therefore, the compound creating method according to the additional note 33 includes the "step of generating a three-dimensional structure of the biopolymer based on information related to the primary alignment of the biopolymer" and the "step of specifying the active site of the biopolymer based on the three-dimensional structure of the biopolymer". Even in the additional note 33, a compound compatible with the active site can be newly created by solving an inverse problem based on the primary alignment of the biopolymer in the same manner as in the additional note 25.

(Additional Note 34)

The screening method according to an additional note 34 is a screening method using the feature quantity calculating method according to the additional note 21, including a step of inputting three-dimensional structures of a plurality of binding compounds, and the structural formulae of a plurality of search target compounds are designated in the target structure designating step, a method of generating three-dimensional structures of the plurality of search target compounds is designated in the three-dimensional structure generating step, and a method of generating a structural formula of a probe and a three-dimensional structure of a probe from the structural formula of the probe, a method of quantifying the degree of accumulation of probes for each of the plurality of binding compounds, and a method of calculating the feature quantity based on the degree of accumulation are designated in the feature quantity calculating step. The screening method according to the additional note 34 further includes a step of designating the value of the binding force for each of the plurality of binding compounds, a step of designating a method of generating a prediction model of the binding force of the compound from a set of the three-dimensional structure and the value of the binding force for each of the plurality of binding compounds, a step of designating the target value of the binding force, and a step of extracting a compound having the binding force satisfying the target value from the plurality of search target compounds using the prediction model.

The screening method according to the additional note 34 is a method obtained by modifying the screening method according to the additional note 26, and the three-dimensional structure of the binding compound is input in place of the structural formula of the binding compound. Therefore, among the steps of the feature quantity calculating method according to additional note 21, the steps for generating the three-dimensional structure of the binding compound (the target structure designating step and the three-dimensional structure generating step) are not necessary. Even with the screening method according to the additional note 34, a compound having a target binding force can be screened from the existing compound group (the plurality of search target compounds) based on a set of the three-dimensional structure and the value of the binding force for each of the plurality of compounds in the same manner as in the additional note 26. Further, even in the additional note 34, the prediction model generating method and the prediction model described in the additional notes 18 and 19 can be used.

(Additional Note 35)

In the compound creating method according to an additional note 35, a feature quantity calculating method including a three-dimensional structure generating step of generating a three-dimensional structure for a target structure and a feature quantity calculating step of calculating a feature quantity obtained by quantifying, in a three-dimensional space, the degree of accumulation of one or more kinds of probes in the periphery of the three-dimensional structure, in which the probe is a structure in which a plurality of points having a real electric charge and generating a van der Waals force are disposed to be separated from each other, is used. Further, the compound creating method according to the additional note 35 further includes a step of inputting information related to the three-dimensional structure for each of a plurality of binding compounds, and a method of generating a three-dimensional structure of a compound to be created is designated in the three-dimensional structure generating step, and a method of generating a structural formula of a probe and a three-dimensional structure of a probe from the structural formula of the probe, a method of quantifying the degree of accumulation of probes, and a method of calculating the feature quantity based on the degree of accumulation are designated in the feature quantity calculating step. The compound creating method according to the additional note 35 further includes a step of designating the value of the binding force for each of the plurality of binding compounds, a step of designating a method of generating a prediction model of the binding force of the compound from a set of the three-dimensional structure and the value of the binding force for each of the plurality of binding compounds, a step of designating the target value of the binding force, a step of designating conditions in a case of generating a three-dimensional structure of the compound based on the feature quantity, and a step of generating a three-dimensional structure of the compound having a binding force greater than or equal to the target value under the conditions according to the generating method.

The compound creating method according to the additional note 35 is a method obtained by modifying the compound creating method according to the additional note 27, and the three-dimensional structure of the binding compound is input in place of the structural formula of the binding compound. Therefore, the steps for generating the three-dimensional structure of the binding compound (the target structure designating step and the three-dimensional structure generating step) are not necessary. Even with the compound creating method according to the additional note 35, a compound having a target binding force can be newly created by solving an inverse problem using a set of the three-dimensional structure and the value of the binding force for each of the plurality of compounds in the same manner as in the additional note 27. Further, even in the additional note 35, the prediction model generating method and the prediction model described in the additional notes 18 and 19 can be used.

(Additional Note 36)

The screening method according to an additional note 36 is a screening method using the feature quantity calculating method according to the additional note 21, including a step of inputting information related to the feature quantities of binding compounds, and the structural formulae of a plurality of search target compound s are designated in the target structure designating step, a method of generating three-dimensional structure of the plurality of search target compounds from the structural formulae of the plurality of search target compounds are designated in the three-dimensional structure generating step, and a method of generating a structural formula of a probe and a three-dimensional structure of a probe from the structural formula of the probe and a method of calculating the feature quantity by quantifying the degree of accumulation of probes are designated in the feature quantity calculating step. The screening method according to the additional note 36 further includes a step of designating a method of calculating the similarity between the feature quantity of a binding compound and the feature quantities of a plurality of search target compounds, a step of designating the threshold of the similarity, and a step of extracting a compound from the plurality of compounds, in which the similarity of the feature quantity thereof and the feature quantity of another compound is greater than or equal to the threshold. The screening method according to the additional note 36 is a method obtained by modifying the screening method according to the additional note 22, and the feature quantity is input in place of the structural formula of the binding compound. Therefore, each step for the binding compound in the feature quantity calculating method (the target structure designating step, the three-dimensional structure generating step, and the feature quantity calculating step) according to the additional note 21 is not necessary. Even in the screening method according to the additional note 36, a compound having the same binding force as the binding force of one binding compound can be screened from the existing compound group (the plurality of search target compounds) based on the feature quantity of the binding compound in the same manner as in the additional note 22.

(Additional Note 37)

In the compound creating method according to an additional note 37, a feature quantity calculating method including a three-dimensional structure generating step of generating a three-dimensional structure for a target structure and a feature quantity calculating step of calculating a feature quantity obtained by quantifying, in a three-dimensional space, the degree of accumulation of one or more kinds of probes in the periphery of the three-dimensional structure, in which the probe is a structure in which a plurality of points having a real electric charge and generating a van der Waals force are disposed to be separated from each other, is used. Further, the compound creating method according to the additional note 37 further includes a step of inputting the feature quantity of a binding compound, and a method of generating a three-dimensional structure of a compound to be created is designated in the three-dimensional structure generating step, and a method of generating a structural formula of a probe and a three-dimensional structure of a probe from the structural formula of the probe and a method of calculating the feature quantity of the binding compound by quantifying the degree of accumulation of probes are designated in the feature quantity calculating step. The compound creating method according to the additional note 37 further includes a step of designating the method of calculating the similarity between the feature quantity of the binding compound and the feature quantity of another compound, a step of designating the threshold of the similarity, a step of designating conditions in a case of generating a three-dimensional structure of the compound based on the feature quantity, and a step of generating a three-dimensional structure of the compound having a feature quantity, in which the similarity between the feature quantity thereof and the feature quantity of the binding compound is greater than or equal to the threshold under the conditions according to the generating method.

The compound creating method according to the additional note 37 is a method obtained by modifying the compound creating method according to the additional note 23, and the feature quantity is input in place of the structural formula of the binding compound. Therefore, each step for the binding compound in the feature quantity calculating method (the target structure designating step, the three-dimensional structure generating step, and the feature quantity calculating step) is not necessary. Even in the compound creating method according to the additional note 37, a compound having the same binding force as the binding force of one binding compound can be newly created by solving an inverse problem based on the feature quantity of the binding compound in the same manner as in the additional note 23.

(Additional Note 38)

The screening method according to an additional note 38 is a screening method using the feature quantity calculating method according to the additional note 21, including a step of inputting the feature quantities of binding compounds, and the structural formulae of a plurality of search target compound s are designated in the target structure designating step, a method of generating three-dimensional structure of the plurality of search target compounds are designated in the three-dimensional structure generating step, and a method of generating a structural formula of a probe and a three-dimensional structure of a probe from the structural formula of the probe is designated in the feature quantity calculating step. The screening method according to the additional note 38 further includes a step of designating the value of the binding force for each of the plurality of binding compounds, a step of designating a method of generating a prediction model of the binding force of the compound from a set of the feature quantity and the value of the binding force for each of the plurality of binding compounds, a step of designating the target value of the binding force, and a step of extracting a compound having the binding force satisfying the target value from the plurality of search target compounds using the prediction model.

The screening method according to the additional note 38 is a method obtained by modifying the screening method according to the additional note 26, and the feature quantity is input in place of the structural formula of the binding compound. Therefore, each step for the binding compound in the feature quantity calculating method (the target structure designating step, the three-dimensional structure generating step, and the feature quantity calculating step) according to the additional note 21 is not necessary. Even with the screening method according to the additional note 38, a compound having a target binding force can be screened from the existing compound group (the plurality of search target compounds) using a set of the feature quantity and the value of the binding force for each of the plurality of compounds in the same manner as in the additional note 26. Further, even in the additional note 38, the prediction model generating method and the prediction model described in the additional notes 18 and 19 can be used.

(Additional Note 39)

The compound creating method according to an additional note 39 is a compound creating method using the feature quantity calculating method according to the additional note 21, including a step of inputting feature quantities for a plurality of binding compounds, and a method of generating a three-dimensional structure of a compound to be created is designated in the three-dimensional structure generating step. The compound creating method according to the additional note 39 further includes a step of designating the feature quantity and the value of the binding force for each of the plurality of binding compounds, a step of designating a method of generating a prediction model of the binding force of the compound from a set of the feature quantity and the value of the binding force for each of the plurality of binding compounds, a step of designating the target value of the binding force, a step of designating conditions in a case of generating a three-dimensional structure of the compound based on the feature quantity, and a step of generating a three-dimensional structure of the compound having a binding force greater than or equal to the target value under the conditions according to the generating method. The compound creating method according to the additional note 39 is a method obtained by modifying the compound creating method according to the additional note 27, and the feature quantity is input in place of the structural formula of the binding compound. Therefore, each step for the binding compound in the feature quantity calculating method (the target structure designating step, the three-dimensional structure generating step, and the feature quantity calculating step) according to the additional note 21 is not necessary. Even with the compound creating method according to the additional note 39, a compound having a target binding force can be newly created by solving an inverse problem using a set of the feature quantity and the value of the binding force for each of the plurality of compounds in the same manner as in the additional note 27. Further, even in the additional note 39, the prediction model generating method and the prediction model described in the additional notes 18 and 19 can be used.

(Additional Note 40)

The compound information processing method according to an additional note 40 is a compound information processing method using the feature quantity calculating method according to the additional note 21, and a compound is designated as a target structure in the target structure designating step, a three-dimensional structure of the compound formed of a plurality of atoms is generated in the three-dimensional structure generating step, and a first feature quantity which is a feature quantity obtained by quantifying, in the three-dimensional space, the degree of accumulation of amino acids as the probes in the periphery of the three-dimensional structure of the compound generated in the three-dimensional structure generating step is calculated in the feature quantity calculating step. The compound information processing method according to the additional note 40 further includes a step of collating the degree of accumulation of amino acids for a compound with a database storing information related to three-dimensional structures of a plurality of proteins, and a step of extracting a candidate of a target protein, to which the compound is bound, from the plurality of proteins based on the collation, which is a step of extracting a candidate of a target protein based on the ratio of match between the degree of accumulation of amino acids for the compound and the distribution pattern of the amino acids in a region including a protein pocket. As the protein database, for example, the Protein Data Bank (PDB) can be used, but the database is not limited to this example.

Figure 65:
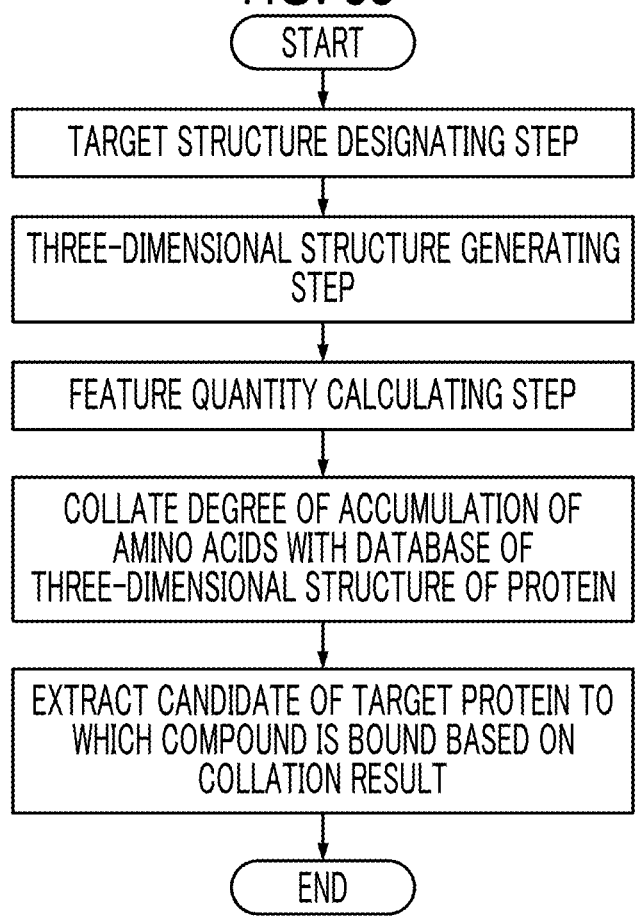
FIG. 65 is still another flowchart showing compound information processing according to the present invention.

In the drug discovery research, there is a need to "specify which protein (target protein) a compound that is a candidate for a new drug acts on". The compound information processing method according to the additional note 40 corresponds to such needs, and candidate for a target protein is extracted by the processes shown in the flowchart of FIG. 65. Information related to the name of the extracted candidate and the three-dimensional structure thereof may be output (displayed on a display device or the like). Such processing can be performed by, for example, the devices (the screening device 10, the compound creating device 20, and the pharmaceutical candidate compound search device 30) according to the first to third embodiments, or a device or system having the same configuration as those of these devices. Further, a program for causing these devices and systems to execute the processes shown in the flowchart of FIG. 65, and a non-transitory recording medium on which a computer-readable code of such a program is recorded can also be exemplified as aspects of the present invention.

Output Examples Related to Additional Notes 22 to 40

(1) Output Example of Information Related to One Compound

In the screening method and the compound creating method according to the additional notes 22 to 27, the degree of accumulation of each amino acid can be shown as a figure or a numerical value together with the structural formula of the compound and other descriptors (feature quantities). For example, as shown in FIG. 66, the degree of accumulation of each amino acid calculated by the feature quantity calculating method according to the present invention can be three-dimensionally shown in association with the name, structural formula, and three-dimensional structure of the compound. Further, as shown in FIG. 67, the degree of accumulation of each amino acid can be displayed for the share of the selected atom group (the portion indicated by the circle and the arrow in the rightmost column of FIG. 67).

Figure 68:
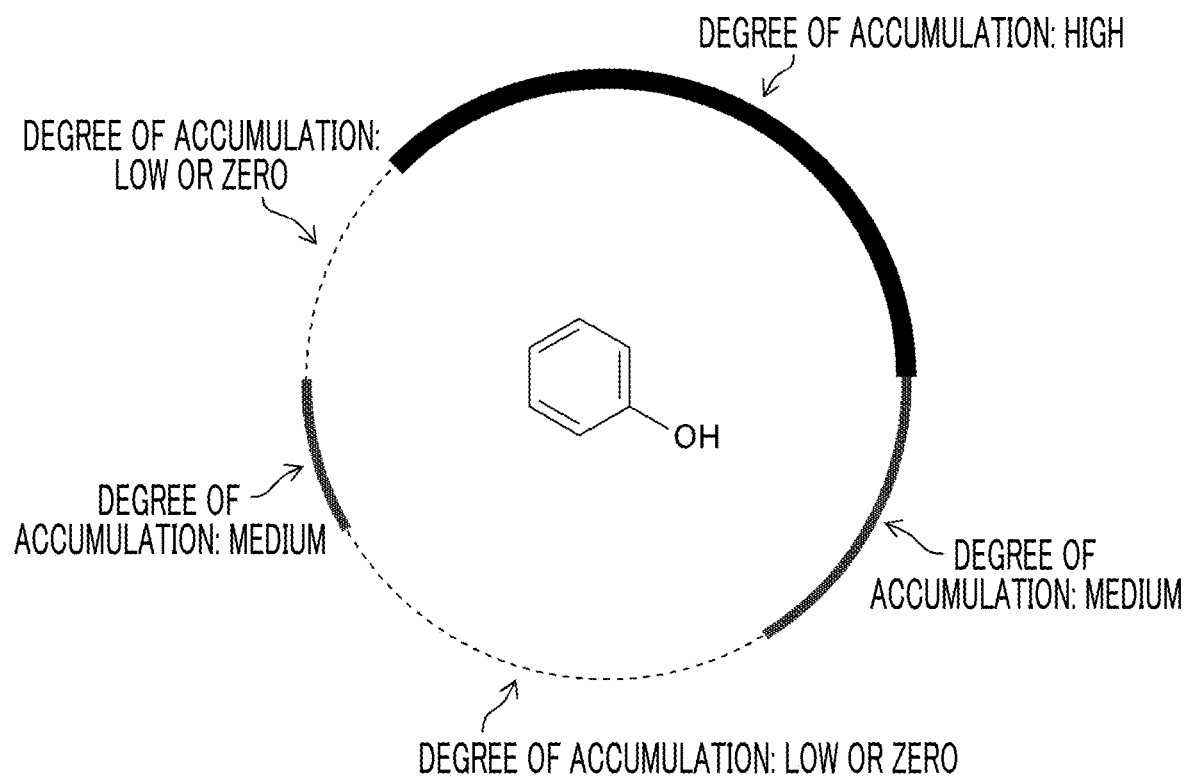
FIG. 68 is a diagram showing an example of a two-dimensional display of the degree of accumulation of amino acids.

The display of the degree of accumulation may be three-dimensional and realistic as shown in FIGS. 66 and 61 or may be two-dimensional and/or simple. For example, as shown in FIG. 68, the degree of accumulation of probes (amino acids and the like) can be indicated by arcs with different thicknesses and colors on the circumference of a virtual circle (indicated by a dotted line in FIG. 68) centered on the target compound. In this aspect, for example, a range with a high degree of accumulation can be displayed with a thick red line, and a range with a low degree of accumulation can be displayed with a thin blue line. A plurality of colors may be used, or a single color shade (for example, white, gray, or black) may be displayed. Further, a range with an extremely low degree of accumulation (alternatively, zero) may have no line. Further, the relationship between the thickness and color of the arc and the degree of accumulation shown in FIG. 68 is an example.

Figure 69A:
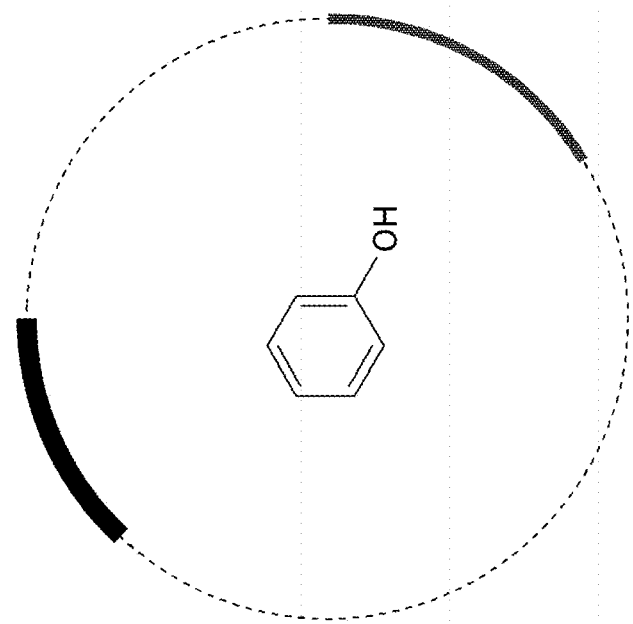
FIGS. 69A and 69B are other diagrams showing an example of a two-dimensional display of the degree of accumulation of amino acids.
Figure 69B:
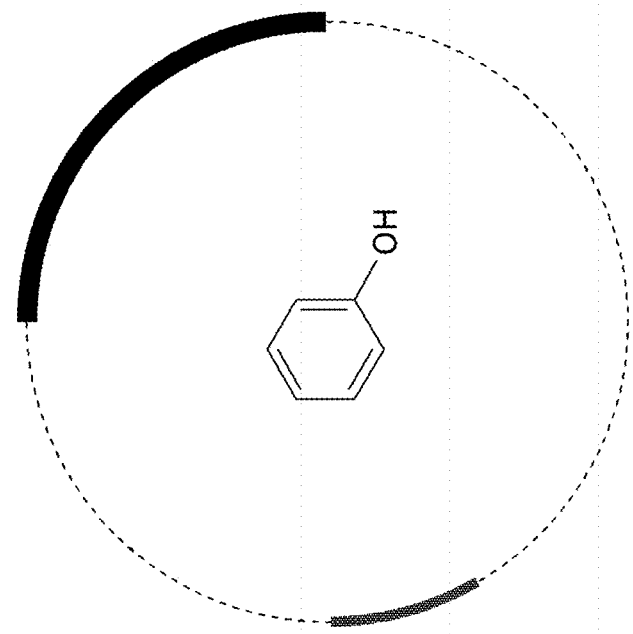
Figure 70:
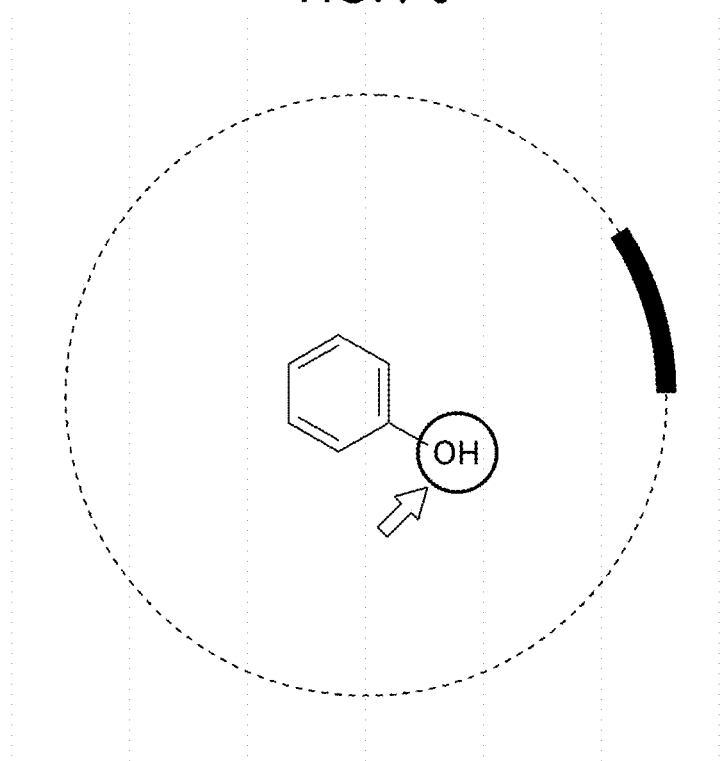
FIG. 70 is still another diagram showing an example of a two-dimensional display of the degree of accumulation of amino acids.

FIG. 69 shows an example showing the share of each amino acid in the overall degree of accumulation in the aspect of FIG. 68. FIG. 69A shows the degree of accumulation of a certain amino acid, and FIG. 69B shows the degree of accumulation of another amino acid. Further, as shown in FIG. 70, the share of the selected portion (the portion indicated by the solid circle and the arrow in the figure) in the degree of accumulation may be displayed.

Figure 71:
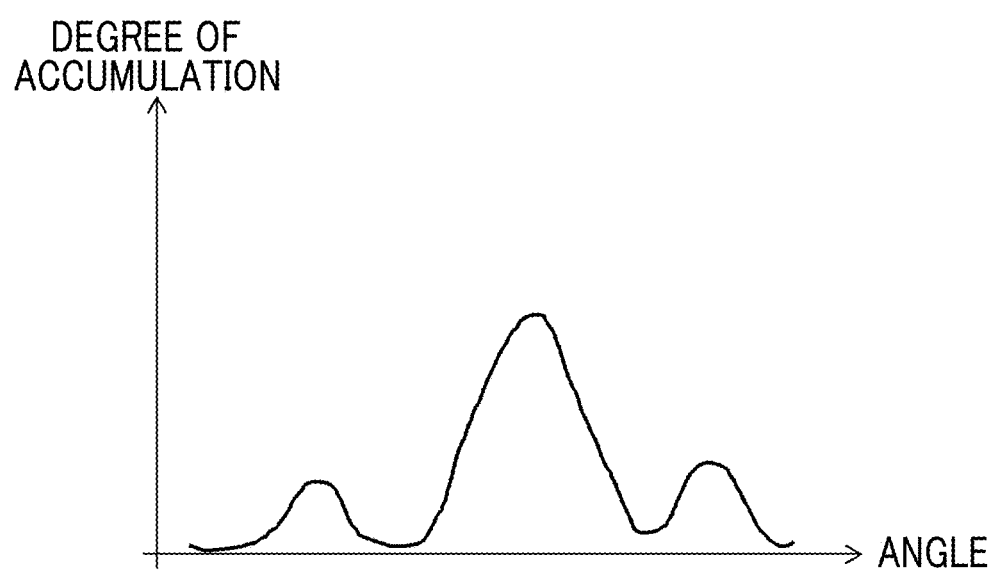
FIG. 71 is a diagram showing an example of a graph display of the degree of accumulation of amino acids.
Figure 72:
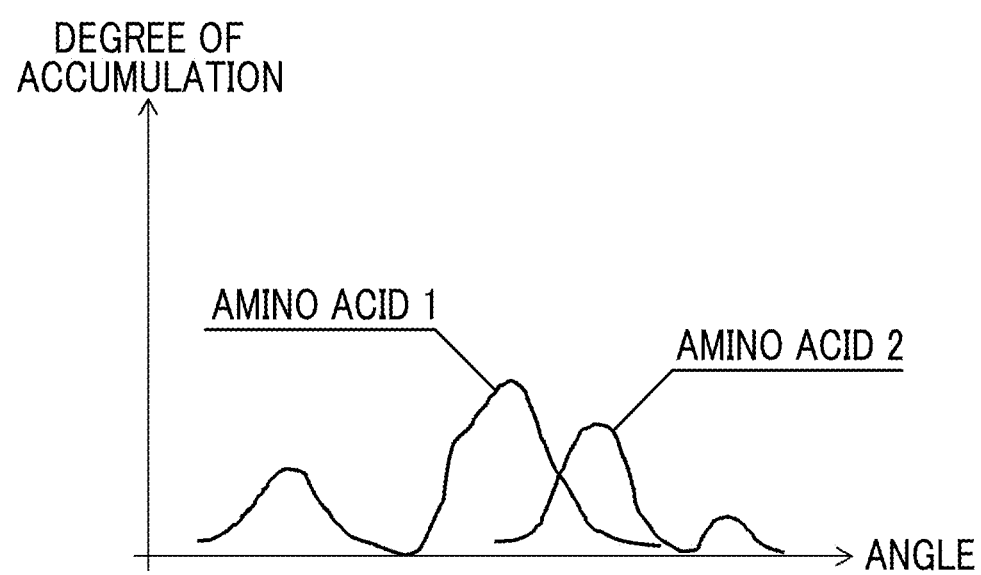
FIG. 72 is another diagram showing an example of a graph display of the degree of accumulation of amino acids.

FIG. 71 is a diagram showing a state in which the degree of accumulation of probes is displayed in a two-dimensional graph. The horizontal axis of the figure shows the angle with respect to the designated direction, and the vertical axis shows the degree of accumulation. FIG. 71 is a diagram showing the degree of accumulation of all probes (for example, 20 kinds of amino acids), and FIG. 72 shows each decomposed probe (for example, individual amino acids).

Figure 73A:
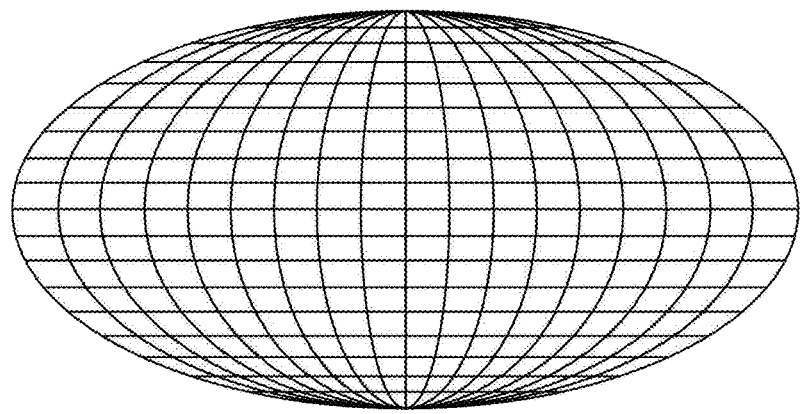
FIGS. 73A and 73B are diagrams showing an example of a pseudo three-dimensional display of a feature quantity.
Figure 73B:
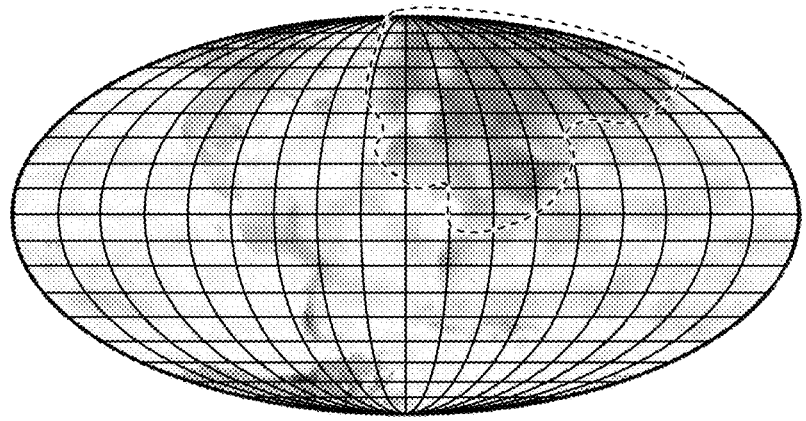

FIG. 73 is a diagram showing an example of a pseudo three-dimensional display of the feature quantity. In the example shown in FIG. 73, the degree of accumulation of probes on a spherical surface centered on the target compound is projected two-dimensionally by the Mollweide's projection used in creation of a world map. FIG. 73A shows the region on the spherical surface with lines corresponding to the latitude and the longitude, and FIG. 73B shows high and low degrees of accumulations with the color in the same manner as in FIGS. 64 to 68. For example, a region having a high degree of accumulation (the region surrounded by a dotted line, etc.) can be displayed with red, and a region having a low degree of accumulation can be displayed with blue. Further, the examples in FIGS. 67 and 68 conceptually show the display aspect and do not represent the degree of accumulation with respect to the actual compounds.

Based on the aspects in FIGS. 66 and 67, the user can easily visually grasp the degree of accumulation of the probes. The degree of accumulation and the like in these figures can be displayed on the monitor 310 (display device) according to the user's operation by, for example, the display control unit 150 of the devices (the screening device 10, the compound creating device 20, and the pharmaceutical candidate compound search device 30) according to the first to third aspects (the same applies to the modification examples and the additional notes).

(2) Output Example of Information Related to Screening and Creation for Maintaining Binding Force The following examples can be considered as output aspects for facilitating understanding the active sites of the binding compound or the biopolymer and the difference between compounds to be screened and created. For example, an aspect of "the difference in the degree of accumulation of each amino acid is expressed and presented as a similarity" or "the difference in the degree of accumulation of each amino acid is presented as a figure or a numerical value" can be considered. Further, an aspect of "with the difference in the degree of accumulation of each amino acid, the portion of the degree of accumulation that matches is detected, the portion is collated with the degree of accumulation of the share of each atom to specify the atom corresponding to the portion of the degree of accumulation that matches, and the atom is presented on the structural formula" can also be considered. Further, in creation of a three-dimensional structure by solving an inverse problem, in addition to the structural formula of the compound, presentation of the state where the degree of accumulation of each amino acid gradually approaches the degree of accumulation of the active sites of the binding compound and the biopolymer is considered. FIG. 74 is a diagram showing an example in which the difference in the degree of accumulation of each amino acid of the screening compound ("lig002" or the like) is expressed as the similarity with respect to the target compound ("lig001" in the figure).

Figure 75:
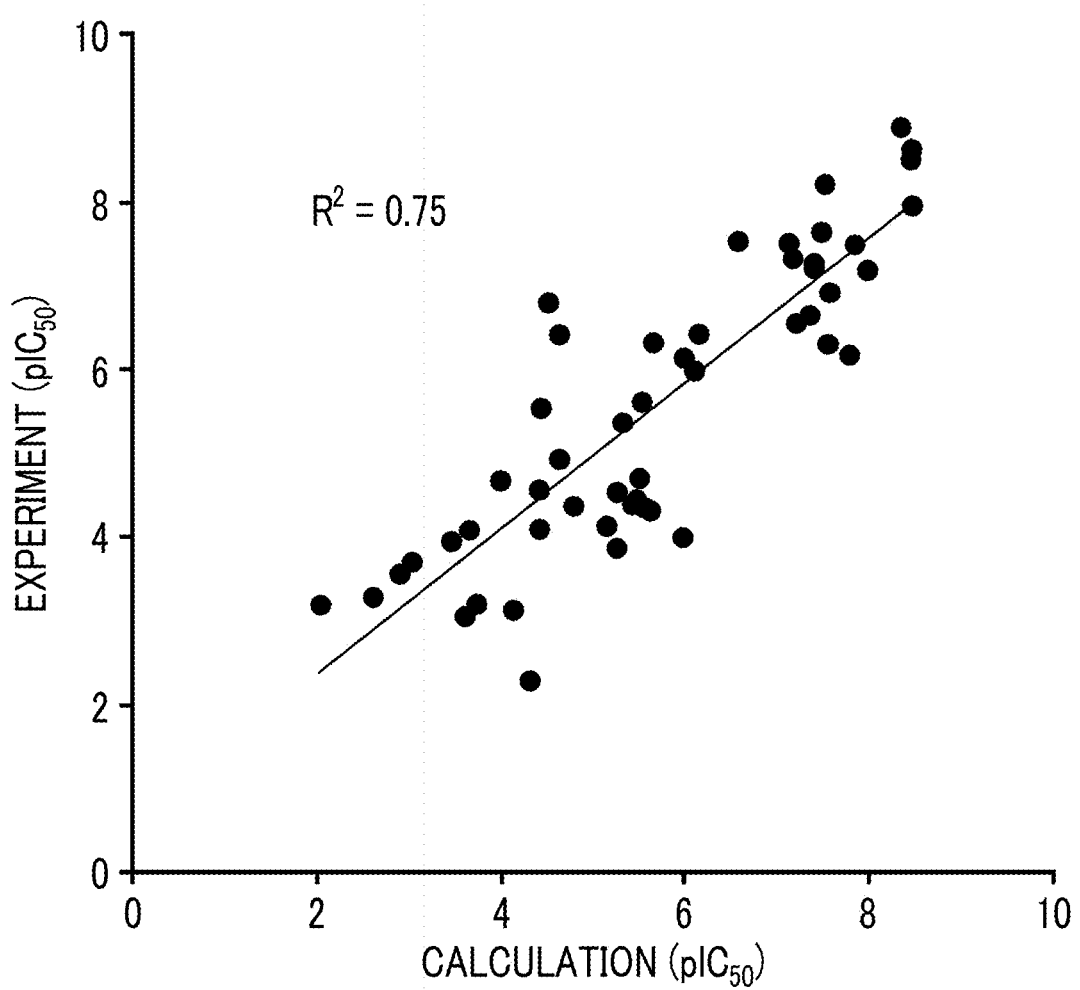
FIG. 75 is a graph showing an output example of the performance of a prediction model for the binding force.

(3) Output Example of Information Related to Screening and Creation for Improving Binding Force The output of information related to screening and creation for improving the binding force from a set of a plurality of binding compounds and values of the binding force will be described. For example, as shown in FIG. 75, it is considered to present the performance of the prediction model for the binding force (correspondence between actual measurement and prediction, $R^2$ and the like). Further, it is considered to present an important factor for the binding force as a part of the degree of accumulation of each amino acid and the structural formula. Further, it is also considered to output a predicted value of the binding force of the compound.

(4) Output by Grouping Amino Acids

According to the above-described aspects (1) to (3), the user can easily visually grasp the degree of accumulation of amino acids (probes) and information related thereto, but it is considered to output the averaged result obtained by grouping amino acids based on the properties of the amino acids being hydrophilic, hydrophobic, neutral, basic, or acidic without outputting all the information related to the amino acids in a case of the output.

(Additional Note 41)

A compound search server according to an additional note 41 comprises a reception unit that receives first information related to a three-dimensional structure of a first compound and second information for specifying a plurality of compounds to be searched from a client device, an extraction unit that extracts a target compound having a target feature quantity in which the similarity with the feature quantity of the first compound is in the designated range from the plurality of compounds based on the feature quantity calculated by the feature quantity calculating method according to any one of the first to fourth aspects and the feature quantities of the plurality of compounds, and a transmission unit that transmits third information related to the three-dimensional structure of the target compound to the client device.

(Additional Note 42)

A client device according to the additional note 42 comprises a transmission unit that transmits the first information and the second information to the compound search server according to additional note 41, a reception unit that receives the third information from the compound search server, and an output unit that outputs the third information. Further, a program that causes a computer to execute a transmission function for transmitting the first information and the second information to the compound search server according to the additional note 41, a reception function for receiving the third information from the compound search server, and an output function for outputting the third information and a non-transitory recording medium on which a computer-readable code of the program is recorded can also be exemplified as a modification example of the additional note 42.

(Additional Note 43)

A compound search system according to an additional note 43 includes the compound search server according to the additional note 41 and the client device according to the additional note 42.

<Configuration Example of Compound Search System According to Additional Notes 41 to 43>

Figure 76:
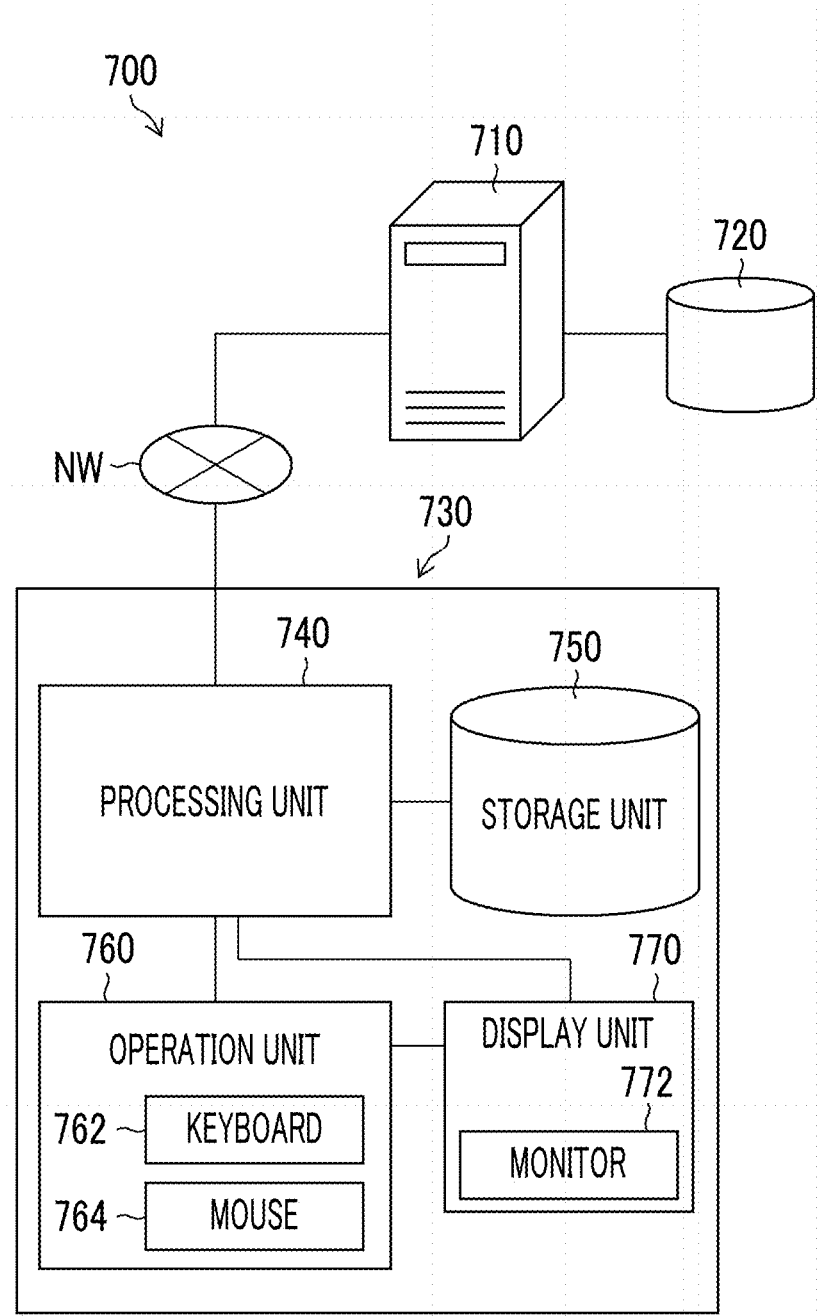
FIG. 76 is a diagram showing a configuration example of a compound search system according to the present invention.
Figure 77:
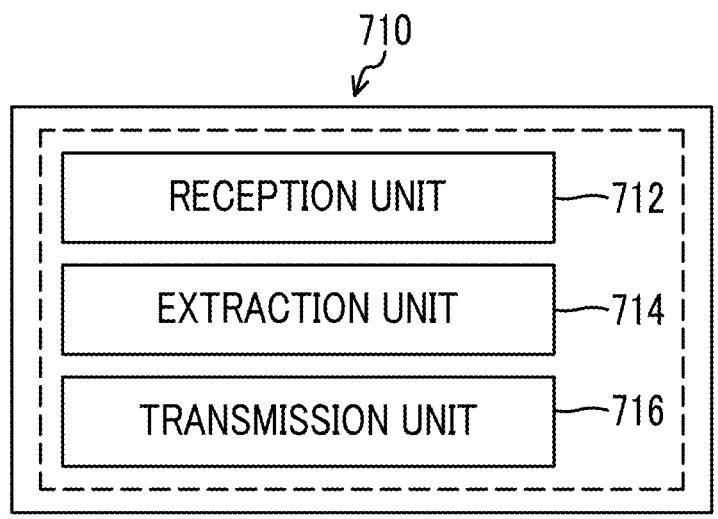
FIG. 77 is a diagram showing an example of a functional configuration of a compound search server.
Figure 78:
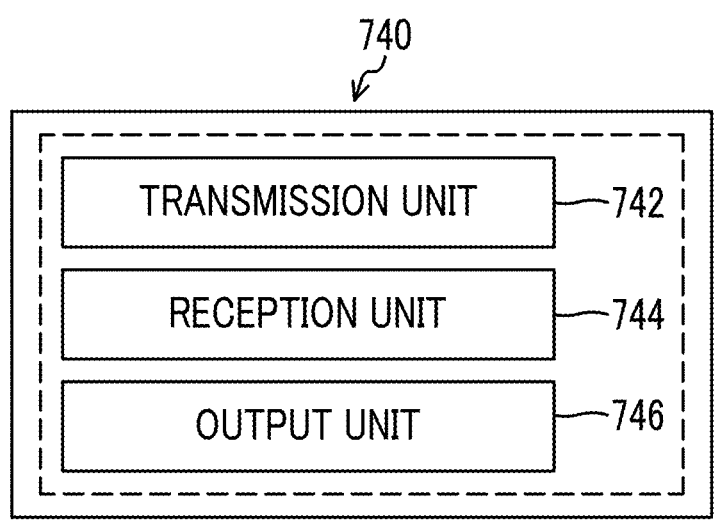
FIG. 78 is a diagram showing an example of a functional configuration of a client device.

FIG. 76 is a diagram showing the configuration of a compound search system 700 (compound search system) according to the additional notes 41 to 43. The compound search system 700 includes a compound search server 710 (compound search server) and a client device 730 (client device), which are configured to be connected through a network NW. The compound search server 710 has a database 720 in which the three-dimensional structures and the characteristics (for example, the feature quantities, the binding forces, the physical property values, and the characteristic values) of proteins or other compounds are stored. The compound search server 710 may access an existing database such as PDB. Further, as shown in the functional block diagram of FIG. 77, the compound search server 710 comprises a reception unit 712 (reception unit), an extraction unit 714 (extraction unit), and a transmission unit 716 (transmission unit). Further, as shown in FIGS. 76 and 72, a processing unit 740 of the client device 730 comprises a transmission unit 742 (transmission unit), a reception unit 744 (reception unit), and an output unit (746). These functions can be realized using one or more processors such as a CPU as described above for the first embodiment, and the processors execute the processing according to the additional note 41. The same applies to the client device 730 and other additional notes described below.

These constituent elements of the compound search system 700 may be owned and/or used by one operator. Further, for example, the provider of the compound search service may own the compound search server 710 and the database 720, and the user may own and/or use the client device 730. In this case, the user of the client device 730 operates the operation unit 760 or the like to designate the information (an aspect of the "second information") specifying the structural formulae (an aspect of the "first information"; may be three-dimensional images) of one or more compounds and a plurality of compounds to be searched, and the client device 730 transmits the information to the compound search server 710 via the transmission unit 742 of the processing unit 740. The user may designate the structural formula or the three-dimensional structure of each compound as "information for specifying a plurality of compounds to be searched" or designate the name of a database in which the three-dimensional structures and the like of the compounds are stored (for example, the Protein Data Bank (PDB)) or the location on the network (Uniform Resource Locator (URL) or the like).

The compound search server 710 that has received the information (the first information and the second information) from the client device 730 extracts the target compound by the above-described process according to the additional note 41 and transmits information (the structural formulae or the three-dimensional images; third information) related to the three-dimensional structure of the target compound to the client device 730. The client device 730 outputs (displays the information on the monitor 772 or the like) the information (third information) received from the compound search server 710. In this manner, the user of the client device 730 can receive the structural formula of another compound having the same binding force as that of "one or more compounds" extracted from the "plurality of compounds to be searched" designated by the user and the value of the binding force. A service provider such as the owner of the compound search server 710 may synthesize the actual compound for which the structural formula or the like is provided and provide the compound to the user.

(Additional Note 44)

A compound creation server according to an additional note 44 comprises a reception unit that receives first information related to a three-dimensional structure of a first compound from a client device, a calculation unit that calculates the feature quantity of the first compound using the feature quantity calculating method according to any one of the first to fourth aspects based on the first information, a generation unit that generates second information related to the three-dimensional structure of a second compound having a target feature quantity which is in the designated range with respect to the feature quantity based on the feature quantity and the compound creating method according to any one of the additional notes 15 to 17, 23, 25, 27, 29, 31, 33, 35, 37, and 39, and a transmission unit that transmits the second information to the client device.

(Additional Note 45)

A client device according to an additional note 45 comprises a transmission unit that transmits first information related to the three-dimensional structure of a first compound to the compound creation server according to the additional note 44, a reception unit that receives second information from the compound creation server, and an output unit that outputs the second information.

(Additional Note 46)

A compound creating system according to an additional note 46 includes the compound creation server according to the additional note 44 and the client device according to the additional note 45.

<Configuration Example of Compound Creating System According to Additional Notes 44 to 46>

Figure 79:
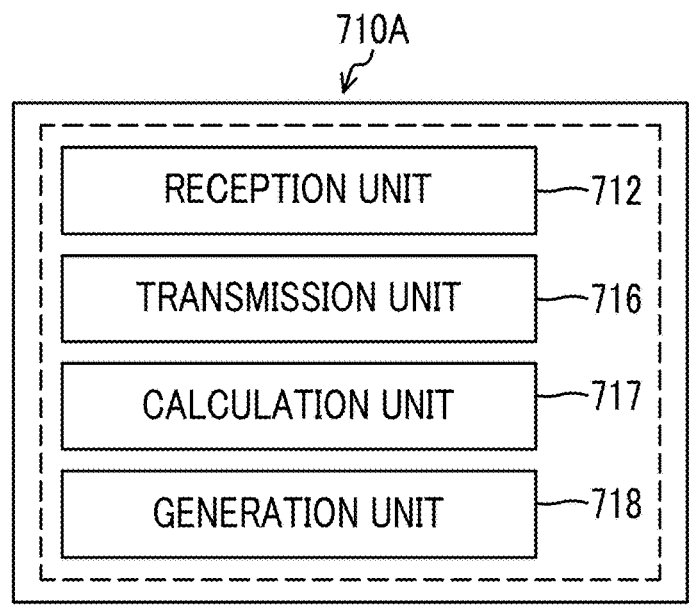
FIG. 79 is a diagram showing an example of a functional configuration of a compound creation server.

The compound creating system according to the additional notes 44 to 46 can adopt the same configuration (the configuration in which the server and the client device are connected via a network; see FIG. 76) as the compound search system 700 (compound search system) according to the additional notes 41 to 43. Here, as shown in the functional block diagram of FIG. 79, a compound creation server 710A (compound creation server) according to the additional note 44 includes a reception unit 712 (reception unit), a transmission unit 716 (transmission unit), and a calculation unit 717 (calculation unit), and a generation unit 718 (generation unit). As the client device in the compound creating system, the same configuration as the client device 730 shown in FIG. 76 can be used.

With such a configuration, the user of the client device 730 designates the structural formulae of one or more compounds (an aspect of the "first information"; may be three-dimensional images) by operating the operation unit 760, and the client device 730 transmits the information to the compound creation server 710A via the transmission unit 742 of the processing unit 740. The client device 730 may transmit the target feature quantity and the range of the feature quantity together. The compound creation server 710A which has received the information (first information) from the client device 730 generates (creates a compound) information (structural formulae and three-dimensional images; second information) related to the three-dimensional structure of a compound (second compound) having a feature quantity that is in the designated range with respect to the target feature quantity by the above-described process according to the additional note 44 and transmits the information to the client device 730. The compound creation server 710A may calculate the binding force of the second compound and transmit the calculated value with the information. The client device 730 outputs (displays information on the monitor 772 or the like) the information (second information) received from the compound creation server 710A. In this manner, the user of the client device 730 can receive the structural formula of an existing or novel compound having the same binding force as that of "one or more compounds" (the feature quantity is in the designated range with respect to the target feature quantity) designated by the user and the value of the binding force. A service provider such as the owner of the compound creation server 710A may synthesize the actual compound for which the structural formula or the like is provided and provide the compound to the user.

(Additional Note 47)

A compound search server according to an additional note 47 includes a reception unit that receives first information related to the three-dimensional structures of a plurality of compounds, second information related to the binding force, and third information for specifying the three-dimensional structures of a plurality of search target compounds from the client device, a generation unit that generates a prediction model outputting the binding force of the compound based on the feature quantity according to the feature quantity calculating method according to any one of the first to fourth aspects from first information and the second information on the plurality of compounds, a calculation unit that calculates the feature quantity using the feature quantity calculating method according to any one of the first to fourth aspects based on third information on each of the plurality of search target compounds, an estimation unit that estimates the binding force by applying the calculated feature quantity to the prediction model for each of the plurality of search target compounds, an extraction unit that extracts a compound having a binding force higher than those of the plurality of compounds from the plurality of search target compounds, and a transmission unit that transmits information related to the three-dimensional structure of the extracted compound and information related to the binding force of the extracted compound to the client device.

(Additional Note 48)

A client device according to an additional note 48 comprises a transmission unit that transmits first information related to the three-dimensional structures of a plurality of compounds, second information related to the binding force, and third information for specifying the three-dimensional structures of a plurality of search target compounds to the compound search server according to the additional note 47, a reception unit that receives information related to the three-dimensional structure of the compound and information related to the binding force of the extracted compound, extracted by the compound search server, from the compound search server, and an output unit that outputs the information related to the three-dimensional structure of the compound and the information related to the binding force of the extracted compound.

(Additional Note 49)

A compound search system according to an additional note 49 includes the compound search server according to the additional note 47 and the client device according to the additional note 48.

<Configuration Example of Compound Search System According to Additional Notes 47 to 49>

Figure 80:
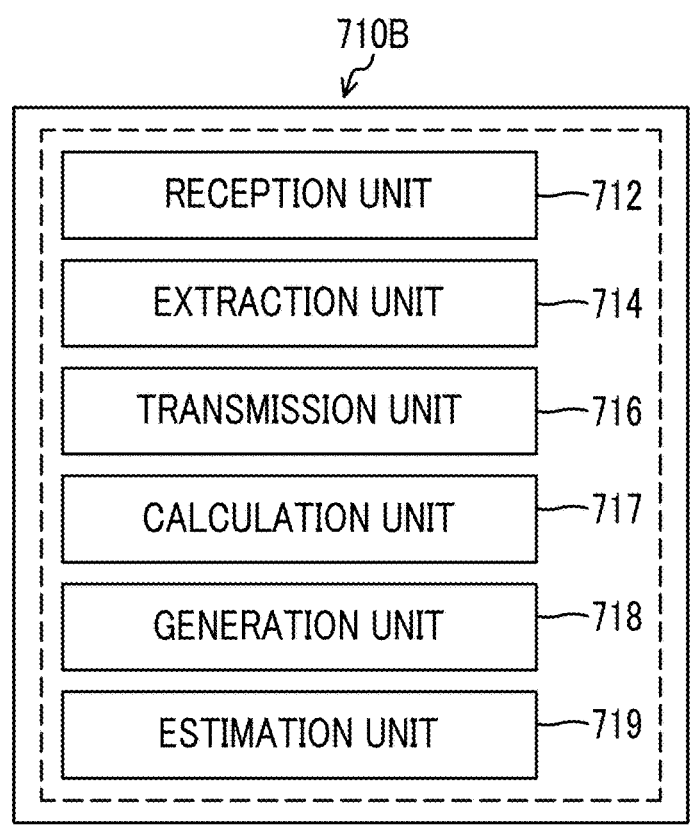
FIG. 80 is a diagram showing another example of a functional configuration of a compound search server.

The compound search system according to the additional notes 47 to 49 can adopt the same configuration (the configuration in which the server and the client device are connected via a network; see FIG. 76) as the compound search system 700 (compound search system) according to the additional notes 41 to 43. Here, as shown in the functional block diagram of FIG. 80, the compound search server 710B (compound search server) according to the additional note 47 includes a reception unit 712 (reception unit), an extraction unit 714 (extraction unit), a transmission unit 716 (transmission unit), a calculation unit 717 (calculation unit), a generation unit 718 (generation unit), and an estimation unit 719 (estimation unit). As the client device in the compound search system, the same configuration as that of the client device 730 shown in FIG. 76 can be used.

With such a configuration, the user of the client device 730 designates the first information (the structural formulae, the three-dimensional images, and the like) related to the three-dimensional structures of a plurality of compounds, the second information related to the binding force, and the third information that specifies the three-dimensional structures of a plurality of search target compounds by operating the operation unit 760, and the client device 730 transmits the information to the compound search server 710B via the transmission unit 742 of the processing unit 740. The user may designate the structural formula or the three-dimensional structure of each compound as "information related to the three-dimensional structure of a plurality of compounds" or designate the name of a database in which the three-dimensional structures and the like of the compounds are stored (for example, PDB) or the location on the network (URL or the like). The compound search server 710B which has received the information (first to third information) from the client device 730 extracts the compound by the above-described process according to the additional note 47 and transmits the information related to the three-dimensional structure of the compound and the information related to the binding force to the client device 730. The client device 730 outputs (displays on the monitor 772 or the like) the information received from the compound search server 710B. In this manner, the user of the client device 730 can receive the structural formula of a novel compound having a higher binding force than the compound designated by the user and the value of the binding force. A service provider such as the owner of the compound search server 710 may synthesize the actual compound for which the structural formula or the like is provided and provide the compound to the user.

(Additional Note 50)

A compound creation server according to an additional note 50 includes a reception unit that receives first information related to three-dimensional structures of a plurality of compounds and second information related to the binding force from a client device, a generation unit that generates a prediction model that outputs the binding force of a compound based on the feature quantity according to the feature quantity calculating method according to any one of the first to fourth aspects from first information and the second information on the plurality of compounds, a generation unit that generates information related to the three-dimensional structure of a compound having a higher binding force than the binding force for each of the plurality of compounds based on the prediction model and the compound creating method according to any one of the additional notes 15 to 17, 23, 25, 27, 29, 31, 33, 35, 37, and 39, and a transmission unit that transmits the generated information and the information related to the binding force of the compound corresponding to the generated information to the client device.

(Additional Note 51)

A client device according to an additional note 51 comprises a transmission unit that transmits first information related to the three-dimensional structures of a plurality of compounds and second information related to the binding force to the compound creation server according to the additional note 50, a reception unit that receives information related to the three-dimensional structure of the compound generated by the compound creation server and information related to the binding force of the compound corresponding to the generated information, from the compound creation server, and an output unit that outputs the information related to the three-dimensional structure received from the compound creation server and the information related to the binding force.

(Additional Note 52)

A compound creating system according to an additional note 52 includes the compound creation server according to the additional note 50 and the client device according to the additional note 51.

<Configuration Example of Compound Creating System According to Additional Notes 50 to 52>

With the configuration, the user of the client device of the compound creating system according to the additional notes 50 to 52 can receive the structural formula of an existing or novel compound having a higher binding force than the compound designated by the user and the value of the binding force. A service provider such as the owner of the compound search server 710 may synthesize the actual compound for which the structural formula or the like is provided and provide the compound to the user.

EXPLANATION OF REFERENCES

10: screening device
20: compound creating device
30: pharmaceutical candidate compound search device
100: processing unit
101: processing unit
102: processing unit
103: processing unit
104: processing unit
105: processing unit
110: information input unit
120: feature quantity calculation unit
122: feature quantity calculation unit
130: similarity calculation unit
132: generator construction unit
133: binding force prediction unit
134: characteristic value calculation unit
136: structural feature quantity calculation unit
140: compound extraction unit
142: compound three-dimensional structure generation unit
150: display control unit
160: CPU
170: ROM
180: RAM
200: storage unit
201: storage unit
202: storage unit
210: structure information
220: three-dimensional structure information
230: three-dimensional AAM descriptor
240: invariant AAM descriptor
250: similarity information
260: compound extraction result
270: three-dimensional structure generation result
300: display unit
310: monitor
400: operation unit
410: keyboard
420: mouse
500: external server
510: external database
600: hierarchical network
610: input layer
620: interlayer
622: first interlayer
624: second interlayer
625: layer
627: layer
630: output layer
700: compound search system
710: compound search server
710A: compound creation server
710B: compound search server
712: reception unit
714: extraction unit
716: transmission unit
717: calculation unit
718: generation unit
719: estimation unit
720: database
730: client device
742: processing unit
742: transmission unit
744: reception unit
750: storage unit
760: operation unit
762: keyboard
764: mouse
770: display unit
772: monitor
A1: amino acid
A2: amino acid
A3: amino acid
AA2AR: protein
ABL1: protein
C0: compound
C1: compound
C2: compound
C3: compound
C4: compound
C5: compound
C6: compound
NW: network
PO: pocket
PS: pocket structure
S100 to S108: each step of feature quantity calculating method
S200 to S206: each step of feature quantity calculating method S300 to S304: each step of target compound extracting method
S310 to S326: each step of screening method
S400 to S404: each step of target compound extracting method
S500 to S504: each step of three-dimensional structure creating method
S600 to S604: each step of three-dimensional structure creating method
TP: target protein

What is claimed is:

1. A feature quantity calculating method, executed by a computer having a processor, wherein the processor is configured to perform:
   a target structure designating step of designating a target structure formed of a plurality of unit structures having chemical properties; and
   a feature quantity calculating step of calculating a feature quantity obtained by quantifying, in a three-dimensional space, a degree of accumulation of one or more kinds of probes in a periphery of a three-dimensional structure of the target structure and calculating the feature quantity from the target structure using a generator formed through machine learning,
   wherein the probe is a structure in which a plurality of points having a real electric charge and generating a van der Waals force are disposed to be separated from each other.

2. The feature quantity calculating method according to claim 1,
   wherein a compound is designated as the target structure in the target structure designating step, and
   a first feature quantity which is a feature quantity obtained by quantifying, in the three-dimensional space, a degree of accumulation of amino acids as the probes in the periphery of the three-dimensional structure of the compound is calculated using the generator in the feature quantity calculating step.

3. A screening method, executed by the computer having the processor, of extracting a target compound which is bound to a target protein from a plurality of compounds wherein the processor is configured to perform:
   a storing step of storing a three-dimensional structure of a compound formed of a plurality of atoms and the first feature quantity of the three-dimensional structure of the compound which is calculated using the feature quantity calculating method according to claim 2 in association with each other for each of the plurality of compounds;
   a feature quantity calculating step of calculating the first feature quantity of a ligand that is a compound whose binding to the target protein has been confirmed using the feature quantity calculating method;
   a similarity calculating step of calculating a similarity between the first feature quantity of the plurality of compounds and the first feature quantity of the ligand; and
   a compound extracting step of extracting the target compound from the plurality of compounds based on the similarity.

4. A screening method, executed by the computer having the processor, of extracting a target compound which is bound to a target protein from a plurality of compounds wherein the processor is configured to perform:
   a storing step of storing a three-dimensional structure of a compound formed of a plurality of atoms and the first feature quantity calculated using the feature quantity calculating method according to claim 2 in association with each other for each of the plurality of compounds;
   a feature quantity calculating step of calculating the second feature quantity of the pocket structure of the target protein wherein a pocket structure bound to a pocket that is an active site of a target protein is designated as the target structure in the target structure designating step, and
   a second feature quantity which is a feature quantity obtained by quantifying, in the three-dimensional space, a degree of accumulation of amino acids as the probes in the periphery of a three-dimensional structure of the pocket structure formed of a plurality of virtual spheres is calculated using the generator in the feature quantity calculating step;
   a similarity calculating step of calculating a similarity between the first feature quantity of the plurality of compounds and the second feature quantity of the pocket structure; and
   a compound extracting step of extracting the target compound from the plurality of compounds based on the similarity.

5. A compound creating method, executed by the computer having the processor, of creating a three-dimensional structure of a target compound that is bound to a target protein from a plurality of compounds wherein the processor is configured to perform:
   a storing step of storing a three-dimensional structure of a compound formed of a plurality of atoms and the first feature quantity calculated using the feature quantity calculating method according to claim 2 in association with each other for each of the plurality of compounds;
   a feature quantity calculating step of calculating the first feature quantity of a ligand that is a compound whose binding to the target protein has been confirmed using the feature quantity calculating method;
   a generator constructing step of constructing a generator through machine learning using the three-dimensional structures of the plurality of compounds as teacher data and the first feature quantity as an explanatory variable; and
   a compound three-dimensional structure generating step of generating the three-dimensional structure of the target compound from the first feature quantity of the ligand using the generator.

6. A compound creating method, executed by the computer having the processor, of creating a three-dimensional structure of a target compound that is bound to a target protein from a plurality of compounds wherein the processor is configured to perform:
   a storing step of storing a three-dimensional structure of a compound formed of a plurality of atoms and the first feature quantity calculated using the feature quantity calculating method according to claim 2 in association with each other for each of the plurality of compounds;
   a feature quantity calculating step of calculating the second feature quantity of the pocket structure of the target protein wherein a pocket structure bound to a pocket that is an active site of a target protein is designated as the target structure in the target structure designating step, and
   a second feature quantity which is a feature quantity obtained by quantifying, in the three-dimensional space, a degree of accumulation of amino acids as the probes in the periphery of a three-dimensional structure of the pocket structure formed of a plurality of virtual spheres is calculated using the generator in the feature quantity calculating step;

a generator constructing step of constructing a generator through machine learning using the three-dimensional structures of the plurality of compounds as teacher data and the first feature quantity as an explanatory variable; and a compound three-dimensional structure generating step of generating the three-dimensional structure of the target compound from the second feature quantity of the pocket structure using the generator.

7. A non-transitory computer-readable recording medium which causes the computer to execute the screening method according to claim 3 in a case where a command stored in the recording medium is read by the computer.

8. The feature quantity calculating method according to claim 1, wherein a pocket structure bound to a pocket that is an active site of a target protein is designated as the target structure in the target structure designating step, and a second feature quantity which is a feature quantity obtained by quantifying, in the three-dimensional space, a degree of accumulation of amino acids as the probes in the periphery of a three-dimensional structure of the pocket structure formed of a plurality of virtual spheres is calculated using the generator in the feature quantity calculating step.

9. The feature quantity calculating method according to claim 1, wherein a compound is designated as the target structure in the target structure designating step, and a third feature quantity which is a feature quantity obtained by quantifying, in the three-dimensional space, a degree of accumulation of the probes in the periphery of the three-dimensional structure of the compound which is the degree of accumulation using one or more selected from one or more kinds of nucleic acid bases, one or more kinds of lipid molecules, one or more kinds of monosaccharide molecules, water, or one or more kinds of ions formed of a plurality of atoms, as the probes is calculated using the generator in the feature quantity calculating step.

10. A screening method, executed by the computer having the processor, of extracting a target compound which is bound to a target biopolymer other than a protein from a plurality of compounds wherein the processor is configured to perform:

a storing step of storing a three-dimensional structure of a compound formed of a plurality of atoms and the third feature quantity of the three-dimensional structure of the compound which is calculated using the feature quantity calculating method according to claim 9 in association with each other for each of the plurality of compounds;

a feature quantity calculating step of calculating the third feature quantity of a binding compound that is a compound whose binding to the target biopolymer other than the protein has been confirmed using the feature quantity calculating method;

a similarity calculating step of calculating a similarity between the third feature quantity of the plurality of compounds and the third feature quantity of the binding compound; and a compound extracting step of extracting the target compound from the plurality of compounds based on the similarity.

11. A compound creating method, executed by the computer having the processor, of creating a three-dimensional structure of a target compound that is bound to a target biopolymer other than a protein from a plurality of compounds, wherein the processor is configured to perform:

a storing step of storing a three-dimensional structure of a compound formed of a plurality of atoms and the third feature quantity in association with each other for each of the plurality of compounds;

a feature quantity calculating step of calculating the third feature quantity of a binding compound that is a compound whose binding to the target biopolymer other than the protein has been confirmed using the feature quantity calculating method according to claim 9;

a generator constructing step of constructing a generator through machine learning using the three-dimensional structures of the plurality of compounds as teacher data and the third feature quantity as an explanatory variable; and a compound three-dimensional structure generating step of generating the three-dimensional structure of the target compound from the third feature quantity of the binding compound using the generator.

12. A non-transitory computer-readable recording medium which causes the computer to execute the feature quantity calculating method according to claim 1 in a case where a command stored in the recording medium is read by the computer.

13. A screening method, executed by the computer having the processor, wherein the processor is configured to perform:

an input step of inputting information related to three-dimensional structures of a plurality of compounds;

a feature quantity calculating step of calculating the feature quantity of each of the plurality of compounds using the feature quantity calculating method according to claim 1 based on the information;

a characteristic value calculating step of calculating a physical property value indicating a physical property and/or a toxicity value indicating toxicity of each of the plurality of compounds based on the information; and an extracting step of extracting compounds in which a similarity between the feature quantities satisfies a target value and the physical property value and/or the toxicity value satisfies a target value, from the plurality of compounds.

14. A screening method, executed by the computer having the processor, wherein the processor is configured to perform:

an input step of inputting information related to three-dimensional structures of a plurality of compounds;

a first feature quantity calculating step of calculating the feature quantity of each of the plurality of compounds using the feature quantity calculating method according to claim 1 based on the information;

a second feature quantity calculating step of calculating a structural feature quantity indicating a compound structure of each of the plurality of compounds based on the information; and an extracting step of extracting compounds in which a similarity between the feature quantities satisfies a target value and a similarity between the structural feature quantities is less than or equal to a threshold, from the plurality of compounds.

15. A screening method, executed by the computer having the processor, wherein the processor is configured to perform:
- an input step of inputting information related to three-dimensional structures of a plurality of compounds;
- a feature quantity calculating step of calculating the feature quantity of each of the plurality of compounds using the feature quantity calculating method according to claim 1 based on the information;
- a predicting step of predicting a binding force using a prediction model that outputs the binding force between each of the plurality of compounds and another compound based on the feature quantity; and
- an extracting step of extracting compounds in which the binding force satisfies a target value, from the plurality of compounds.

16. A screening method, executed by the computer having the processor, wherein the processor is configured to perform:
- an input step of inputting information related to three-dimensional structures of a plurality of compounds;
- a setting step of setting a target value of a binding force between each of the plurality of compounds and another compound;
- an estimating step of estimating the feature quantity corresponding to the target value using a prediction model that outputs the binding force based on the feature quantity calculated by the feature quantity calculating method according to claim 1;
- a feature quantity calculating step of calculating the feature quantity of each of the plurality of compounds using the feature quantity calculating method based on the information; and
- an extracting step of extracting compounds in which a similarity between the calculated feature quantity and the estimated feature quantity is greater than or equal to a threshold, from the plurality of compounds based on the calculation results.

17. A feature quantity calculating device comprising:
- a target structure designation unit which designates a target structure formed of a plurality of unit structures having chemical properties; and
- a feature quantity calculation unit which calculates a feature quantity obtained by quantifying, in a three-dimensional space, a degree of accumulation of one or more kinds of probes in a periphery of a three-dimensional structure of the target structure and calculating the feature quantity from the target structure using a generator formed through machine learning,
- wherein the probe is a structure in which a plurality of points having a real electric charge and generating a van der Waals force are disposed to be separated from each other.

* * * * *